US006901602B2

(12) United States Patent
Inoue

(10) Patent No.: US 6,901,602 B2
(45) Date of Patent: May 31, 2005

(54) DISK CARTRIDGE

(75) Inventor: Naoki Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 130 days.

(21) Appl. No.: 10/443,912

(22) Filed: May 21, 2003

(65) Prior Publication Data

US 2004/0027985 A1 Feb. 12, 2004

Related U.S. Application Data

(63) Continuation of application No. 09/915,890, filed on Jul. 26, 2001, now Pat. No. 6,590,858.

(30) Foreign Application Priority Data

Jul. 28, 2000 (JP) ........................................ P2000-230039

(51) Int. Cl.[7] .................................................. G11B 3/70
(52) U.S. Cl. ...................................................... 720/742
(58) Field of Search ........................... 369/291; 360/133

(56) References Cited

U.S. PATENT DOCUMENTS 6,023,398 A * 2/2000 Tannert et al. .............. 360/133
6,052,359 A * 4/2000 Fujiura ........................ 720/735
6,094,326 A * 7/2000 Ikebe et al. ................. 360/133

* cited by examiner

*Primary Examiner*—William Klimowicz
*Assistant Examiner*—Mark Blouin
(74) *Attorney, Agent, or Firm*—Frommer Lawrence & Haug LLP; William S. Frommer; Leonard J. Santisi

(57) ABSTRACT

A disc cartridge having a disc accommodating chamber formed between an upper shell and an intermediate shell by overlaying the upper shell over an intermediate shell and a lower shell. The intermediate shell is rotatably supported by the upper and lower shells and an optical disc is rotatably accommodated in the disc accommodating chamber while part of the optical disc is exposed through shutter members on open portions of the intermediate shell.

4 Claims, 41 Drawing Sheets

F I G. 14A
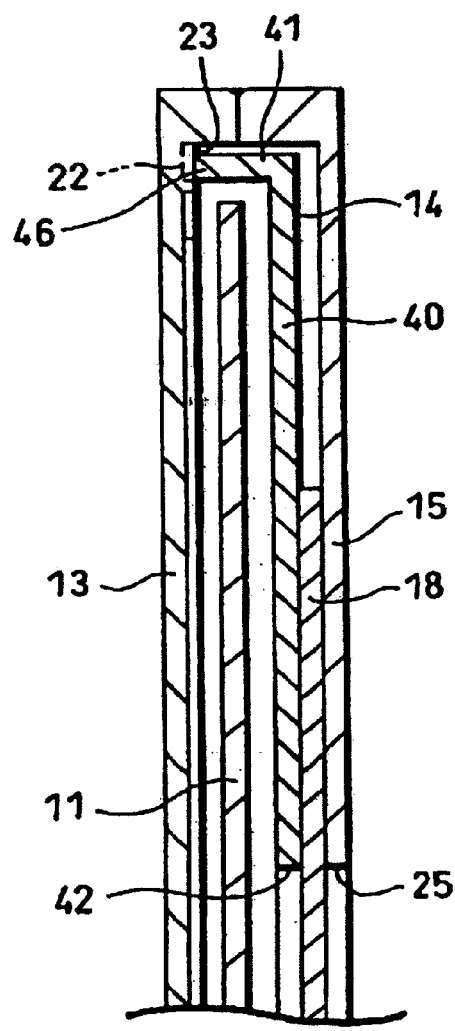
F I G. 14B
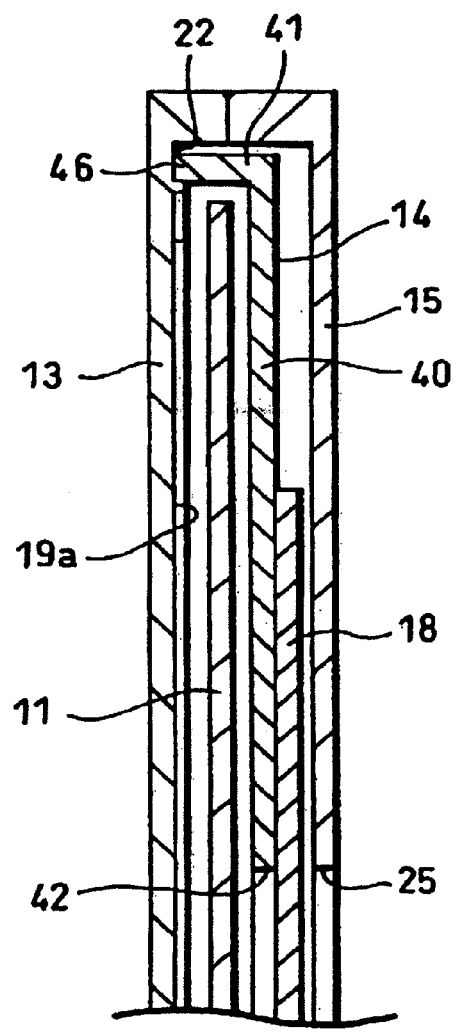

DISK CARTRIDGE

This application is a continuation of U.S. application Ser. No. 09/915,890, filed Jul. 26, 2001 now U.S. Pat. No. 6,590,858.

BACKGROUND OF THE INVENTION

1. Field of the Invention

The present invention relates to a disc cartridge in which a disc-like recording medium such as an optical disc, a photomagnetic disc and a magnetic disc is accommodated rotatably in a disc-accommodating chamber of a cartridge case. More specifically, the present invention relates to a disc cartridge in which by rotating an intermediate shell for forming a disc accommodating chamber with an upper shell or a lower shell, a pair of shutter members are opened/closed so as to open/close an opening portion and when it is opened, part of the disc-like recording medium is exposed through the opening portion.

2. Description of the Related Art

Conventionally, as a disc cartridge in which a disc-like recording medium allowing recording/reproduction of information such as audio, video and computer data is accommodated rotatably in a cartridge case thereof, a disc cartridge having a structure shown in FIG. 42 has been well known. This disc cartridge 1 contains an additionally writable photomagnetic disc 4 allowing information such as computer data to be additionally written therein and has an external shape shown in FIG. 42.

This disc cartridge 1 comprises a cartridge case 2 composed of a pair of an upper shell 2a and a lower shell 2b, a photomagnetic disc 4 accommodated rotatably in the disc accommodating chamber 3 of the cartridge case 2 and the like. A top face and a bottom face of the cartridge case 2 have upper and lower opening portions 5 extending from the center portion to a side thereof. The opening portions 5 can be opened/closed by a shutter member 6 capable of sliding along a side. This shutter member 6 is always urged in a direction of closing the opening portion 5 by a spring (not shown). Reference numeral 6a denotes a pressing member for preventing a front end of the shutter member 6 from slipping out.

A center hub 7 formed of metal in a circular shape is provided in the center of the photomagnetic disc 4. This center hub 7 is disposed at a position corresponding to an inside end of the opening portion 5, that is, substantially in the center of the cartridge case 2. A turntable provided on the main body of an information recording/reproducing apparatus is loaded on this center hub 7. Then, the center hub 7 is chucked by the turntable, so that the photomagnetic disc 4 is driven at a predetermined speed (for example, constant linear speed). By means of a photomagnetic pickup unit whose head portion is inserted into the opening portion 5, recording and reproduction of information signal from/into the photomagnetic disc 4 are carried out.

In the conventional disc cartridge having such a structure, the shutter member 6 for opening/closing the opening portion 5 is formed to have a U-shaped section and this shutter member 6 is fit to a side of the cartridge case 2 such that the shutter member 6 is slidable along that side to open/close the opening portion 5. Thus, because a large gap is generated between the cartridge case 2 and the shutter member 6, it is difficult to block invasion of minute dirt, dust and the like.

In the recent trend of increased capacity of the optical disc and intensified recording density, narrowed pitches in recording patterns and an increase in line density have been accelerated. If dust or dirt invades onto a recording face of the optical disc or photomagnetic disc, reading or writing beam may be intercepted or normal reading/writing of information may be disabled by damage on the information recording face. Thus, in the conventional disc cartridge, as shown in FIG. 42, the shutter member 6 formed to have the substantially U-shaped section is mounted slidably on a side of the cartridge case 2 and by moving the shutter member 6 along the side, the opening portion is opened/closed so as to protect information recording face of the optical disc or the like.

Because of the trend of further increased capacity and intensified recording density, minute dust and dirt, which hardly affect conventionally, influence reading and writing of data more seriously. However, the shutter member formed to have the above-described substantially U-shaped section is incapable of blocking the infiltration of such minute dust and dirt. If the minute dust or dirt infiltrating into the cartridge case 2 is attached to the information recording face of the photomagnetic disc 4, the information recording face is damaged by this dirt or dust, so that proper reading and writing of information are disabled.

Further, because in the conventional disc cartridge 1, the shutter member 6 is located at a position where a user is likely to touch, he may slide the shutter member 6 by mistake to open the opening portion 5. Further, because the shutter member 6 is always urged in the direction of closing the opening portion 5 by a spring (not shown), not only the spring is needed as a component, but also it takes much labor and time to assemble the spring, thereby leading to poor assembly efficiency and productivity of such a disc cartridge.

SUMMARY OF THE INVENTION

The present invention has been achieved to solve the above-described problem and therefore, an object of the invention is to provide a disc cartridge in which an intermediate shell is held rotatably by an upper shell and a lower shell without using a spring while a pair of the shutter members are opened/closed by rotation of the intermediate shell, the disc cartridge being capable of being mounted on a recording/reproducing apparatus not only when the pair of the shutter members are completely closed, but also incompletely closed or completely opened, the opening portion being opened securely upon loading of the disc cartridge and the pair of the shutter members being closed securely when discharged from the recording/reproducing apparatus, thereby securing high dust resistance and airtightness.

To achieve the above object, according to a first aspect of the present invention, there is provided a disc cartridge comprising: cartridge case in which a disc accommodating chamber is formed between an upper shell and an intermediate shell or between the intermediate shell and a lower shell by overlaying the upper shell, the intermediate shell and the lower shell, while the intermediate shell is supported rotatably by the upper shell and the lower shell; disc-like recording medium which is accommodated rotatably in the disc accommodating chamber while part of the disc-like recording medium is exposed through an opening portion provided in the intermediate shell, the lower shell or the upper shell; and a pair of shutter members mounted on the intermediate shell, capable of opening/closing the opening portion, wherein at least one of the upper shell and the lower shell is provided with an operating window for rotating the intermediate shell and a driven portion, which is engaged with a shutter opening/closing means passing outside the operating window for rotating the intermediate shell up to a predetermined position, is provided on an external peripheral face of the intermediate shell.

According to a second aspect of the present invention, there is provided a disc cartridge according to the first aspect wherein the pair of the shutter members is comprised of a combination of two plates of the same shape while the pair of the shutter members are disposed symmetrically on a side face of the intermediate shell so as to close the opening portion, and a side portion of each of the shutter members is supported rotatably by the intermediate shell while the other side portion thereof is engaged slidably with the lower shell or the upper shell, so that the pair of the shutter members opens/closes the opening portion by relative rotations of the intermediate shell, the lower shell and the upper shell.

According to a third aspect of the present invention, there is provided a disc cartridge according to the first aspect wherein the shutter opening/closing means comprises a rack portion reciprocating outside the operating window, an initial action convex portion disposed before and after the rack portion and a stopper convex portion, and the driven portion comprises a gear portion which meshes detachably with the rack portion, a rack portion which is an initial shutter opening/closing means disposed on both sides in the circumferential direction of the gear portion and an empty shift portion which releases engagement with the gear portion provided between the initial action convex portion and the stopper convex portion, the driven portion being provided with a sliding portion for generating a relative sliding corresponding to the empty shift portion.

According to a fourth aspect of the present invention, a rotation joint portion is comprised of a shaft portion provided on any one of the shutter members acting in pair and the intermediate shell and a fitting hole provided in the other component. A shift joint portion is comprised of a guide groove provided in the shutter members and the lower shell or the upper shell and an operating convex portion provided in the other component. By moving the operating convex portion along the guide groove based on rotation of the intermediate shell, a pair of the shutter members are opened/closed.

According to a fifth aspect of the present invention, there is provided a disc cartridge according to the fourth aspect wherein the stopper convex portion is formed higher than the rack portion while a set position concave portion is provided in a tooth root circle of the gear portion.

In the disc cartridge of the first aspect, comprising the cartridge case containing the disc accommodating chamber, the disc-like recording medium and a pair of the shutter members, the driven portion provided on the external peripheral face of the intermediate shell faces the operating window provided on at least one of the upper shell and the lower shell. If the shutter opening/closing means passes outside this operating window, the driven portion engages with this shutter opening/closing means so as to rotate the intermediate shell up to a predetermined position. Thus, a gap between the pair of the shutter members and the cartridge case is reduced so that minute dust and dirt become difficult to enter into the disc-accommodating chamber. Consequently, dust resistance of the cartridge case is intensified and irrespective of whether the pair of the shutter members are opened or closed, the opening portion is opened surely when the disc cartridge is loaded on the recording/reproducing apparatus. When the disc cartridge is discharged from the recording/reproducing apparatus, the opening portion is kept closed surely.

In the disc cartridge of the second aspect of the present invention, two sheets of the same shape are disposed so as to close the opening portion while one side portion of each is supported rotatably on the intermediate shell and the other side portion is engaged with the lower shell or the upper shell slidably. A pair of the shutter members is opened/closed by a relative rotation of the intermediate shell and the lower shell or the upper shell. Consequently, while the area of each shutter member is reduced, it is possible to open/close a wider-area opening portion thereby leading to increase of opening/closing efficiency of the opening portion. At the same time, reduction of the size and thickness of the disc cartridge can be achieved and a pair of the shutter members can be opened/closed smoothly and surely.

In the disc cartridge of the third aspect of the present invention, the shutter opening/closing means comprises the rack portion, the initial action convex portion and the stopper convex portion. The driven portion of the intermediate shell comprises the gear portion, the initial action concave portion and the set position concave portion. Consequently, if the shutter opening/closing means is passed outside the operating window, the initial action convex portion or the rack portion engages with the initial action concave portion or the gear portion, so that the intermediate shell is rotated up to a predetermined position. As a result, the intermediate shell can be rotated surely up to the predetermined position and a pair of the shutter members is opened/closed smoothly by the rotation of the intermediate shell, thereby achieving the opening/closing of the opening portion.

In the disc cartridge of the fourth aspect of the present invention, the empty shift portion is provided between the rack portion, the initial action convex portion and the stopper concave portion and correspondingly, the driven portion is provided with the sliding portion. Consequently, the rack portion and the gear portion can be synchronized with each other so as to rotate the intermediate shell securely to a predetermined position. As a result, a pair of the shutter members can be opened/closed securely so as to achieve the opening/closing of the opening portion.

In the disc cartridge of the fifth aspect of the present invention, because the stopper convex portion is higher than the rack portion, when the stopper convex portion engages with the set position concave portion, the intermediate shell can be fixed at a predetermined position as if it is locked, so that the intermediate shell is protected from being rotated by vibration or the like.

BRIEF DESCRIPTION OF THE DRAWINGS

FIG. 13 is a diagram for explaining a lift action of the intermediate shell relative to the upper shell when the disc cartridge shown in FIG. 1 is opened or closed, while

FIG. 14 is a diagram for explaining a lift action of the intermediate shell when the disc cartridge is opened or closed in FIG. 13, while FIG. 14A is a sectional view showing a state in which a cam portion of the intermediate shell rides over a lift-up portion of the upper shell and FIG. 14B is a sectional view showing a state in which the cam portion of the intermediate shell enters into a cam groove in the upper shell;

DETAILED DESCRIPTION OF THE PREFERRED EMBODIMENTS

Figure 1:
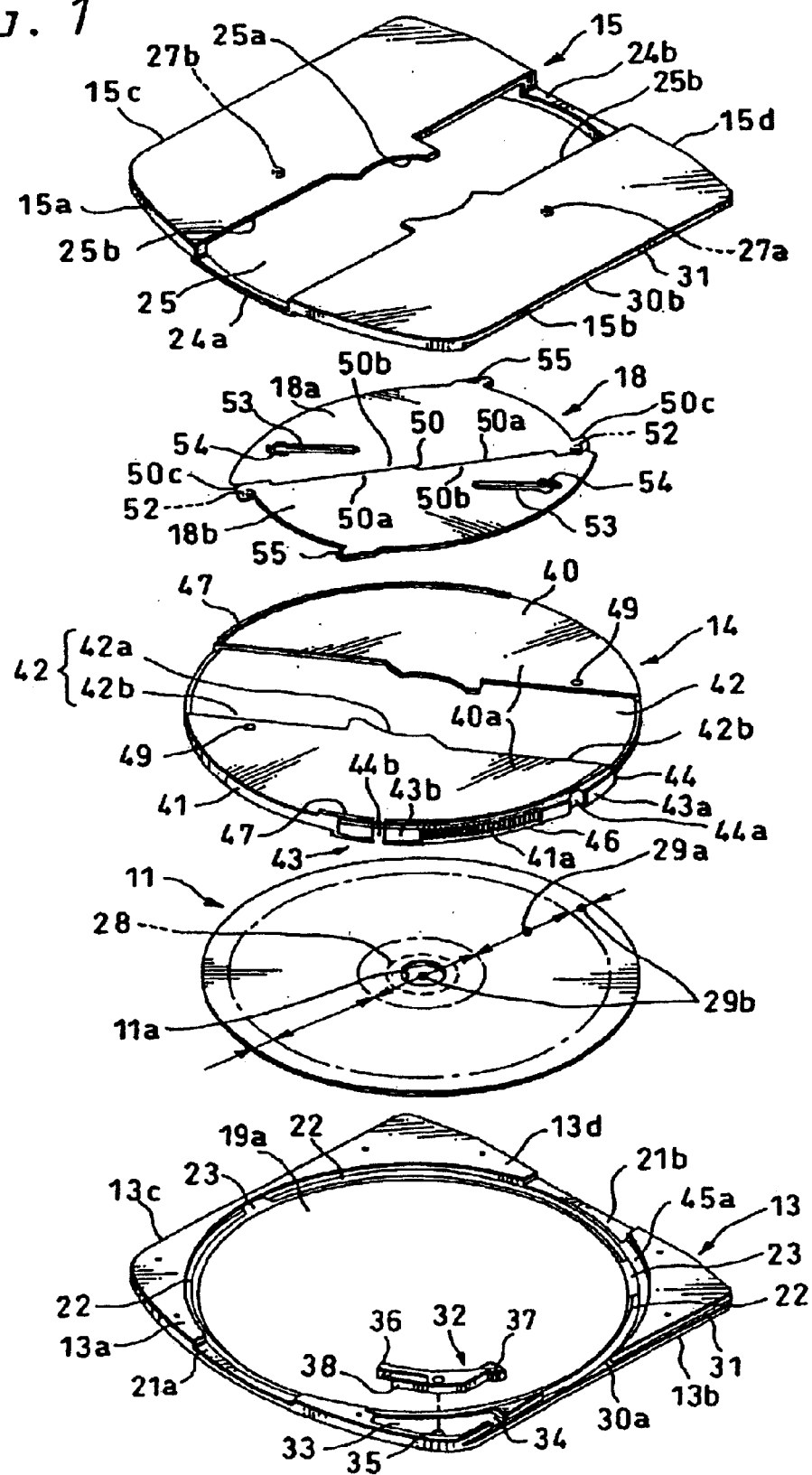
FIG. 1 is an exploded perspective view of a disc cartridge according to a first embodiment of the present invention, viewed from the side of its bottom face.
Figure 2:
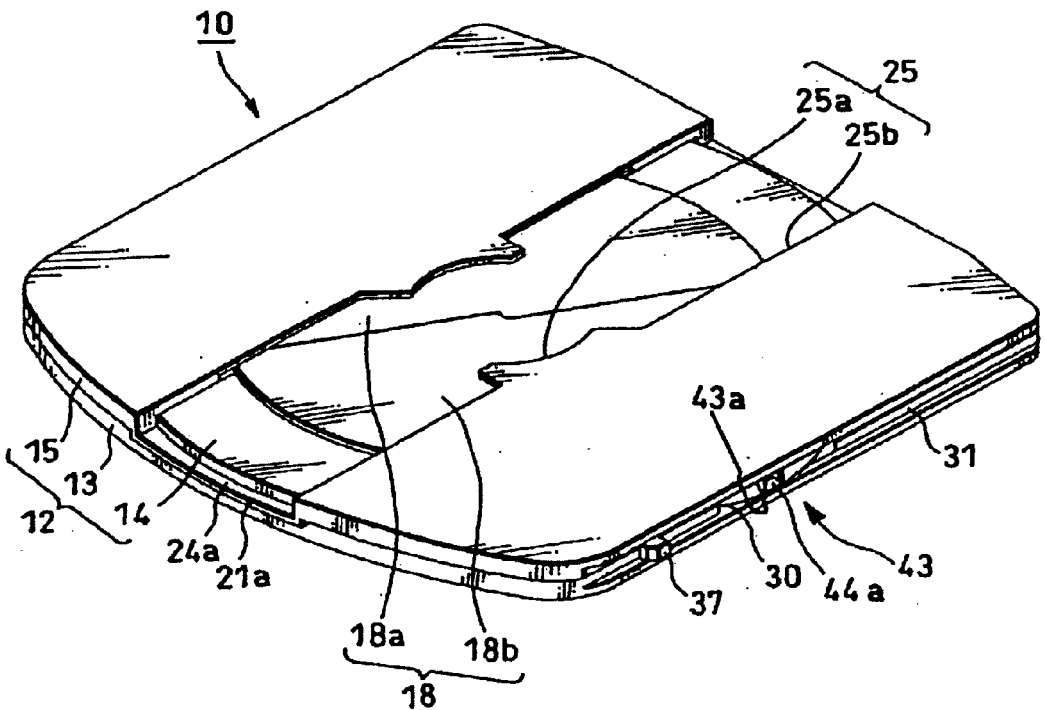
FIG. 2 is a perspective view of the disc cartridge shown in FIG. 1 viewed from the side of its bottom face, showing a state in which an opening portion thereof is closed by closing a shutter mechanism.
Figure 3:
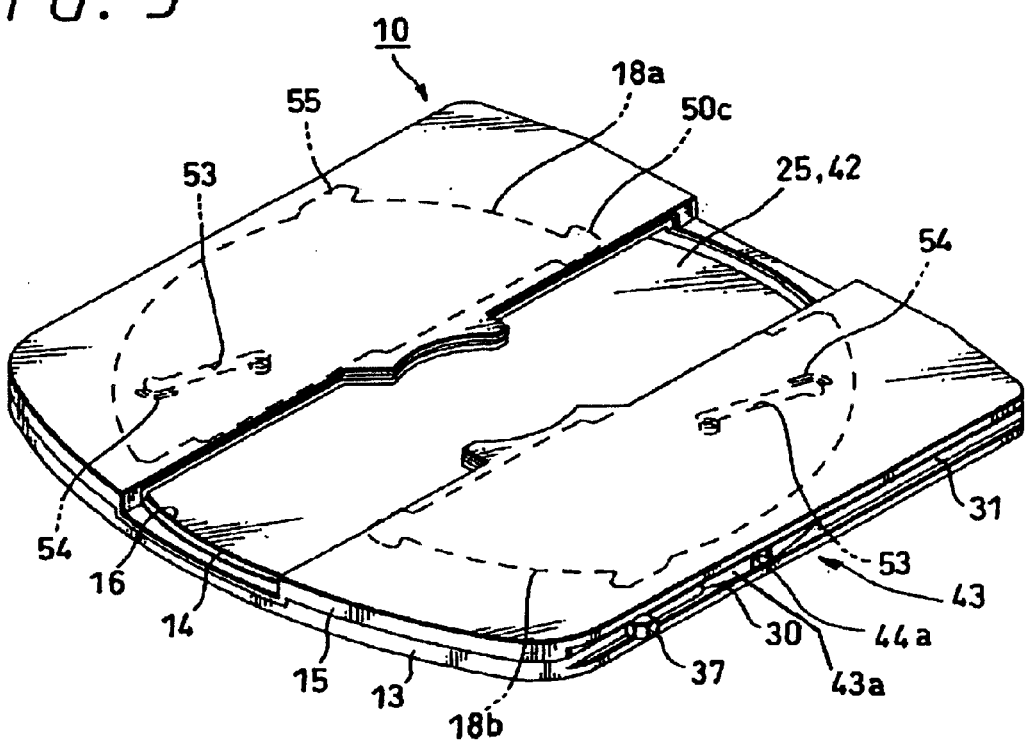
FIG. 3 is a perspective view of the disc cartridge shown in FIG. 1 viewed from the side of the bottom face, showing a state in which the opening portion thereof is opened by opening the shutter mechanism.
Figure 4:
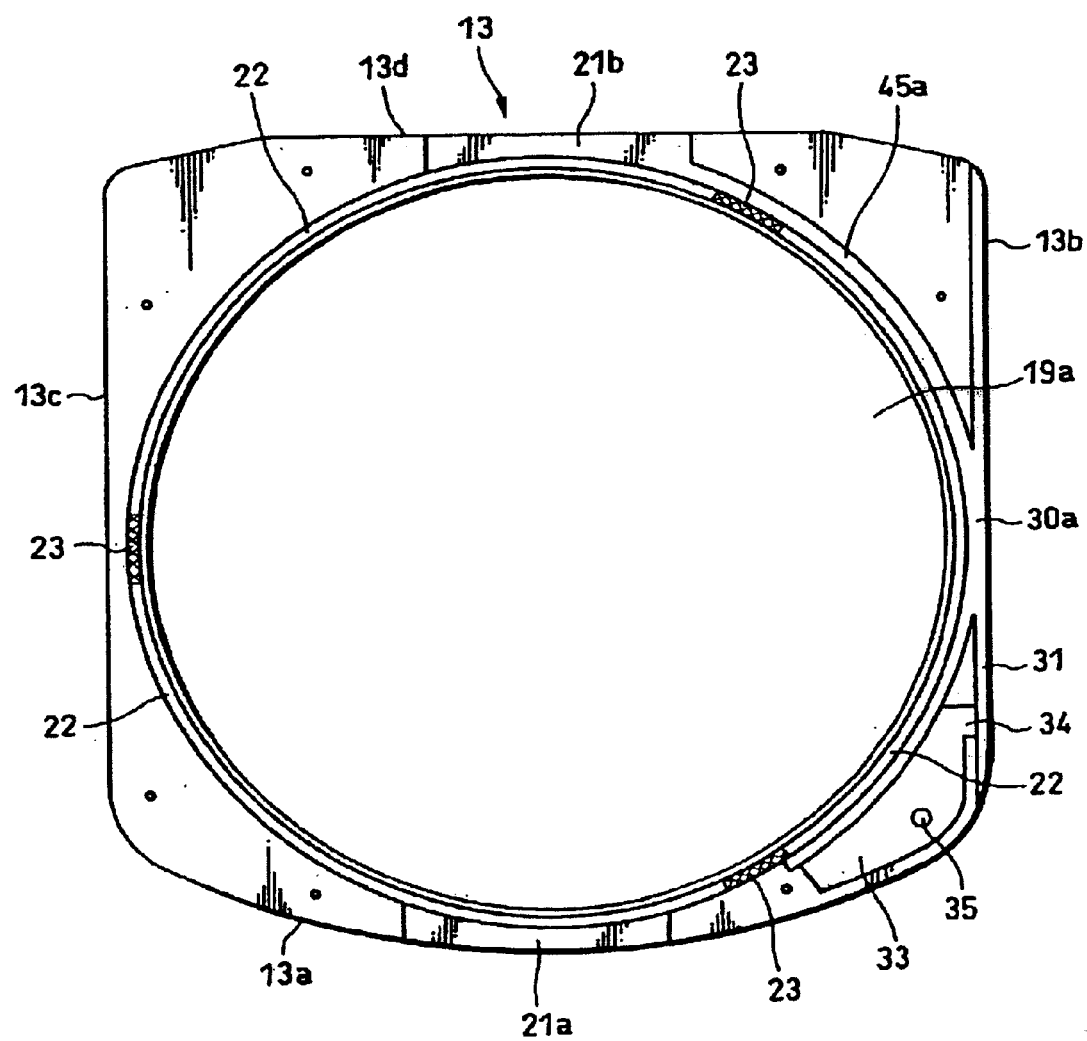
FIG. 4 is a plan view showing a bottom face of an upper shell of the disc cartridge shown in FIG. 1.
Figure 5:
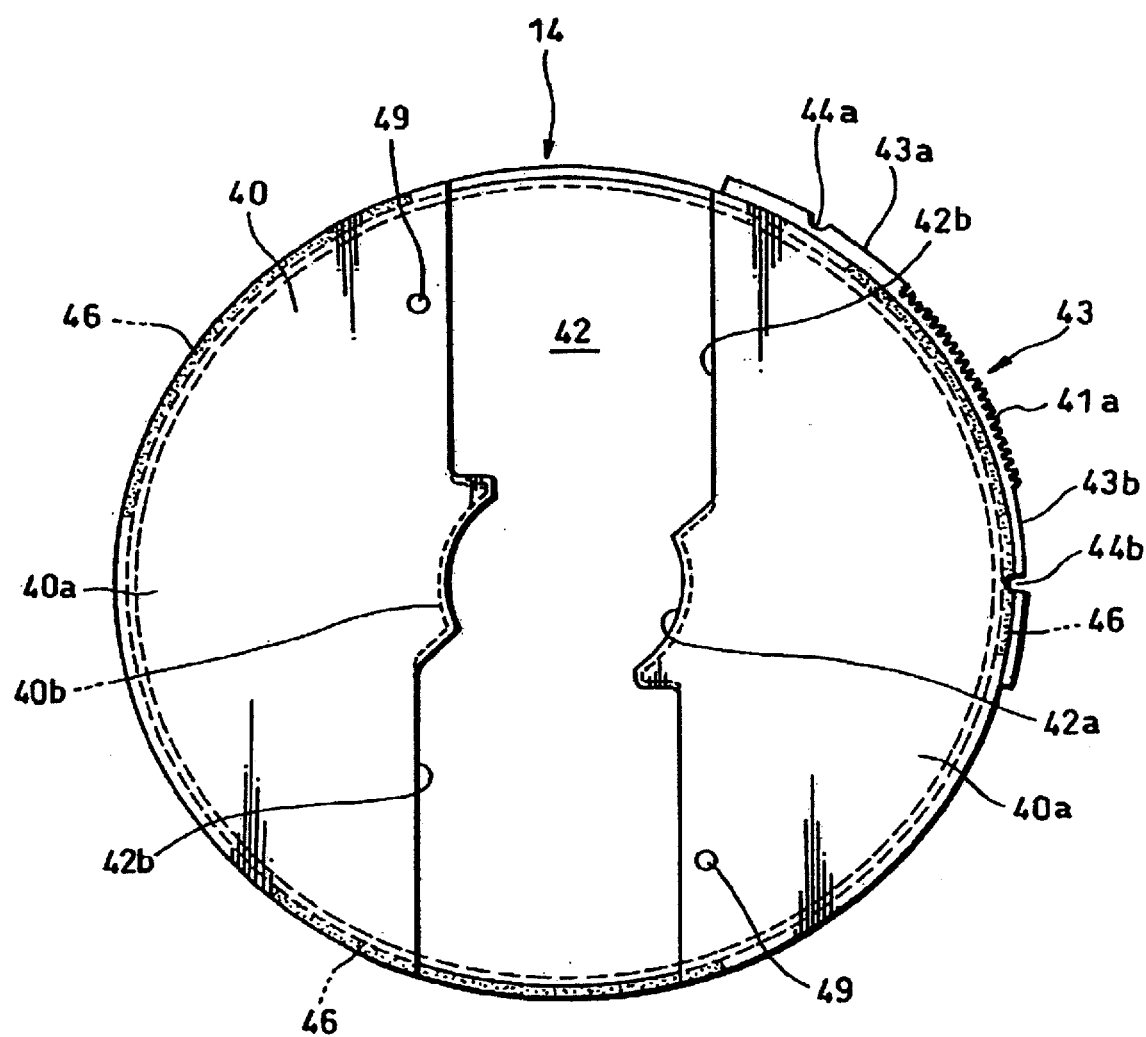
FIG. 5 is a plan view showing a bottom face of an intermediate shell of the disc cartridge shown in FIG. 1.
Figure 6:
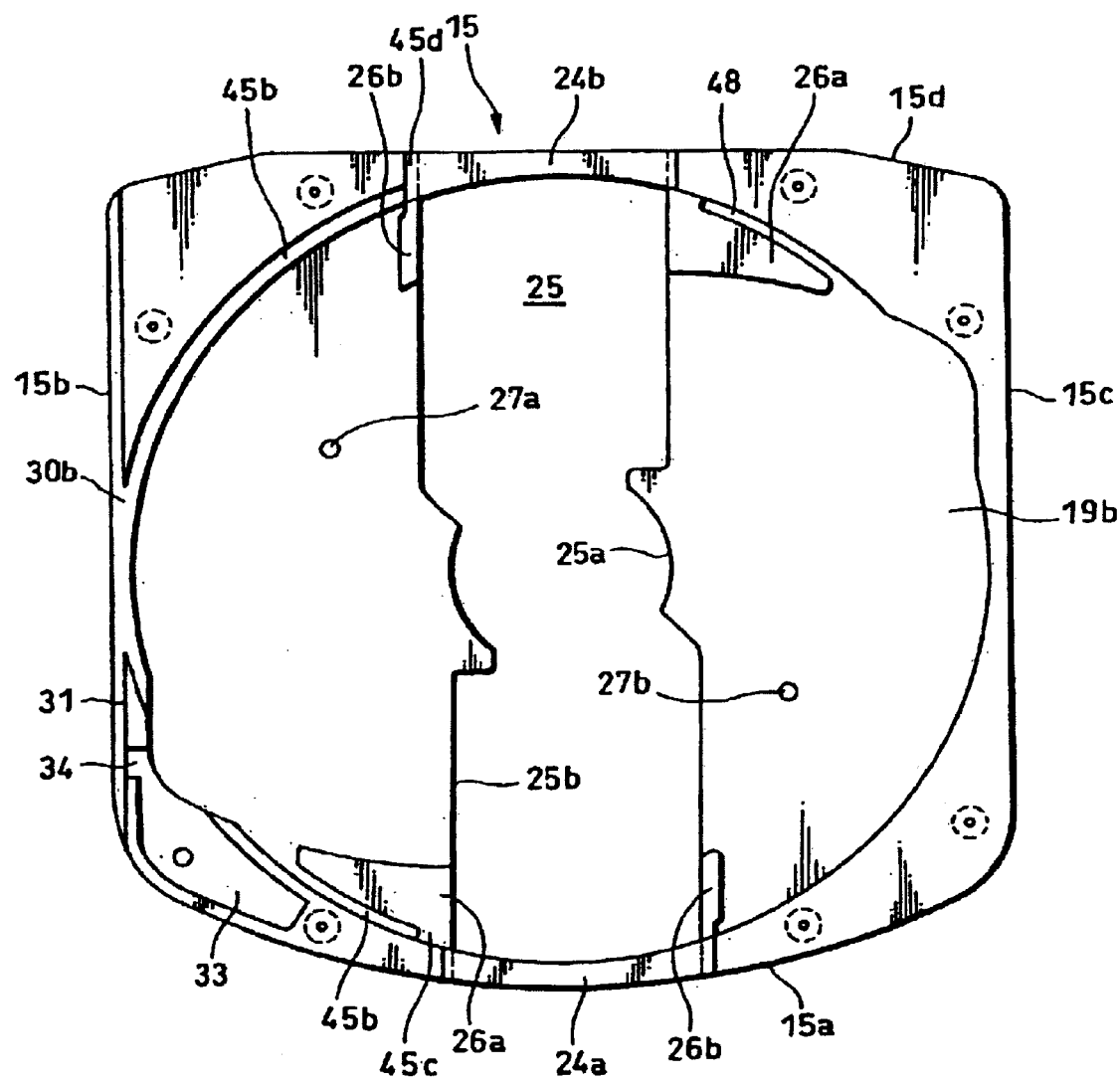
FIG. 6 is a plan view showing a top face of a lower shell of the disc cartridge shown in FIG. 1.
Figure 7:
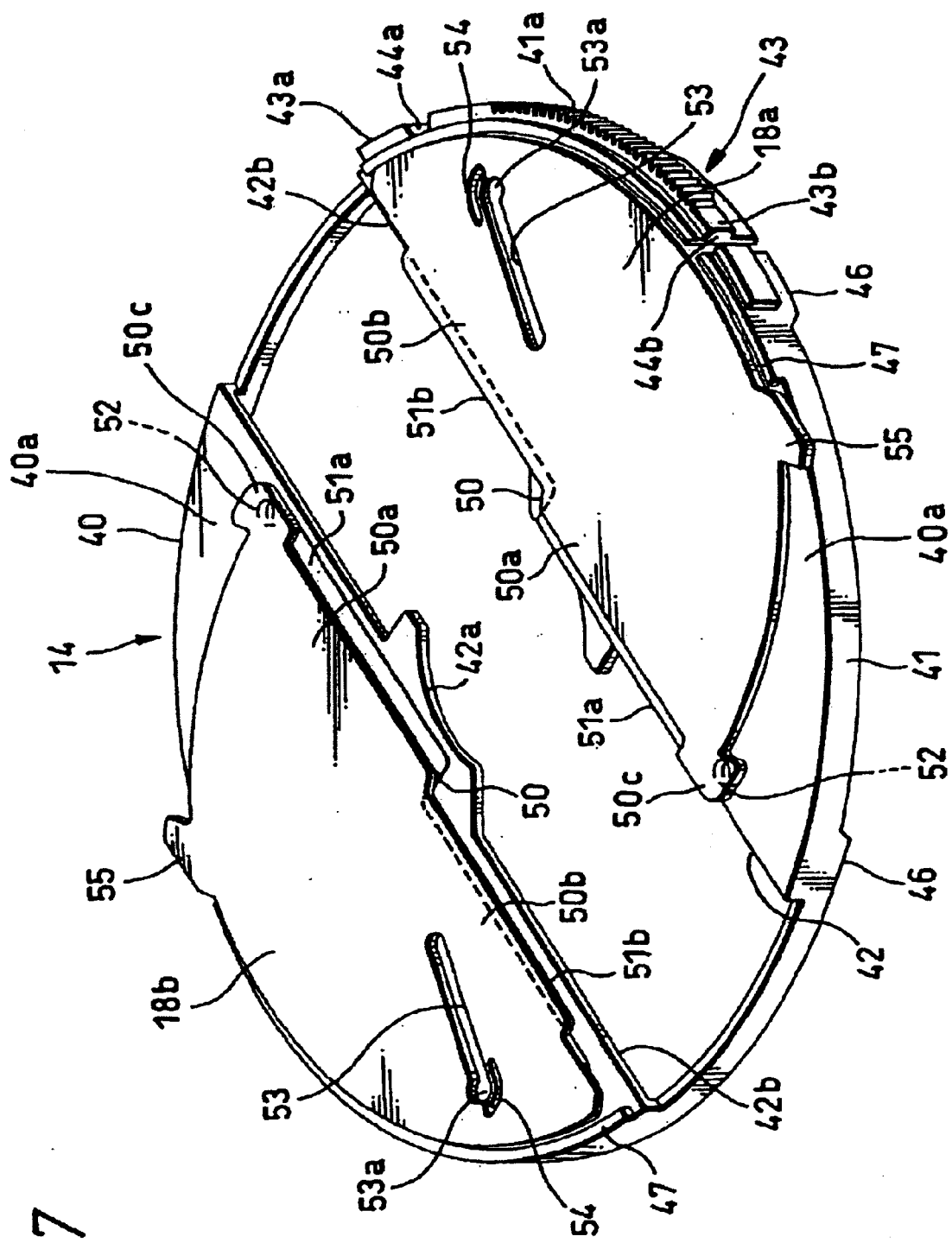
FIG. 7 is a perspective view showing a state in which the opening portion is kept open by opening a pair of shutter members mounted on the intermediate shell of the disc cartridge shown in FIG. 1.
Figure 8:
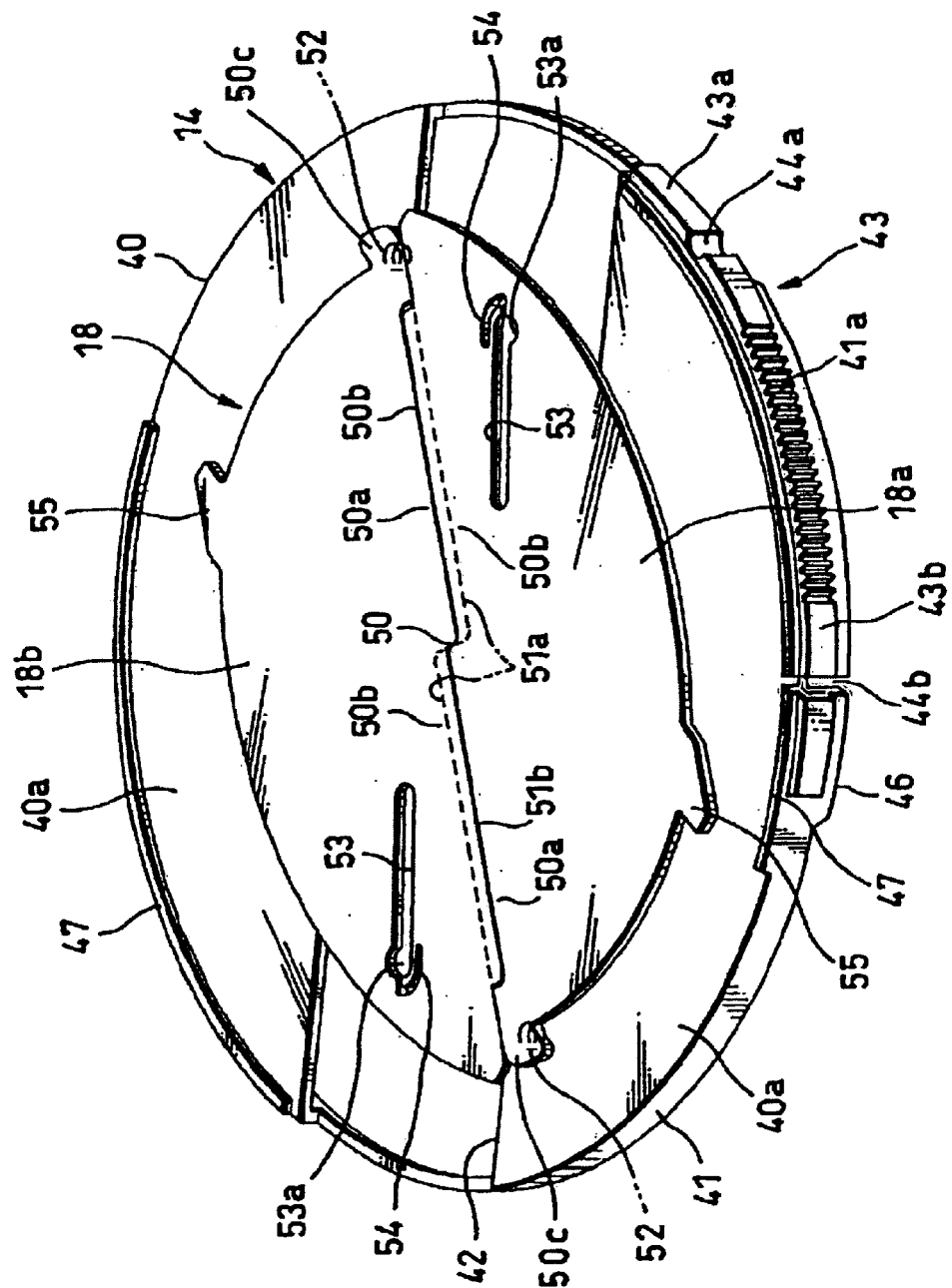
FIG. 8 is a perspective view showing a state in which the opening portion is kept closed by closing a pair of the shutter members mounted on the intermediate shell of the disc cartridge shown in FIG. 1.
Figure 9:
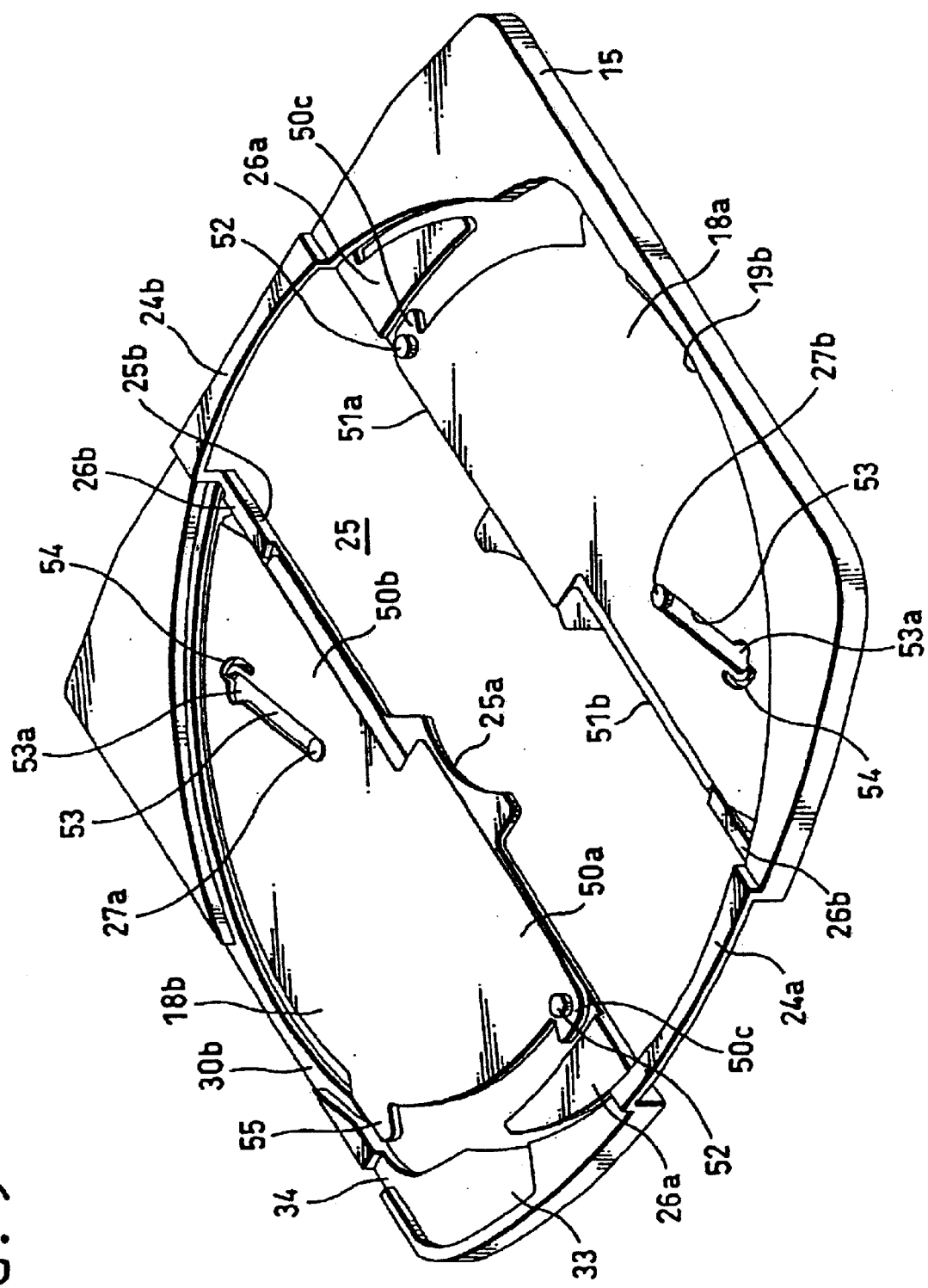
FIG. 9 is a perspective view showing a state in which the opening portion is kept open by opening a pair of the shutter members in a shutter mechanism installed in the lower shell of the disc cartridge shown in FIG. 1.
Figure 10:
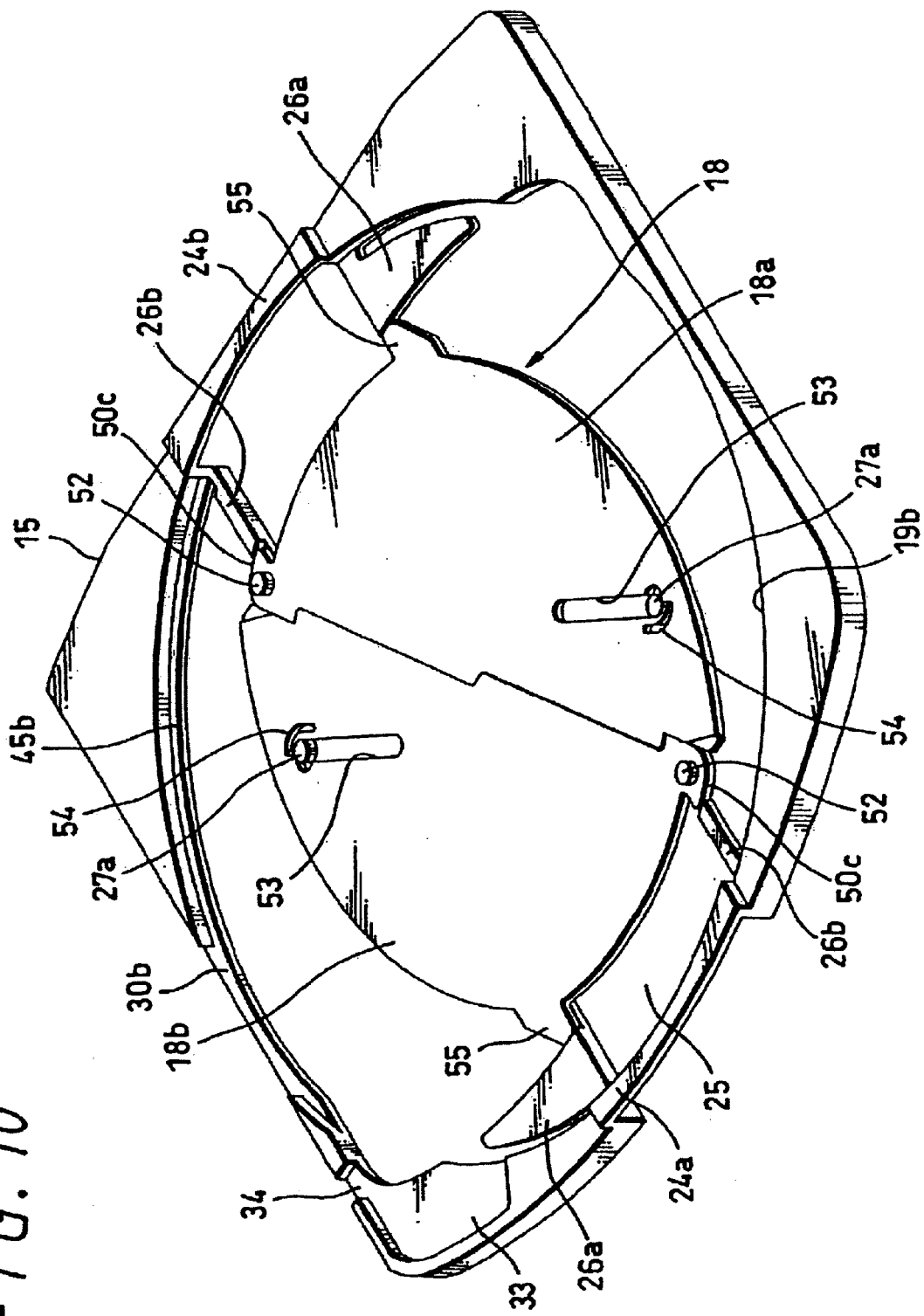
FIG. 10 is a perspective view showing a state in which the opening portion is kept closed by closing a pair of the shutter members in a shutter mechanism installed in the lower shell of the disc cartridge shown in FIG. 1.
Figure 11:
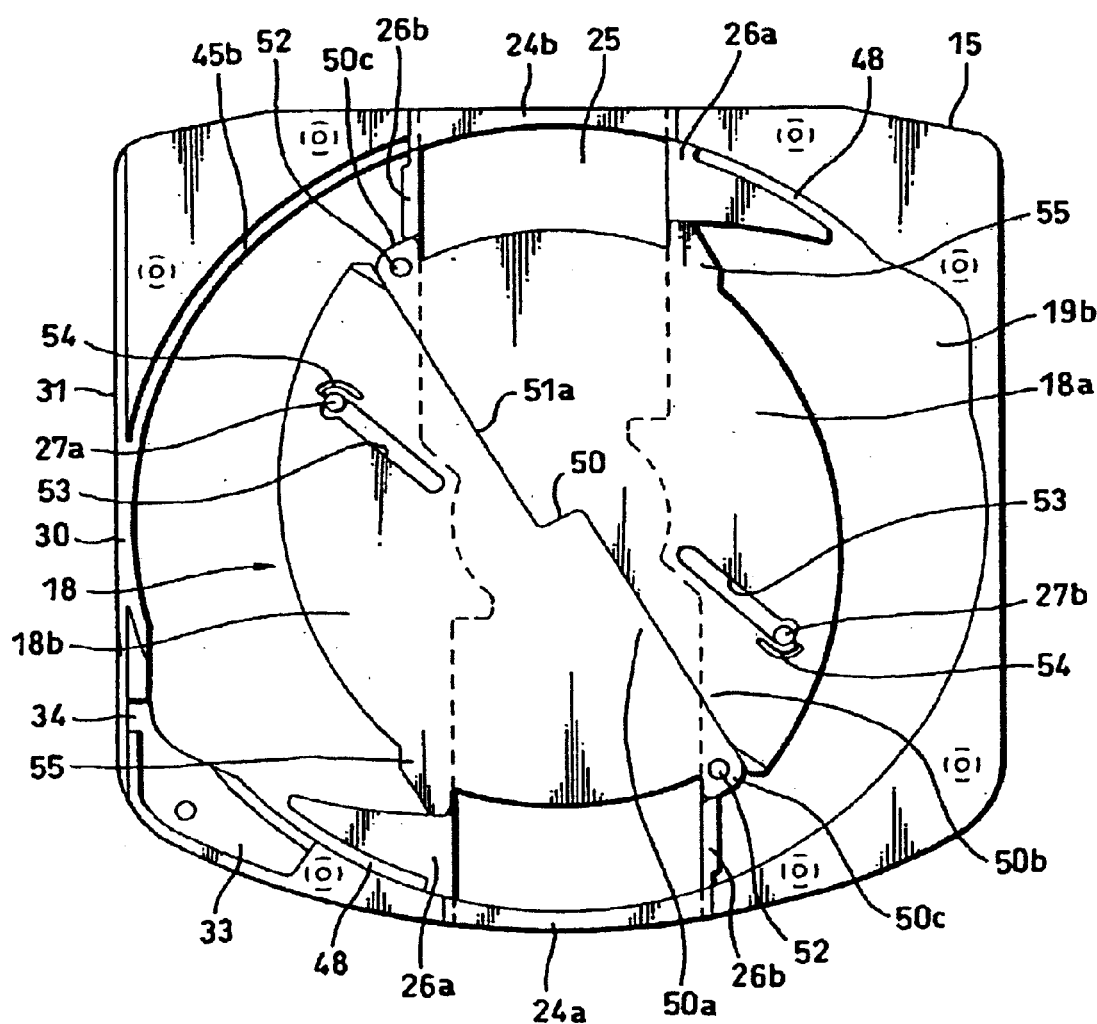
FIG. 11 is a plan view of FIG. 10 as viewed from above.
Figure 12:
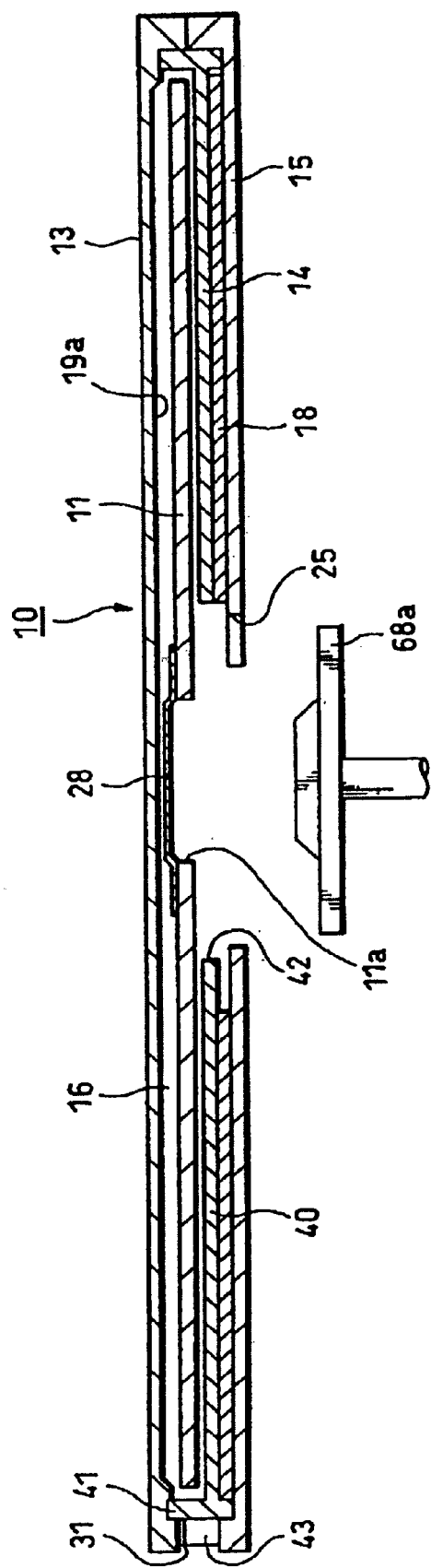
FIG. 12 is an explanatory diagram showing a longitudinal sectional view of a central portion of the disc cartridge shown in FIG. 1 indicating a relation thereof with a turntable.
Figure 13A:
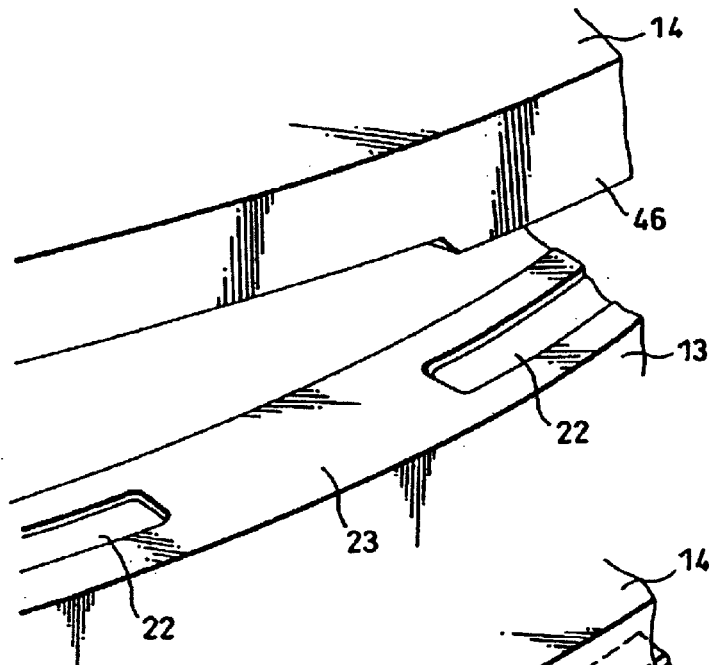
FIG. 13A is an exploded perspective view thereof.
Figure 13B:
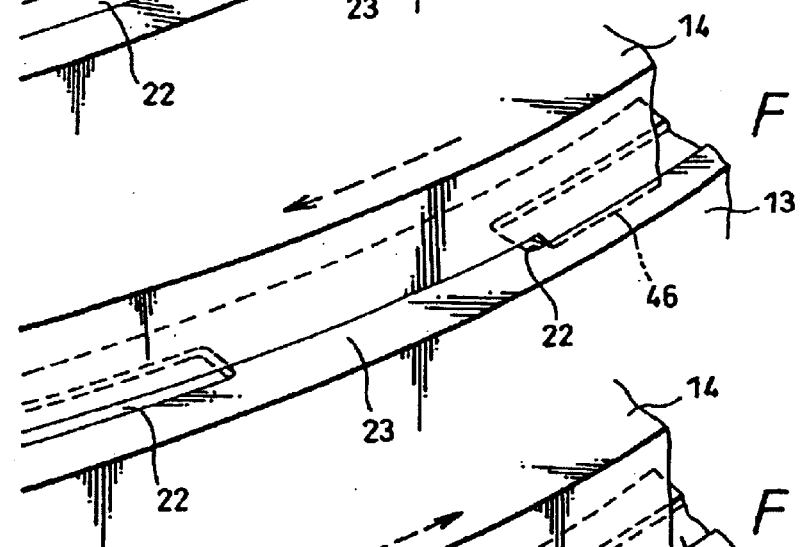
FIG. 13B is a perspective view thereof at the time of its lift-down and FIG. 13C is a perspective view thereof at the time of its lift-up.
Figure 13C:
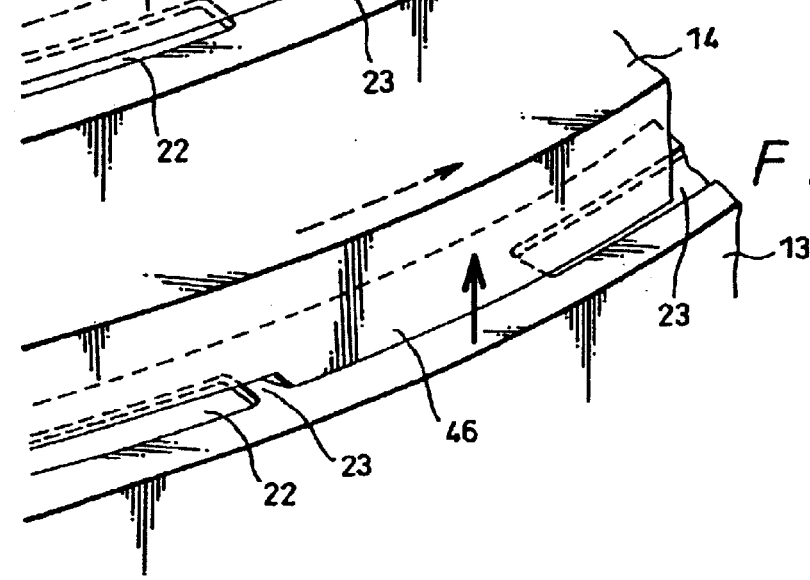

Hereinafter, the preferred embodiments of the present invention will be described with reference to the accompanying drawings. FIGS. 1–41 show the embodiments of the disc cartridge of the present invention. FIG. 1 is an exploded perspective view of the disc cartridge according to a first embodiment of the present invention, viewed from the side of its lower shell. FIG. 2 is a perspective view showing a state in which the shutter is kept closed as viewed from the side of the lower shell. FIG. 3 is a perspective view showing a state in which the shutter is kept open. FIG. 4 is a bottom view of the upper shell. FIG. 5 is a bottom view of the intermediate shell. FIG. 6 is a plan view of the lower shell. FIG. 7 is a perspective view of the intermediate shell and a pair of the shutter members kept open. FIG. 8 is a perspective view showing a state in which a pair of the shutter members of FIG. 7 is kept closed. FIG. 9 is a perspective view of the lower shell and a pair of the shutter members kept open. FIG. 10 is a perspective view showing a state in which a pair of the shutter members of FIG. 9 is kept closed. FIG. 11 is a plan view of FIG. 10. FIG. 12 is an explanatory diagram showing a section of the central portion. FIGS. 13A–C are explanatory diagrams showing relations between rotation of the intermediate shell and lift action thereof. FIG. 14A, B are explanatory diagrams showing a state in which the shutter members are in firm contact/released with a lift action of the intermediate shell, caused by rotation thereof.

Figure 15:
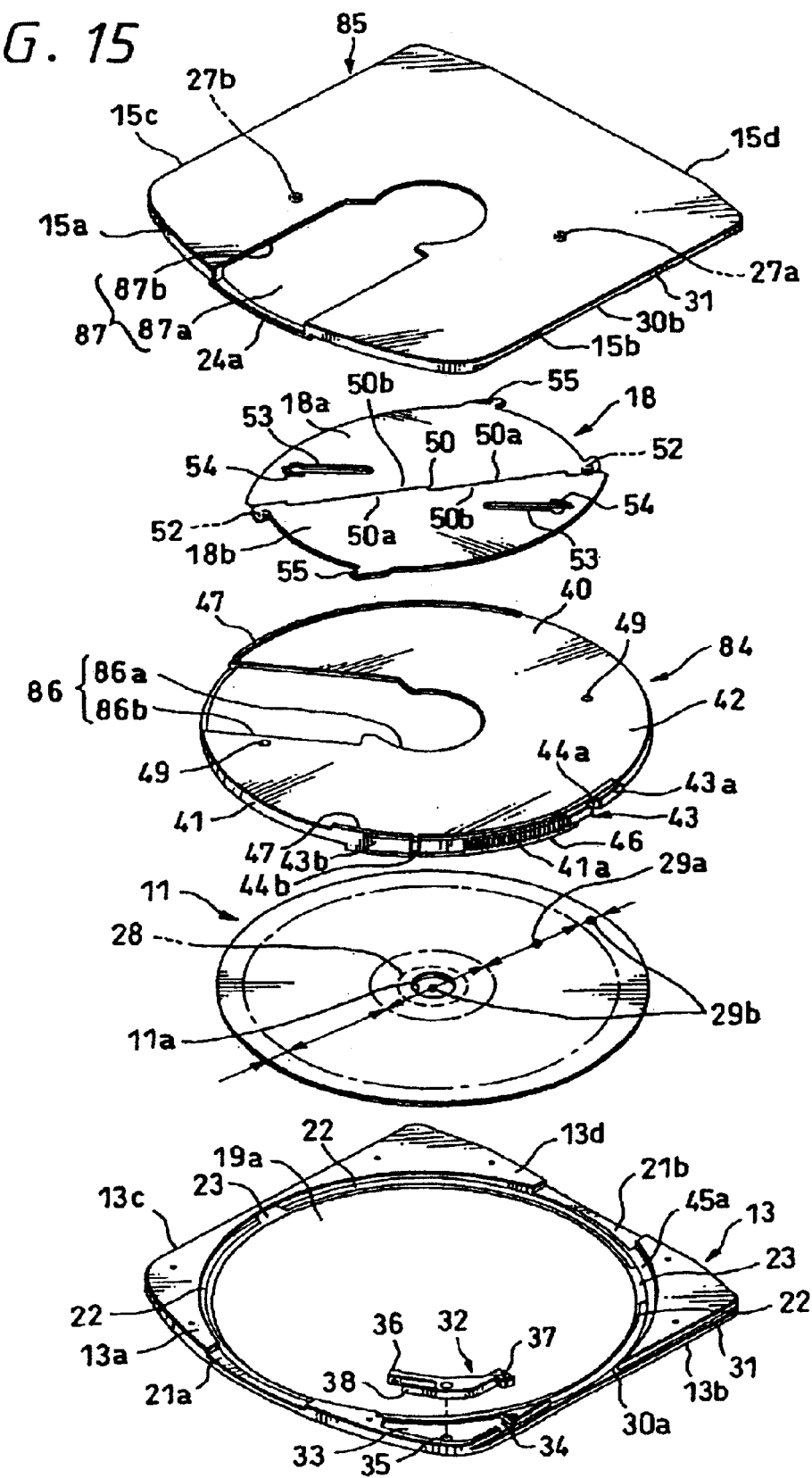
FIG. 15 is an exploded perspective view of the disc cartridge according to a second embodiment of the present invention, viewed from the side of the bottom face.
Figure 16:
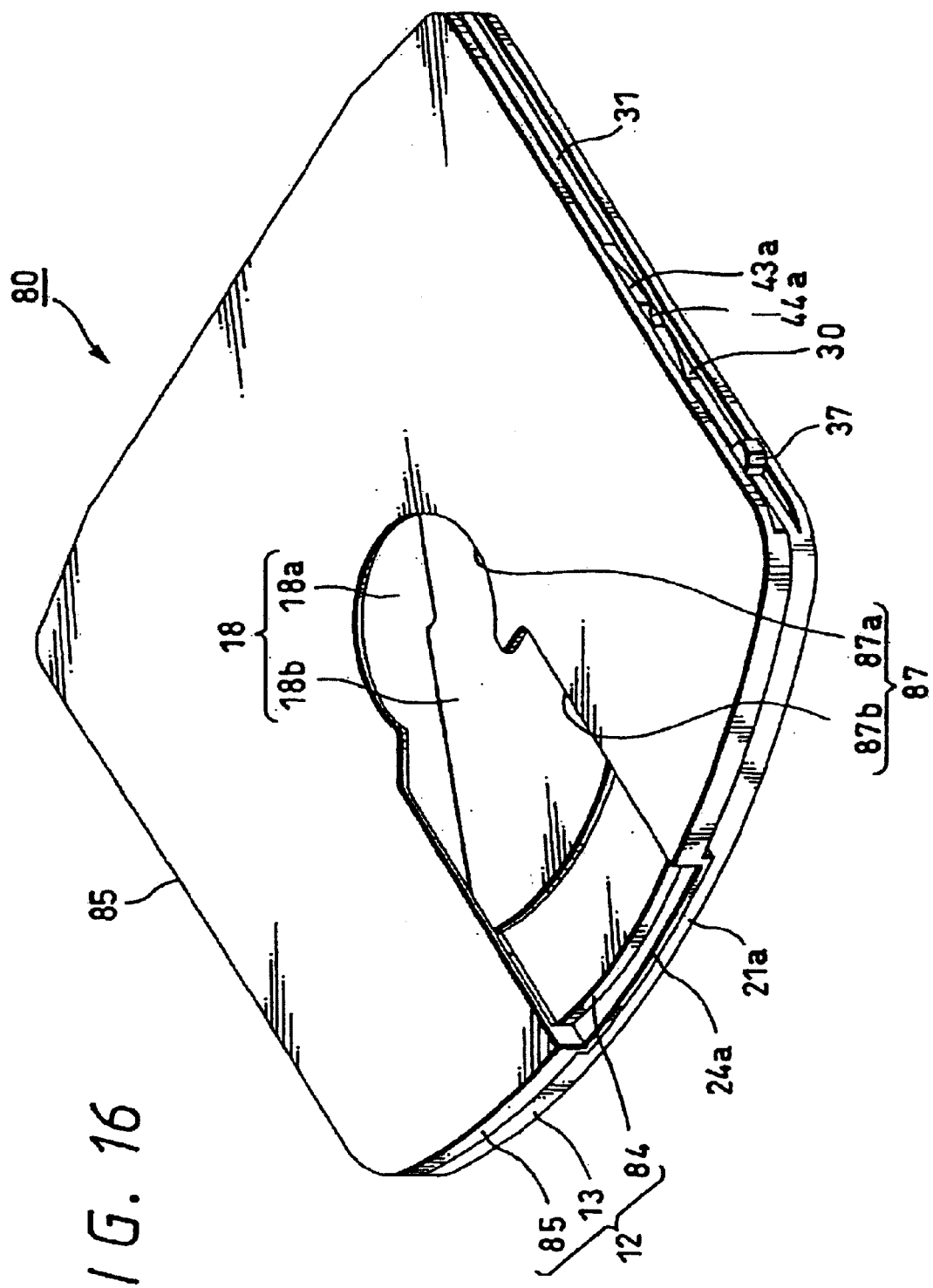
FIG. 16 is a perspective view of the disc cartridge shown in FIG. 15 viewed from the side of the bottom face, showing a state in which the opening portion is kept closed by closing the shutter mechanism.
Figure 17:
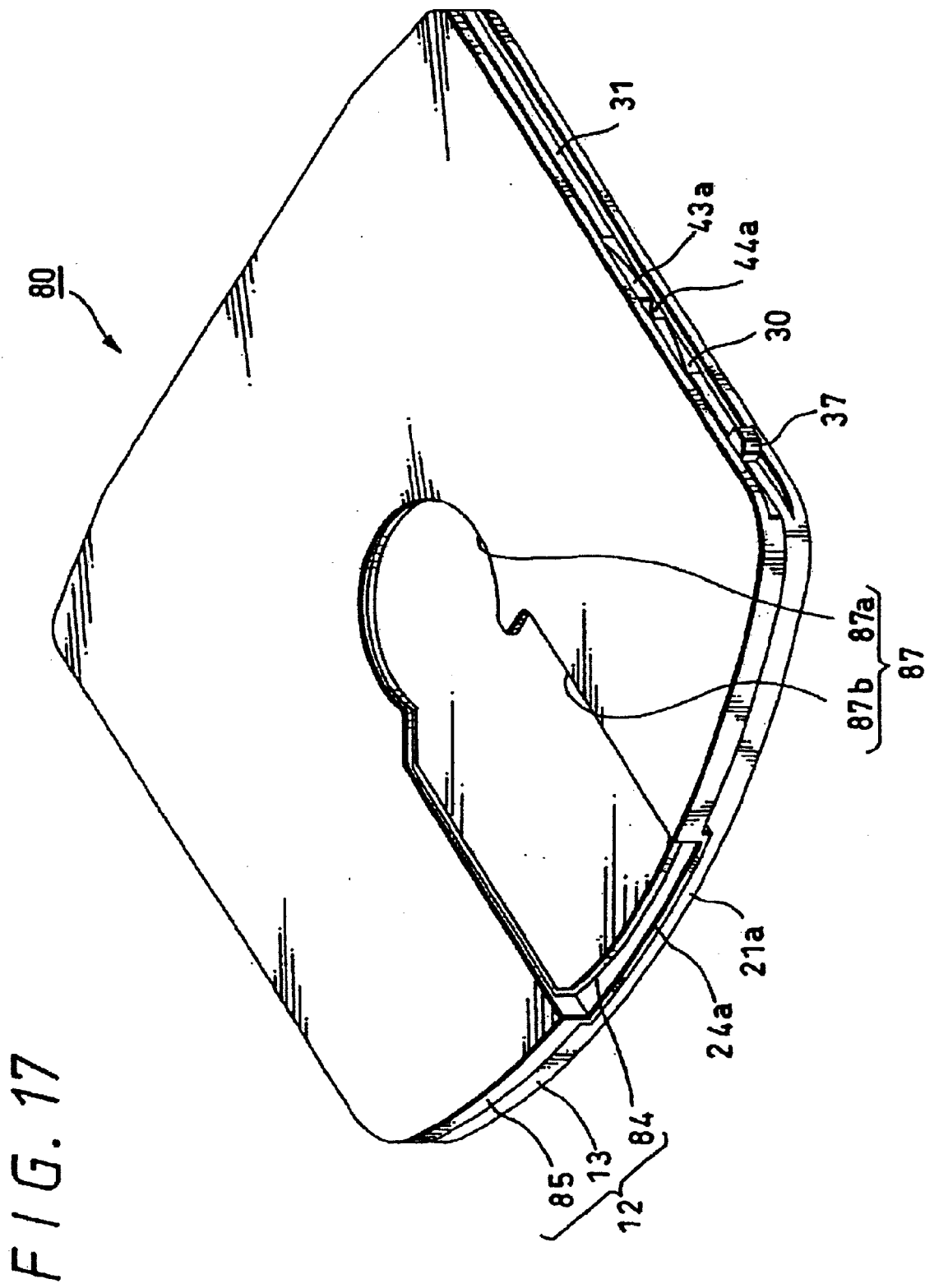
FIG. 17 is a perspective view of the disc cartridge shown in FIG. 15 viewed from the side of the bottom face, showing a state in which the opening portion is kept open by opening the shutter mechanism.
Figure 18:
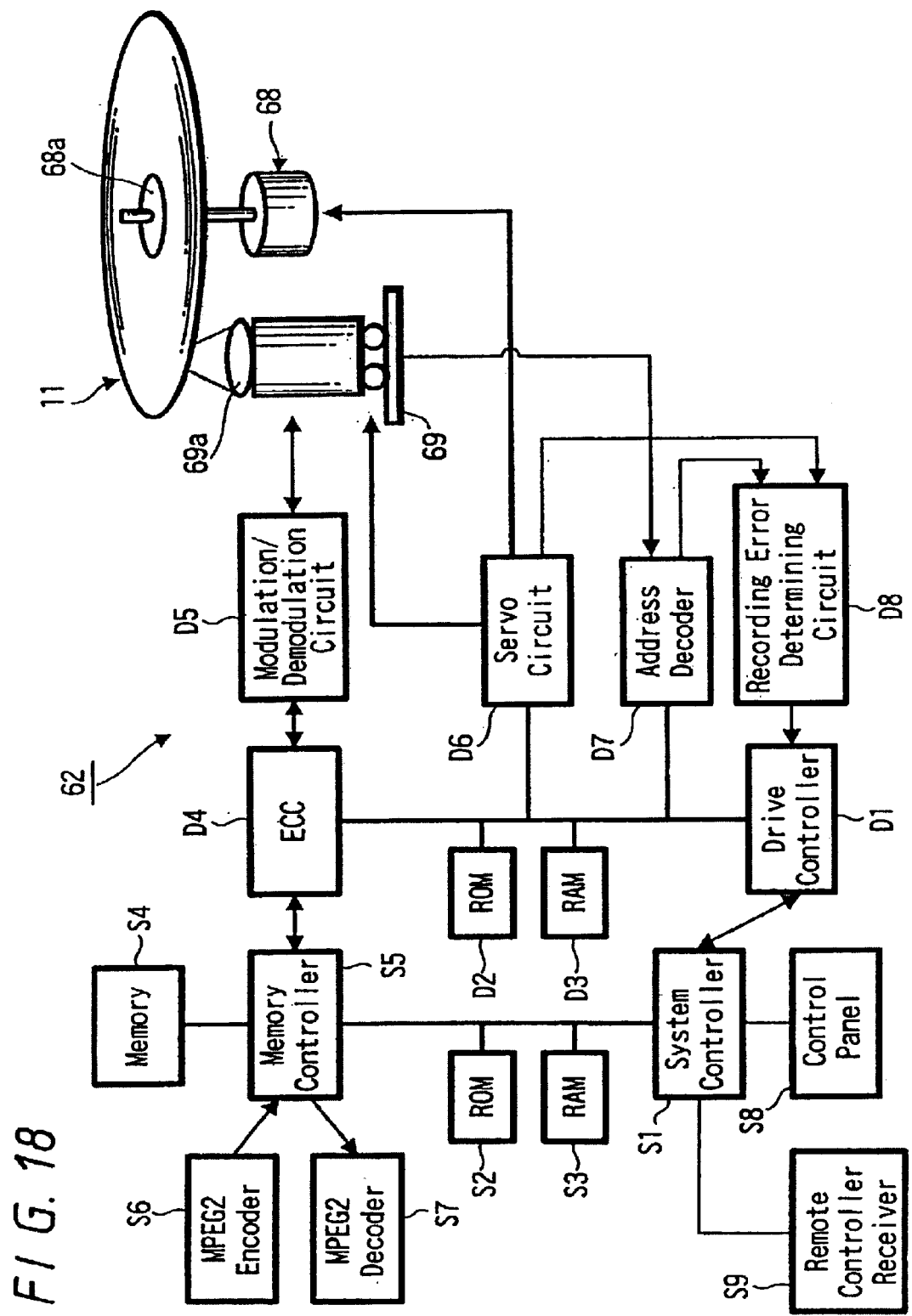
FIG. 18 is a block diagram showing an embodiment of a circuit configuration of a disc recording/reproducing apparatus employing the disc cartridge of the present invention.
Figure 19:
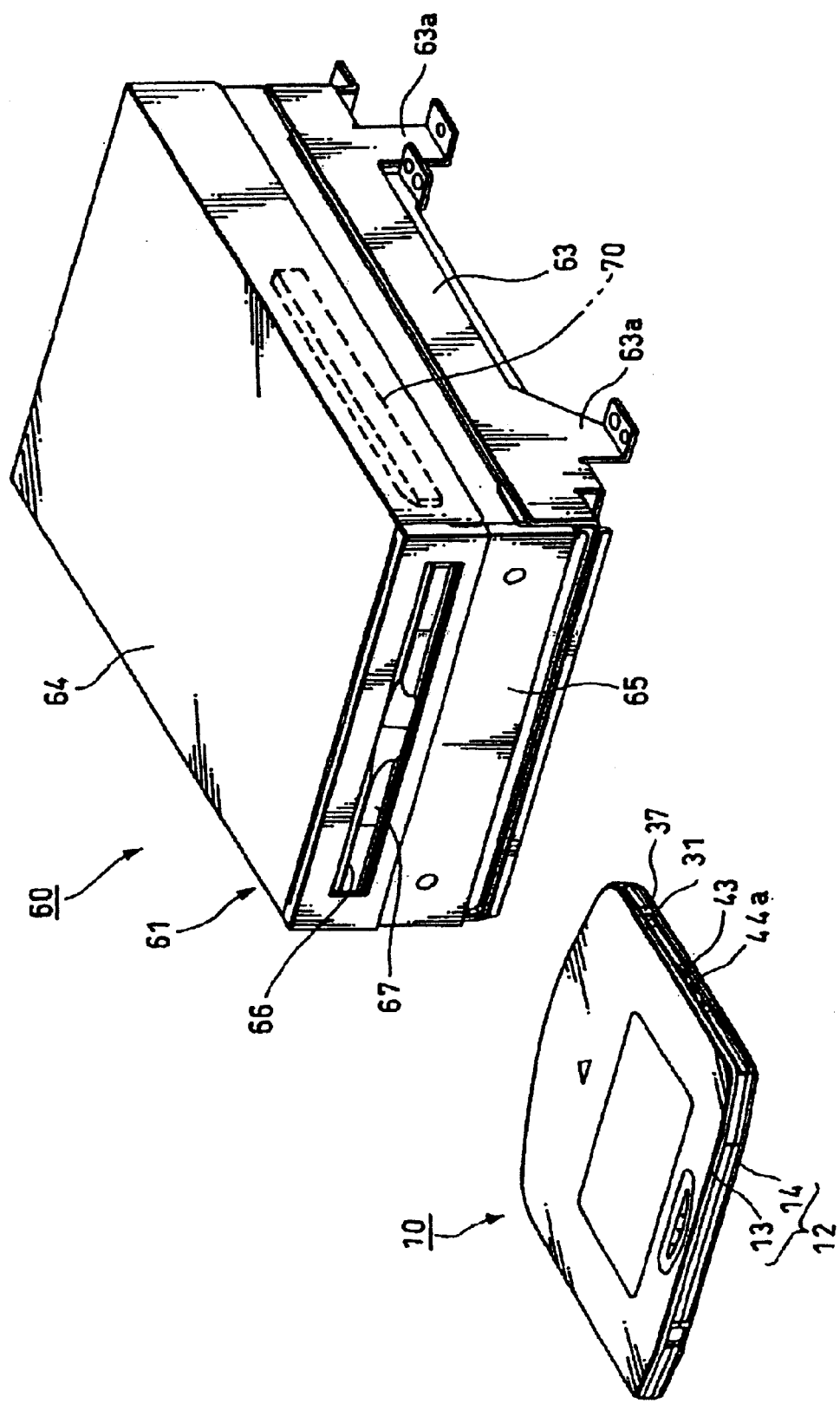
FIG. 19 is a perspective view showing a state before the disc cartridge shown in FIGS. 1, 15 is inserted into the disc recording/reproducing apparatus employing the disc cartridge of the present invention.
Figure 20:
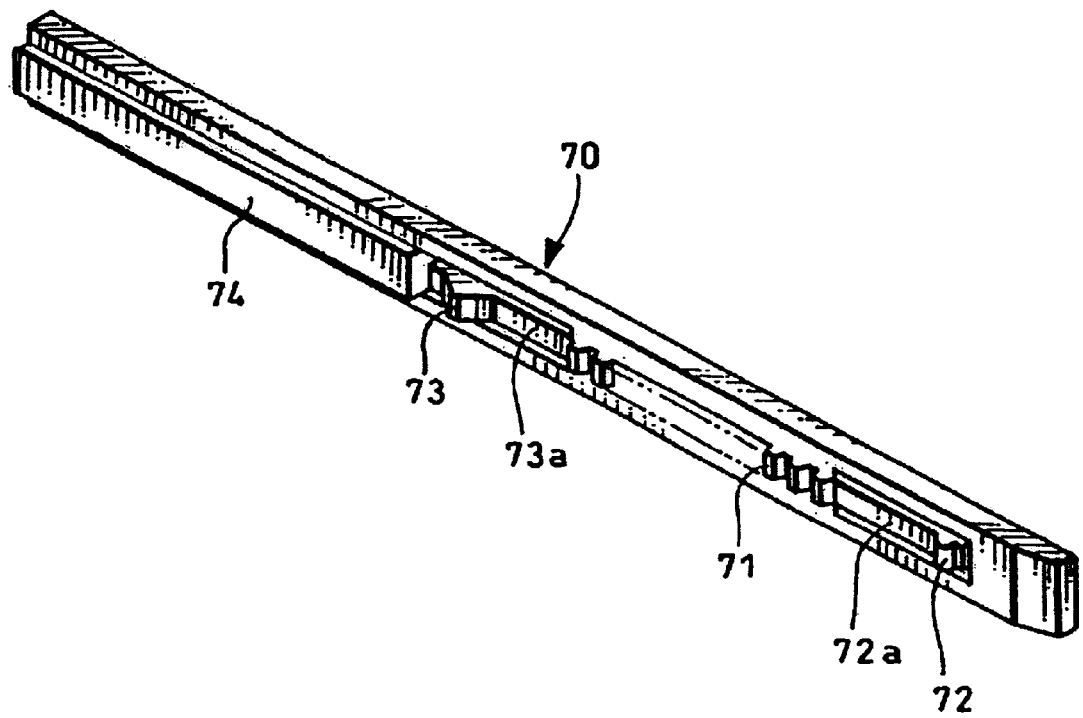
FIG. 20 is a perspective view showing an embodiment of a shutter opening/closing means of the disc recording/reproducing apparatus shown in FIG. 19.
Figure 21:
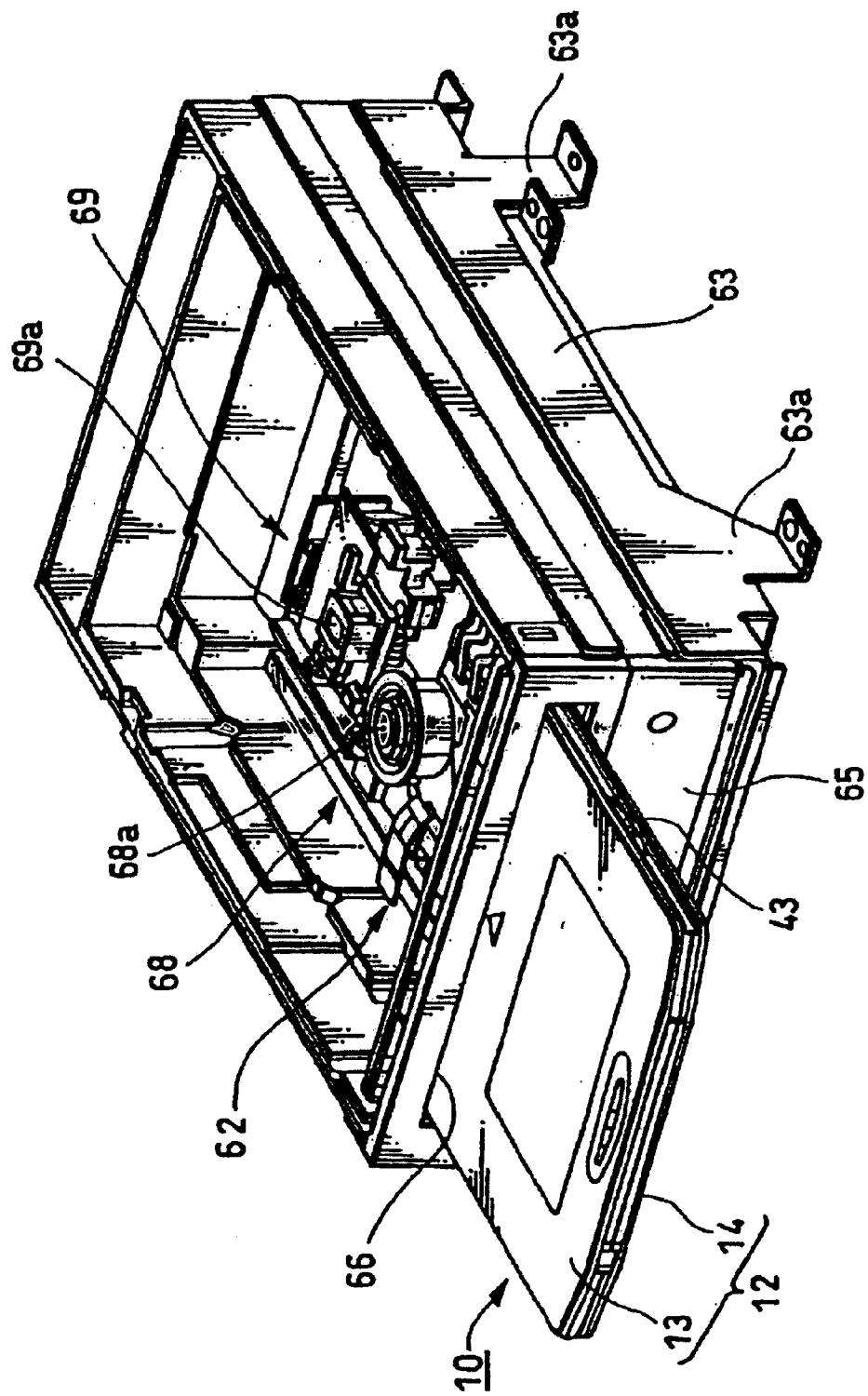
FIG. 21 is a perspective view showing a state in which the disc cartridge shown in FIGS. 1, 15 is inserted into the disc recording/reproducing apparatus employing the disc cartridge of the present invention.

FIG. 15 is an exploded perspective of the disc cartridge according to a second embodiment of the present invention, viewed from the side of the lower shell. FIG. 16 is a perspective view from the side of the bottom face showing a state in which the shutter is kept closed. FIG. 17 is a perspective view showing a state in which the shutter is kept open. FIG. 18 is a block explanatory diagram showing an embodiment of a circuit structure of an information disc recording/reproducing apparatus capable of using the disc cartridge of the present invention. FIG. 19 is a perspective view showing a state before the disc cartridge of the present invention is inserted into the disc recording/reproducing apparatus. FIG. 20 is a perspective view of a shutter opening/closing means shown in FIG. 19. FIG. 21 is a perspective view showing a state in which the disc cartridge is being inserted into the disc recording/reproducing apparatus.

FIGS. 22–41 are explanatory diagrams showing relations between advance/retreat of the shutter opening/closing means and rotation of a driven portion of the intermediate shell, depending on the opening/closing state of the shutter. FIGS. 22–26 are explanatory diagrams showing an engagement between the shutter opening/closing means and the driven portion when the shutter is completely closed. FIGS. 27–31 are explanatory diagrams showing an engagement between the shutter opening/closing means and the driven portion when the shutter is incompletely closed. FIGS. 32–36 are explanatory diagrams showing an engagement between the shutter opening/closing means and the driven portion when the shutter is completely opened. FIGS. 37–41 are explanatory diagrams showing a state in which the disc cartridge is discharged.

As a disc-shaped recording medium, the disc cartridge 10 shown in the first embodiment contains a reproduction dedicated type optical disc in which music signals as audio information or video, music and other information signals as video information are recorded preliminarily or a recordable optical disc 11 which allows information signals such as audio information and video information to be recorded only once (additionally writable type) or to be recorded repeatedly (rewritable type). However, the disc-shaped recording medium is not restricted to this example, but it is permissible to apply a magnetic disc in which magnetic thin film is formed on the surface of a thin disc so that information is recorded with magnetization state of a specific position, an optomagnetic disc in which information is written into a magnetic thin film formed in the same way or read out with an optical head and a magnetic head and other disc-shaped storage medium.

As shown in FIGS. 1–3, this disc cartridge 10 comprises a cartridge case 12 composed by overlaying a pair of upper shells 13, a pair of intermediate shells 14 and a pair of lower shells 15, an optical disc 11 accommodated freely rotatably in a disc accommodation chamber 16, and a pair of shutter members 18a, 18b for opening/closing opening portions 25, 42 formed in the intermediate shell 14 and the lower shell 15. Although usually, this disc cartridge 10 is disposed such that the upper shell 13 faces upward when the optical disc 11 is used horizontally, its vertical direction is inverted in FIG. 1 for convenience for explanation, so that it is expressed such that the upper shell 13 faces downward.

The upper shell 13 is composed of a substantially rectangular thin dish-like member whose front side is formed in a circular shape as shown in FIGS. 1, 4. In the center portion of a bottom face (face expressed as a front face in FIG. 1) of this upper shell 13 is provided a circular upper concave portion 19a, which substantially upper half of the intermediate shells 14 in the thickness direction is engaged with rotatably. By the provision of this upper concave portion 19a, a front edge portion 13a, right and left edge portions 13b, 13c and rear edge portion 13d are provided on an outer periphery of the upper shell 13. Positioning concave portions 21a, 21b for performing positioning with respect to the lower shells 15 are provided substantially in the center portion of each of the front edge portion 13a and rear edge portion 13d of this upper shell 13.

Circular cam grooves 22, continuous in a predetermined length, are provided in three positions disposed at the same interval in the peripheral direction of the outer edge of the upper concave portion 19a in the upper shell 13. Then, by the provision of the cam grooves 22 in three positions, lift-up portions 23 (hatched portions in FIG. 4) of a predetermined length are provided at three positions between the adjacent cam grooves 22, 22. Cam portions 46 provided on the intermediate shell 14 are fit to the cam grooves 22 at the three positions.

The lower shells 15 are overlaid on the bottom face of the upper shells 13. As shown in FIGS. 1, 6, the outer shape of the lower shell 15 is substantially the same as that of the upper shell 13 and the lower shell 15 is composed of a substantially rectangular thin dish-like member whose front side is formed in a circular shape. In the center portion of a plane (face hidden as a rear face in FIG. 1) of the lower shell 15 is provided a circular lower concave portion 19b, which substantially lower half of the intermediate shell 14 in the thickness direction is engaged rotatably. By the provision of this lower concave portion 19b, front edge portion 15a, right and left side edge portions 15b, 15c and rear edge portion 15d are provided in the outer periphery of the lower shell 15. Substantially in the center portion of each of the front edge portion 15a and the rear edge portion 15d of this lower shell 15 are provided positioning convex portions 24a, 24b for conducting positioning with respect to the upper shells 13.

By engaging the convex portions 24a, 24b on the lower shell 15 with the concave portions 21a, 21b in the upper shell 13, positioning of the upper and lower shells 13, 15 are carried out so that they are overlaid. The intermediate shell 14 is accommodated freely rotatably in a circular space formed of the upper and lower concave portions 19a, 19b formed in the upper and lower shells 13, 15. An opening portion 25 extending in the back and forth direction is provided in the center portion of this lower shell 15. This opening portion 25 allows a turn table of the disc driving unit and an optical head of the optical pickup device to face the optical disc 11 and is set to be so wide that these units are capable of entering or going out freely.

The opening portion 25 in the lower shell 15 is comprised of an opening portion for table 25a set up in the center portion through which the turn table is entering or going out and an opening portion for head 25b extending on both sides in the back and forth direction of this opening portion for table 25a. The shape of this opening portion 25 is so designed that the optical head can be brought into/out of each of both sides of the opening portion for table 25a in the opening portion for head 25b. On inside faces of both sides in the back and forth direction of the opening portion for head 25b are provided shielding portions 26a, 26b for clogging a gap between the shutter members 18a and 18b, which will be described later. Further, a pair of operating convex portions 27a, 27b are provided symmetrically with respect to the opening portion for table 25a within the lower concave portion 19b.

The intermediate shell 14 is accommodated in the upper and lower concave portions 19a, 19b formed of the upper shell 13 and the lower shell 15 having such a structure. A disc-accommodating chamber 16 composed of a circular space is formed of this intermediate shell 14 and the upper shell 13. In this disc accommodating chamber 16 is accommodated an optical disc 11 such that a predetermined gap exists outside in the radius direction and in the thickness direction. This optical disc 11 is composed of a thin circular recording member having a center hole 11a in the center portion thereof.

A center hub 28 is fixed on a face in the center portion of this optical disc 11 with fixing means such as adhesive agent as if it covers a center hole 11a. This center hub 28 is formed of magnetic material such as an iron plate, which is attracted by a magnet. A turntable of a disc driving unit incorporated in the disc recording/reproducing apparatus is fit to this center hub 28 through the center hole 11a. The center hub 28 is attracted by magnetic force of the magnet provided on the turntable. Consequently, the optical disc 11 is caught by the turn table so that it is integrated therewith in the rotation direction and then, it is rotated at a predetermined velocity (for example, constant linear velocity) by a spindle motor on which this turn table is mounted.

On a plane of this optical disc 11 are provided an information recording region 29a which the optical head of the optical pickup unit accommodated in the disc recording/reproducing apparatus faces and is capable of recording information and a non-recording region 29b incapable of recording information. The non-recording region 29b is comprised of an inner non-recording region 29b provided outside of the center hub 28 inside the optical disc 11 with a predetermined width and an outer non-recording region 29b provided on an outer periphery of the optical disc 11 with a predetermined width. The information recording region 29a is provided between the inner and outer non-recording regions 29b and 29b. Although the substrate of this optical disc 11 is preferred to be formed of synthetic resin such as polycarbonate (PC) and polyolefine, it is needless to say that other synthetic resins can be employed and as other materials than the synthetic resin, various materials such as glass material and aluminum alloy for use as information recording medium can be employed.

An opening window 30 is provided substantially in the center portion of each of a side edge portions 13b, 15b of each of the upper and lower shells 13, 15 so as to expose part of an external peripheral face of the intermediate shell 14. This opening window 30 is formed of an upper side cutout portion 30a provided in a joint portion of the upper shell 13 and a lower side cutout portion 30b provided in a joint portion of the lower shell 15. A guide groove 31 is provided in each of the side edge portions 13b, 15b of the upper and lower shells 13, 15 such that it extends in the back and forth direction along the joint face. A shutter opening/closing means, which will be described later, is inserted into this guide groove 31 and takes a function for preventing an error of insertion of the disc cartridge 10 into the disc recording/reproducing apparatus. The guide groove 31 communicates with the opening window 30.

A lock accommodating portion 33, in which a lock member 32 is accommodated rotatably, is provided in a front corner portion of each of the side edge portions 13b, 15b in the upper and lower shells 13, 15. This lock accommodating portion 33 communicates with the concave portions 19a, 19b while communicating with the guide groove 31 through an opening hole 34 provided in each of the side edge portions 13b, 15b. Further, in the lock accommodating portion 33 in the upper shell 13 is provided a supporting shaft 35 for supporting the lock member 32 rotatably such that it is protruded toward the side of the lower shell 15.

As shown in FIG. 1, this lock member 32 is formed of a lever-like member, which is fit to the supporting shaft 35 rotatably so that it is capable of swinging in the direction of the plane. This lock member 32 has a protrusion-like stopper portion 36 provided at an end in the longitudinal direction and a protrusion-like input portion 37 at the other end in the londitudinal direction. Further, a spring piece 38 is provided on the lock member 32 protrudedly in the same direction such that it opposes the stopper portion 36.

The lock member 32 is fit to the supporting shaft 35 in a condition that the stopper portion 36 is directed toward the concave portions 19a, 19b and the spring piece 38 is kept in contact with an inner face of each of the front edge portions 13a, 15a. The stopper portion 36 is urged to the concave portions 19a, 19b by a spring force of this spring piece 38 and as a reaction thereof, the input portion 37 is protruded from inside into the guide groove 31 through the opening hole 34. Consequently, the stopper portion 36 is engaged with a setting position concave portion 44b provided in a rear sliding portion 43b in the driven portion 43, which will be described later, in the intermediate shell 14. As a result, the intermediate shell 14 is locked by the lock member 32 so that rotation thereof is prevented.

The intermediate shell 14, which is rotatably fit to the upper and lower concave portions 19a, 19b in the upper shell 13 and the lower shell 15, has the structure shown in FIGS. 1, 5. This intermediate shell 14 has a flat plane portion 40 composed of a thin circular material and a ring portion 41 provided continuously on an outer periphery of this flat plane portion 40. The flat plane portion 40 of the intermediate shell 14 is comprised of a pair of semicircular pieces 40a, 40a formed in a substantially semicircular shape and by providing a gap between chords of both the semicircular pieces 40a, 40a, the opening portion 42 is formed. This opening portion 42 is substantially the same as the opening portion 25 in the lower shell 15 in shape and size.

That is, the opening portion 42 is comprised of an opening portion for table 42a, which is set up in the center portion of the flat plane portion 40 and the turn table is brought in/out and opening portions for head 42b, 42b, which are set up on both sides in the diameter direction of the opening portion for table 42a and each of the optical heads opposes. On an inner periphery of the flat plane portion 40 surrounding the periphery of the opening portion for table 42a is provided a supporting edge portion 40b for supporting the inner non-recording region 29b on the optical disc 11 in its free state.

Further, the driven portion 43, which is engaged with the shutter opening/closing means and rotates the intermediate shell 14 in a predetermined angle range by its reciprocation, is provided in part of an outer peripheral face of the ring portion 41 of the intermediate shell 14. As shown in FIGS. 5, 8, this driven portion 43 is comprised of a gear portion 41a having a plurality of teeth throughout a predetermined range (substantially about 30°) in the circumferential direction, a front sliding portion 43a provided continuously on a side of this gear portion 41a and a rear sliding portion 43b provided continuously on the other side of the gear portion 41a.

The outer peripheral face of the front sliding portion 43a of the driven portion 43 is set up at substantially the same height as a tooth point circle of the gear portion 41a. The outer peripheral face of the rear sliding portion 43b is set up at substantially the same height as the tooth root circle of the gear portion 41a. Then, an initial action concave portion 44a made of a cutout whose section is semicircle, is provided substantially in the center portion of the front sliding portion 43a in the circumferential direction. A set position concave portion 44b, made of a cutout whose section is trapezoidal, is provided substantially in the center of the rear sliding portion 43b in the circumferential direction. Because the gear portion 41a and the front/rear sliding portions 43a, 43b of the driven portion 43 are provided so as to protrude outside from the outer peripheral face of the ring portion 41, recess grooves 45a, 45b, which avoid a contact with the sliding portions 43a, 43b to allow them to pass, are provided in corresponding portions of the upper shell 13 and the lower shell 15.

Front and rear stop portions 45c, 45d are provided on both ends of the recess groove 45b in the lower shell 15 such that they are protruded on each moving trail of the sliding portions 43a, 43b. When a rear end of the rear sliding portion 43b comes into contact with this front stop portion 45c, the intermediate shell 14 undergoes displacement by rotation at its maximum angle to the lower shell 15 so that the opening portion 25 is shifted most largely from the opening portion 42. On the other hand, when a front end of the front sliding portion 43a comes into contact with the rear sliding portion 45d, the intermediate shell 14 is returned to its initial position so that the opening portion 25 and the opening portion 42 are opened in their overlapping condition.

Circular cam portions 46 (portion expressed with a plurality of dots in FIG. 5) continuous in a predetermined length are provided at three positions in the circumferential direction such that each of the cam portions 46 exists on one face of each ring portion 41 of the intermediate shell 14. When the intermediate shell 14 is assembled to the upper shell 13, these cam portions 46 are engaged with the cam grooves 22 at three positions in the upper shell 13. If the intermediate shell 14 is rotated by a predetermined angle, each cam portion 46 rides over the lift-up portion 23 of each of the three positions.

Circular protruded portions 47, which are protruded to an opposite direction to the cam portion 46, are provided at two positions such that each of the protruded portions 47 exists on the other end face of each ring portion 41 of the intermediate shell 14. These protruded portions 47, 47 restrict a pair of the shutter members 18a, 18b from moving outward in the radius direction. Further, a pair of supporting holes 49, 49 for supporting a pair of the shutter members 18a, 18b rotatably in the direction of the plane are provided in the flat plane portions 40 of the intermediate shell 14. This pair of the supporting holes 49, 49 are provided in one edge portion of each of the opening portions for head 42b, 42b, such that they are symmetrical with respect to the opening portion for table 42a.

Figure 22:
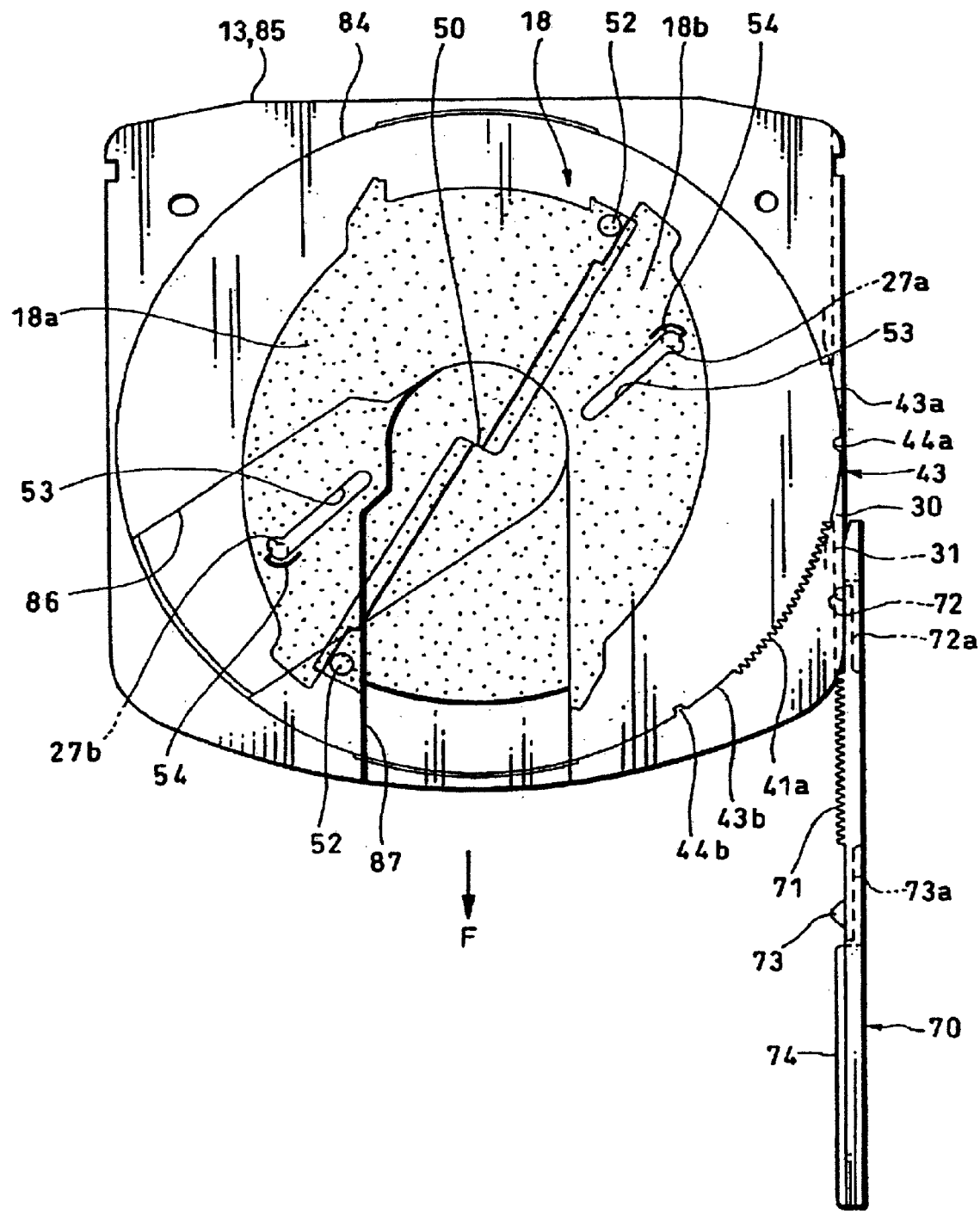
FIG. 22 is an explanatory diagram showing an action of the shutter opening/closing means when the shutter mechanism of the disc cartridge shown in FIG. 15 is completely closed, indicating a state before the initial action convex portion reaches the opening window.

AS shown in FIG. 22 and the like, the intermediate shell 14 having such a structure is assembled in a predetermined positional relationship to the lower shell 15 and the upper shell 13. That is, when assembling the cartridge case 12, the opening portion 42 of the intermediate shell 14 is overlaid on the opening portion 25 of the lower shell 15. At this time, the front sliding portion 43a provided continuous with one side of the gear portion 41a in the driven portion 43 of the intermediate shell 14 is disposed in the opening window 30 in the cartridge case 12. Therefore, the initial action concave portion 44a is provided substantially in the center portion of the opening window 30.

If the intermediate shell 14 is rotated by a predetermined angle from this state, the opening portion 42 comes to tilt at maximum with respect to the opening portion 25. When the opening portion 42 is closed completely by a pair of the shutter members 18a, 18b, the rear sliding portion 43b provided continuous to the other side of the gear portion 41a is moved to the opening window 30. Consequently, the set position concave portion 44b is provided substantially in the center of the opening window 30.

The shutter mechanism 18, which is installed onto this intermediate shell via a pair of the supporting holes 49, 49, is comprised of a pair of the shutter members 18a, 18b each having the same shape and size. A pair of the shutter members 18a, 18b has a shape and a structure shown in FIGS. 7, 8. That is, a pair of the shutter members 18a, 18b is formed of a substantially semicircular, thin plates. A step portion 50, formed in a predetermined length in a direction perpendicular to the chord, is provided substantially in the center portion of the chord of each of the shutter members 18a, 18b. A convex joint portion 50a and a concave joint portion 50b are formed on both sides of this step portion 50.

Hood portions 51a, 51b, which are protruded in the form of hood in a direction perpendicular to extension of the chord, are provided in each of the joint portions 50a, 50b of the shutter members 18a, 18b. Consequently, in the pair of the shutter members 18a, 18b, an end face of the convex side joint portion 50a and an end face of the concave side joint portion 50b are made to oppose each other and then, the hood portion 51a of the convex side joint portion 50a is overlaid on the hood portion 51b of the concave side joint portion 50b. Shaft portions 52, which are protruded to the side of each of the hood portions 51a, 51b, are provided in shaft mounting portions 50c which are end portions of the convex side joint portions 50a on the chords of the shutter members 18a, 18b.

By fitting the shaft portions 52 into the supporting holes 49 in the flat plane portions 40, the respective shutter members 18a, 18b are mounted rotatably in the intermediate shell 14. At this time, a pair of the shutter members 18a, 18b are installed such that their chord sides oppose each other. As a result, if the pair of the shutter members 18a, 18b are rotated such that they intend to leave outward as shown in FIG. 7, the respective shutter members 18a, 18b are placed on the semicircular pieces 40a as if they are hidden. On the other hand, if the pair of the shutter members 18a, 18b are rotated inward so that the joint portions 50a, 50b are made into contact with each other, as shown in FIG. 8, the center portion of the opening portion 42 is sealed by the pair of the substantially circular shutter members 18a, 18b.

Further, an opening/closing groove 53 for opening/closing the shutter members 18a, 18b is provided in the concave side joint portion 50b in each of the shutter members 18a, 18b. Each of the opening/closing grooves 53 is extended in a radial direction with respect to the shaft portion 52 of each of the shutter members 18a, 18b. The operating convex portions 27a, 27b of the lower shell 15 are slidably engaged with the opening/closing grooves 53. Further, on an end portion of each of the opening/closing grooves 53 is provided an elastic piece 54, which is formed by incising the periphery thereof and a concave portion 53a for allowing each of the operating convex portions 27a, 27b to escape.

Further, a closing piece 55 is provided on a circular side of each of the shutter members 18a, 18b. This closing piece 55 closes a gap formed after the shaft portion 52 is moved in a condition that the shutters are closed. The shutters are moved from shutter open state shown in FIG. 9 to shutter closing state shown in FIGS. 10, 11 so as to close the gaps thereby preventing dust, dirt and the like from infiltrating into the cartridge case 12.

The upper shell 13, the intermediate shell 14, the lower shell 15, and the shutter members 18a, 18b are preferred to be formed of synthetic resin such as acrylonitrile, butadiene, styrene resin (ABS resin), high impact polystyrene (HIPS). However, not only other engineering plastic can be applied, but also aluminum alloy, stainless steel and other metals can be employed.

Although not shown, it is permissible for the disc cartridge 10 to provide a rear corner of the cartridge case 12 with an erroneous deletion preventing mechanism for preventing erroneous deletion of information recorded in a recording medium such as an optical disc. This erroneous deletion preventing mechanism may be so constructed with an operation window for opening a rear face of the cartridge case 12, an erroneous deletion preventing piece mounted on this operation window so as to be capable of opening/closing this operation window and the like.

The disc cartridge 10 having such a structure can be assembled easily, for example, in a following manner. The assembly of this disc cartridge 10 is carried out in a condition that the upper shell 13 is disposed at the bottom as shown in FIG. 1. First, an optical disc 11 is placed within the upper side concave portion 19a in the upper shell 13. At this time, the optical disc 11 is accommodated in the upper side concave portion 19a such that a face having the center hub 28 is directed downward.

Next, the opening side of the intermediate shell 14 is fit to the upper side concave portion 19a as if it covers the optical disc 11. Consequently, the optical disc 11 is accommodated rotatably in the disc-accommodating chamber 16 formed by the intermediate shell 14 and the upper shell 13. At this time, the intermediate shell 14 makes the direction of extension of the opening portion 42 agree with the back and forth direction of the upper shell 13, so that the front sliding portion 43a of the driven portion 43 faces the opening window 30.

Next, the intermediate shell 14 is assembled in the shutter mechanism 18. With a pair of the shutter members 18a, 18b placed such that their chords oppose each other, the shaft portions 52 are fit into the supporting holes 49 in the flat plane portions 40. Then, by moving the respective shutter members 18a, 18b to depart from each other, they are overlaid on the semicircular pieces 40a of the intermediate shell 14.

At the same time or before/after this, the lock member 32 is mounted on the supporting shaft 35 of the lock accommodating portion 33. At this time, the spring piece 38 of the lock member 32 is brought into contact with an inner face of the front edge portion 13a of the upper shell 13, so that the input portion 37 is protruded into the guide groove 31 through the opening hole 34 by a spring force of this spring piece 38.

Next, the lower shell 15 is placed on the intermediate shell 14 containing the shutter mechanism 18 and then this lower shell 15 is overlaid on the upper shell 13. At this time, the positioning convex portions 24a, 24b of the lower shell 15 are fit to the positioning concave portions 21a, 21b in the upper shell 13. Consequently, the lower shell 15 is automatically positioned relative to the upper shell 13. At this time, by disposing a pair of the shutter members 18a, 18b at the aforementioned position, a pair of the operating convex portions 27a, 27b provided in the lower side concave portion 19b in the lower shell 15 can be made to oppose a pair of the opening/closing grooves 53. Thus, only if the lower shell 15 is overlaid on the upper shell 13 without heeding the positions of a pair of the opening/closing grooves 53, a pair of the operating convex portions 27a, 27b can be engaged with a pair of the opening/closing grooves 53.

After that, the lower shell 15 is fixed to the upper shell 13 by tightening plural fixing screws. Consequently, the assembly work of the disc cartridge 10 having a sectional structure shown in FIG. 12 is completed. In this case, it is permissible to couple the joint face of the upper shell 13 directly with the joint face of the lower shell 15 with adhesive agent or the like without using a fixing means comprised of the fixing screws and the like. In the disc cartridge 10 according to this embodiment, the assembly work can be carried out easily with a small number of components.

FIGS. 15–17 show a second embodiment of the present invention. A disc cartridge 80 indicated in this embodiment is single head type for use in a disc recording/reproducing apparatus having an optical head. As evident from FIG. 15, this disc cartridge 80 is different from the disc cartridge 10 shown in FIG. 1 and the like only in the shape of the opening portion 86 in the intermediate shell 84 and the shape of the opening portion 87 in the lower shell 85 and the other shapes and structure are the same. Therefore, like reference numerals are attached to the same components as FIG. 1 and a description thereof is omitted. Then, only the opening portions 86, 87 of different structures will be described.

In the opening portion 86 in the intermediate shell 84, only the opening portion for head 42b on one side is abolished from the opening portion 42 in the intermediate shell 14 described above. That is, the opening portion 86 is comprised of an opening portion for table 86a, which is provided in a circular form in the center portion and an opening portion for head 86b, which is extended outward in a radius direction from this opening portion for table 86a in a substantially rectangular shape and reaches a front edge portion of the shell. Further, in the opening portion 87 in the lower shell 85 also, like in case of the opening portion 86 in the intermediate shell 84, the opening portion 25b for head on one side is abolished from the opening portion 25 in the lower shell 15. That is, the opening portion 87 is comprised of an opening portion for table 87a, which is provided in the center portion in a circular shape and an opening portion for head 86b, which is extended forward from the opening portion for table 87a in a substantially rectangular shape and reaches a front edge of the shell.

By employing the intermediate shell 84 and the lower shell 85 for a single head instead of the intermediate shell 14 and the lower shell 15 for two heads, not only stiffness of the cartridge case 12 can be enhanced but also dust resistance can be improved. Further, only by changing the intermediate shell 84 and the lower shell 85 from the one head type to the two head type, manufacture of the disc cartridge can be made to correspond to the one head type and the two head type easily, so that common use of manufacturing and assembly line is enabled thereby meeting consumer's demand appropriately.

The disc cartridges 10, 80 having the above-described structures are kept in states shown in FIGS. 2, 16 before they are loaded on the disc recording/reproducing apparatus. That is, a pair of the shutter members 18a, 18b of the shutter mechanism 18 are fixed at initial position because the intermediate shells 14, 84 are locked by the lock member 32. Thus, the opening portions 25, 87 in the lower shells 15, 85 and the opening portions 42, 86 in the intermediate shells 14, 84 are kept completely closed. Further, the cam portions 46 at three positions in each of the intermediate shells 14, 84 jump out from the cam grooves 22 at three positions in the upper shell 13 so that they ride over the lift-up portion 23. Consequently, a pair of the shutter members 18a, 18b are nipped from both sides by the intermediate shell 14 and the lower shell 15 as shown in FIG. 14A.

As a result, a pair of the shutter members 18a, 18b are double locked by the nipping mechanism based on lift-up action of the cam and the lock mechanism of the lock member 32. Therefore, the closing condition of the opening portions 25, 87 in the lower shells 15, 85 and the opening portions 42, 86 in the intermediate shells 14, 84 by the shutter mechanism 18 can be held securely, thereby preventing the shutter mechanism 18 from being opened erroneously due to vibration or the like.

If the disc cartridges 10, 80 each in such a state are inserted into the disc recording/reproducing apparatus shown in FIGS. 19, 21, lock of the lock member 32 is released by the shutter opening/closing means provided on this disc recording/reproducing apparatus 60. After that, the shutter mechanism 18 is released by this shutter opening/closing means so that the opening portions 25, 42 (or 86, 87) are opened. The opening/closing operations of this shutter mechanism 18 will be described in detail later.

Next, the disc recording/reproducing apparatus will be described. As shown in FIGS. 19, 21, this disc recording/reproducing apparatus 60 comprises an external case 61 composed of a hollow case, a recording/reproducing apparatus main body 62 accommodated in this external case 61 and the like. The external case 61 is comprised of a case main body 63 which is open to top face and front face thereof, a case lid 64, which is mounted detachably to the top portion so as to close the top of the case main body 63, a front panel 65, which is mounted detachably to the front so as to close the front of the case main body 63 and the case lid 64.

Leg portions 63a protruded downward are provided at four positions of the case main body 63. The disc recording/reproducing apparatus 60 is supported by these leg portions 63 and installed at an appropriate place. The front panel 65 is made of a sheet-like member whose horizontal side is longer and has a horizontally extending cartridge port 66 in a top portion thereof. The cartridge port 66 is formed in substantially the same size as the front side of each of the disc cartridges 10, 80. This cartridge port 66 is always closed by an opening/closing door 67 disposed inside.

By pressing this opening/closing door 67 with a front portion of the disc cartridge 10, it is inserted up to a predetermined position as shown in FIG. 21. Consequently, the disc cartridge 10, 80 is automatically fetched in by a loading mechanism (not shown). Then, the disc cartridge 10, 80 carried by the loading mechanism is positioned and fixed at a predetermined position in the disc recording/reproducing apparatus 60. At the same time or after/before it, a shutter mechanism 18 is released by a shutter opening/closing means provided in the disc recording/reproducing apparatus 60 so as to open the opening portion 25, 42.

FIG. 20 shows a rack bar 70, which is a concrete example of this shutter opening/closing means. This rack bar 70 comprises a rack portion 71, which meshes with the gear portion 41a of the driven portion 43 in the intermediate shell 14, 84, an initial action convex portion 72 provided at a front end of this rack portion 71, a stopper convex portion 73 provided at a proximal end of the rack portion 71 and the like. The rack portion 71 of the rack bar 70 is formed on the midway of such a straight bar such that it is protruded from a side face and has substantially the same number of teeth as the gear portion 41a.

A front elastic piece 72a having an appropriate elasticity extending in the same direction as the rack bar 70 is provided at a front end of this rack portion 71. The initial action convex portion 72, protruded in the same direction as the teeth of the rack portion 71, is provided at a front end of this front elastic piece 72a. Further, a rear elastic piece 73a having appropriate elasticity extending in the same direction as the rack bar 70 is provided at a proximal end of the rack portion 71. The stopper convex portion 73 protruded in the same direction as the teeth of the rack portion 71 is provided at a front end of this rear elastic piece 73a. The stopper convex portion 73, the initial action convex portion 72 and the rack portion 71 are set up on the same line. A front empty shift portion is formed of the aforementioned front elastic piece 72a while a rear empty shift portion is formed of the rear elastic piece 73a.

The initial action convex portion 72 has a circular section and the size and height thereof are substantially the same as a tooth of the rack portion 71. On the other hand, the sectional shape of the stopper convex portion 73 is mountain-shaped like a tooth of the rack portion 71 and the size and height thereof are slightly larger. By providing the front and rear elastic pieces 72a, 73a with appropriate elasticity, the initial action convex portion 72 and the stopper convex portion 73 are allowed to retreat elastically. In FIG. 20, reference numeral 74 denotes a guide portion, which reinforces the rack bar 70 also. This guide portion 74 is engaged with the guide groove 31 in the disc cartridge 10, 80.

Rotation of the intermediate shell 14, 84 by an action of the rack bar 70 having such a structure and opening/closing action of the shutter mechanism 18 will be described in detail later.

If the opening portions 25, 42 (or 86, 87) are opened by an action of the rack bar 70 as shown in FIG. 12, the turn table 68a of a disc driving unit 68 and the optical head 69a of the optical pickup unit 69 enter into the opening portions 25, 42 (or 86, 87). Then, the turn table 68a engages with the center hole 11a in the optical disc 11 and the magnet contained in the turn table 68a attracts the center hub 28 so as to hold the optical disc 11. At the same time or before/after it, the optical head 69a approaches a predetermined position of the information recording region 29a in the optical disc 11. As a result, recording and reproduction of information signal to/from the optical disc 11 by the disc recording/reproducing apparatus 60 are enabled.

The recording/reproducing apparatus main body 62 of the disc recording/reproducing apparatus 60 comprises the components shown in FIG. 18. That is, the recording/reproducing apparatus main body 62 has three control units including a system controller S1, a memory controller S5 and a drive controller D1. The system controller S1 and the memory controller S5 are connected directly to each other and a read only memory unit (ROM) S2 and a readable/writable memory unit (RAM) S3 are connected to this connecting line. A memory S4, an encoder S6 for MPEG2 (animation compression type applicable to existing TV broadcasting corresponding to 3M–40 Mbps, HDTV, wideband ISDN and the like) and a decoder S7 are connected to the memory controller S5. Further, a control panel S8 and a memory controller receiver S9 are connected to the system controller S1.

The ECCD4 is connected to the drive controller D1 and a memory unit (ROM) D2, a memory unit (RAM) D3, a servo circuit D6 and an address decoder D7 are connected to this connecting line. Further, a recording error determining circuit D8 for determining an error in recording is connected to the drive controller D1. This drive controller D1 is connected to the system controller S1 through command interface and also connected to the memory controller S5 via the ECCD4 and data interface and further, to a modulation/demodulation circuit D5. The modulation/demodulation circuit D5 is connected to the optical head 69a of the optical pickup unit 69.

A servo circuit D6 is connected to the spindle motor 68, which is a disc driving unit, the optical pickup unit 69 and the recording error determining circuit D8. Further, the optical pickup unit 69 is connected to the address decoder D7 and then, this address recorder D7 is connected to the recording error determining circuit D8.

The opening/closing action of the shutter mechanism 18 by the rack bar 70 when inserting the disc cartridge 80 through the cartridge port 66 in the disc recording/reproducing apparatus 60 having such a structure will be described from its relationship with the open/closed state of the shutter mechanism 18 by a change of the position of the intermediate shell 84.

A case (A) of inserting the disc cartridge 80 whose shutter mechanism 18 is completely closed is shown in FIGS. 22–26. Next, a case (B) of inserting the disc cartridge 80 whose shutter mechanism 18 is incompletely closed is shown in FIGS. 27–31. A case (C) of inserting the disc cartridge 80 whose shutter mechanism 18 is completely opened is shown in FIGS. 32–36. Finally, a case (D) of discharging the disc cartridge 80 is shown in FIGS. 37–41.

First, the case (A) of inserting the disc cartridge 80 whose shutter members 18a, 18b acting in pair are completely closed will be described. If the disc cartridge 80 is inserted into the cartridge port 66 of the disc recording/reproducing apparatus 60 by a predetermined amount as shown in FIG. 21, the initial action convex portion 72 of the rack bar 70 contained in the disc recording/reproducing apparatus 60 invades into the guide groove 31 provided in one side face of the disc cartridge 80. Consequently, although not shown, the initial action convex portion 72 presses the input portion 37 of the lock member 32 protruded into the guide groove 31 into the lock accommodating portion 33 resisting an urging force of the spring piece 38. Then, the lock member 32 is rotated around the supporting shaft 35 so that the stopper portion 36 is released from the set position concave portion 44b. As a result, the lock of the intermediate shell 84 is released so as to make free rotation thereof.

Figure 23:
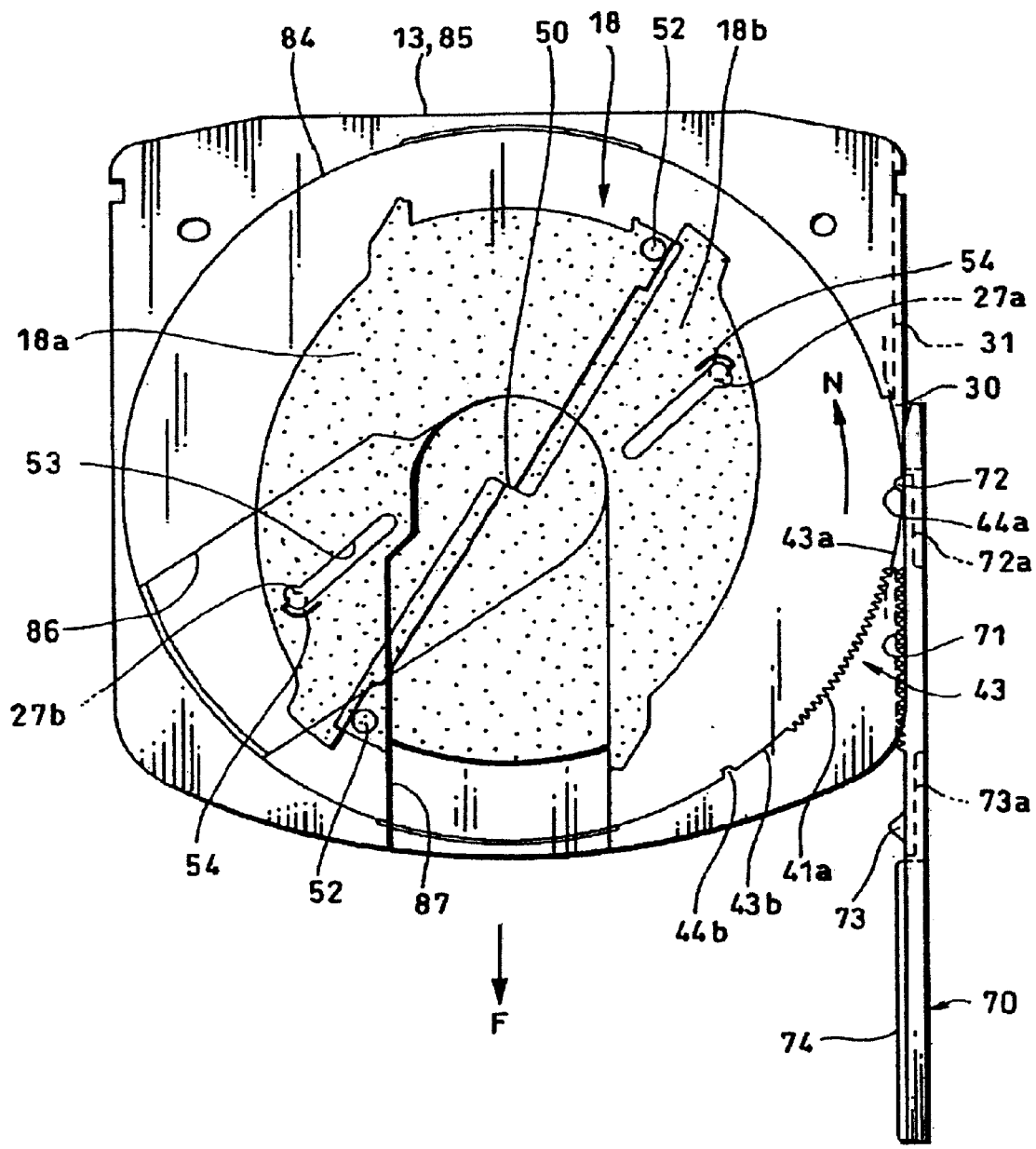
FIG. 23 is an explanatory diagram showing an action of the shutter opening/closing means when the shutter mechanism of the disc cartridge shown in FIG. 15 is completely closed, indicating a state in which the initial action convex portion engages with the initial action concave portion.

Further, as shown in FIG. 22, the disc cartridge 80 is inserted in the cartridge insertion direction F. After the disc cartridge 80 advances relative to the rack bar 70, the initial action convex portion 72 comes into contact with the front sliding portion 43a of the driven portion 43 of the intermediate shell 14 so that it rides over this front sliding portion 43a. At this time, because the front elastic piece 72a has appropriate elasticity, the front elastic piece 72a is distorted so that the initial action convex portion 72 is distorted backward and rides over the highest point of the front sliding portion 43a. As a result, as shown in FIG. 23, the initial action convex portion 72 invades into the initial action concave portion 44a. This convex portion 72 engages with the concave portion 44a, so that the intermediate shell 14 is rotated in counterclockwise direction N in the same figure by a reaction force from the rack bar 70.

Figure 24:
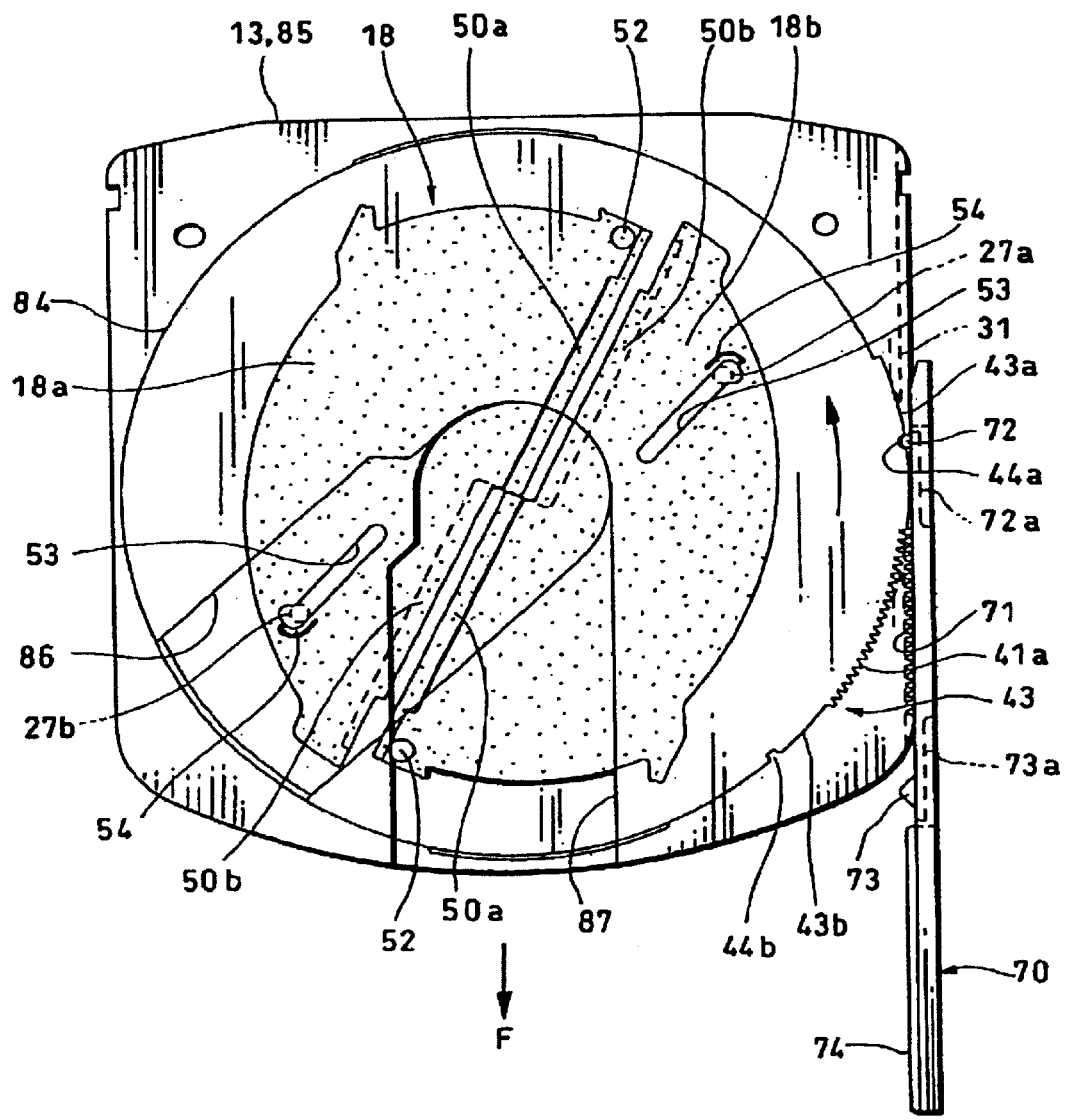
FIG. 24 is an explanatory diagram showing an action of the shutter opening/closing means when the shutter mechanism of the disc cartridge shown in FIG. 15 is completely closed, indicating an initial state in which the rack portion meshes with the gear portion.
Figure 25:
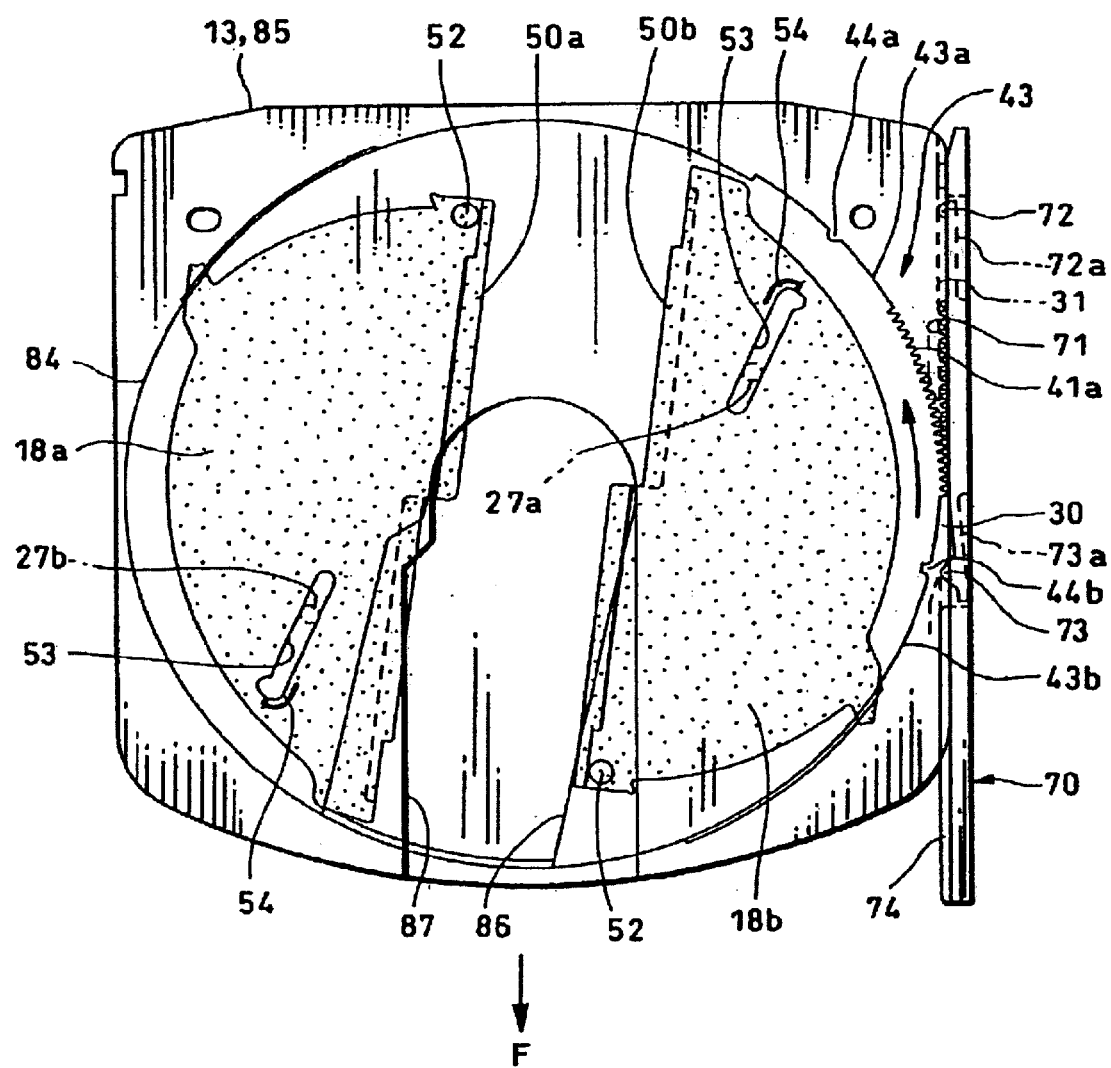
FIG. 25 is an explanatory diagram showing an action of the shutter opening/closing means when the shutter mechanism of the disc cartridge shown in FIG. 15 is completely closed, indicating a final state in which the rack portion meshes with the gear portion.
Figure 26:
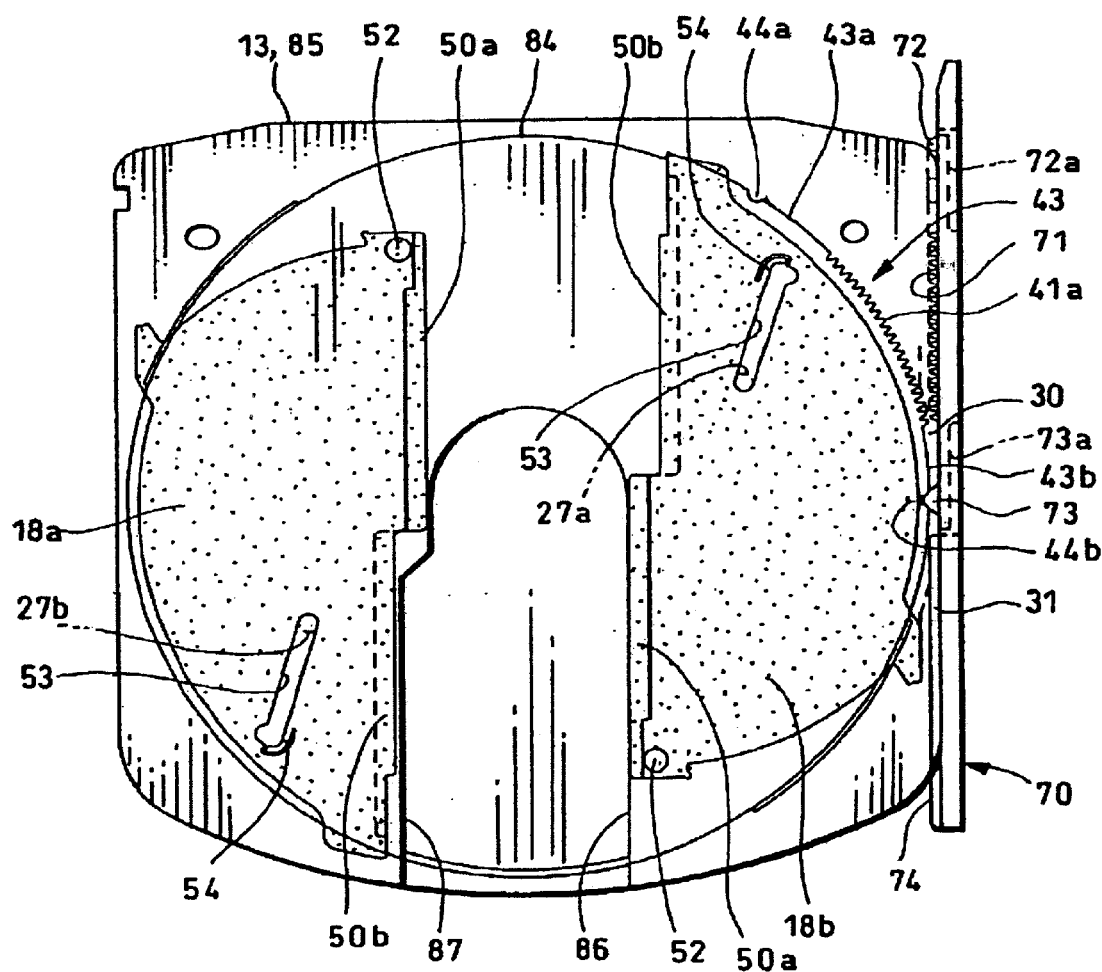
FIG. 26 is an explanatory diagram showing an action of the shutter opening/closing means when the shutter mechanism of the disc cartridge shown in FIG. 15 is completely closed, indicating a state in which the stopper convex portion engages with the set position concave portion.

As a result, as shown in FIG. 24, the intermediate shell 14 is rotated at a predetermined angle depending on a relative moving amount to the rack bar 70, so that before the convex portion 72 leaves the concave portion 44a, the rack portion 71 engages with the gear portion 41a of the driven portion 43. Consequently, its driving force transmitting path is strengthened, so that the reaction force from the rack bar 70 is transmitted securely, thereby rotating the intermediate shell 14 at a predetermined angle. Before the engagement between the rack portion 71 which advances linearly and the gear portion 41a which advances circularly is released as shown in FIG. 25, the stopper convex portion 73 engages with the set position concave portion 44b provided in the rear sliding portion 43b of the driven portion 43. Then, when the stopper convex portion 73 is engaged with the set position concave portion 44b as shown in FIG. 26, the engagement between the rack portion 71 and the gear portion 41a is released.

At the same time, insertion action of the disc cartridge 80 is terminated, so that the disc cartridge 80 is set at a predetermined position. Because in this setting condition, the stopper convex portion 73 engages with the set position concave portion 44b completely, the intermediate shell 14 is not rotated.

In the initial state in which the intermediate shell 14 begins to rotate, as shown in FIGS. 13C, 14A, the cam portion 46 of the intermediate shell 14 rides over the lift-up portion 23. As a result, it comes that a pair of the shutter members 18a, 18b are nipped between the intermediate shell 14 and the upper shell 13. Thus, a relatively large force is necessary for rotating the intermediate shell 14. By rotating the intermediate shell 14 resisting a large friction force generated by this rise of the cam portion 46, as shown in FIGS. 13B, 14B, the cam portion 46 passes the lift-up portion 23 and invades into the cam groove 22. As a result, the friction force of the cam portion 46 is extinguished, so that the rotation of the intermediate shell 14 is carried out very lightly and smoothly.

The respective shaft portions 52 of a pair of the shutter members 18a, 18b are rotated by the rotation of the intermediate shell 14 while the operating convex portions 27a, 27b of the lower shell 15 engage with the opening/closing groove 53 provided at the other end. This pair of the operating convex portions 27a, 27b are provided on the lower shell 15 and never move. On the other hand, the respective opening/closing grooves 53 in a pair of the shutter members 18a, 18b are extended in a direction connecting the shaft portion 52 with the operating convex portion 27b (or 27a) so that the shutter members 18a, 18b are capable of moving relative to the operating convex portions 27a, 27b.

Thus, the operating convex portion 27b (or 27a) is moved to the side of the shaft portion 52 within the opening/closing groove 53 depending on a rotation amount of the shutter members 18a, 18b. Correspondingly, the shaft portions 52 are moved to the side of the corresponding operating convex portion 27b (or 27a) in each of the shutter members 18a, 18b. Consequently, the respective shutter members 18a, 18b are moved from the state of FIG. 22 to the state of FIG. 26 via the states shown in FIGS. 23, 24, 25, in which they oppose each other across the opening portions 86, 87 as shown in FIG. 26. As a result, the opening portion 86 of the intermediate shell 84 and the opening portion 87 of the lower shell 85 are released completely. Thus, part of the optical disc 11 accommodated in the disc-accommodating chamber 16 is exposed through the opening portions 86, 87.

As a result, the turntable 68a and the optical head 69a can be inserted into the opening portions 86, 87. Then, by moving the turn table 68a and the like to the side of the disc cartridge 80 or the disc cartridge 80 to the side of the turn table 68a, the turn table 68a invades into the opening portion for table 87a in the center portion and the optical head 69a invades into the opening portion for head 87b. As a result, the optical disc 11 is mounted and chucked on the turn table 68a and then, the optical head 69a is kept to face the information recording region 29a of the optical disc 11 at a predetermined interval. Consequently, reproduction and recording of information signal from/into the information recording region 29a of the optical disc 11 by the disc recording/reproducing apparatus 60 are enabled.

The recording/reproducing apparatus main body 62 is actuated to drive the spindle motor 68 and then the optical disc 11 is rotated through the turn table 68a and by driving the optical pickup unit 69, laser beam is emitted from the optical head 69a so as to read out information signal recorded in the information recording region 29a or new information signal can be written into the information recording region 29a. Consequently, reproduction and recording of information signal by the recording/reproducing apparatus 62 are carried out.

Figure 27:
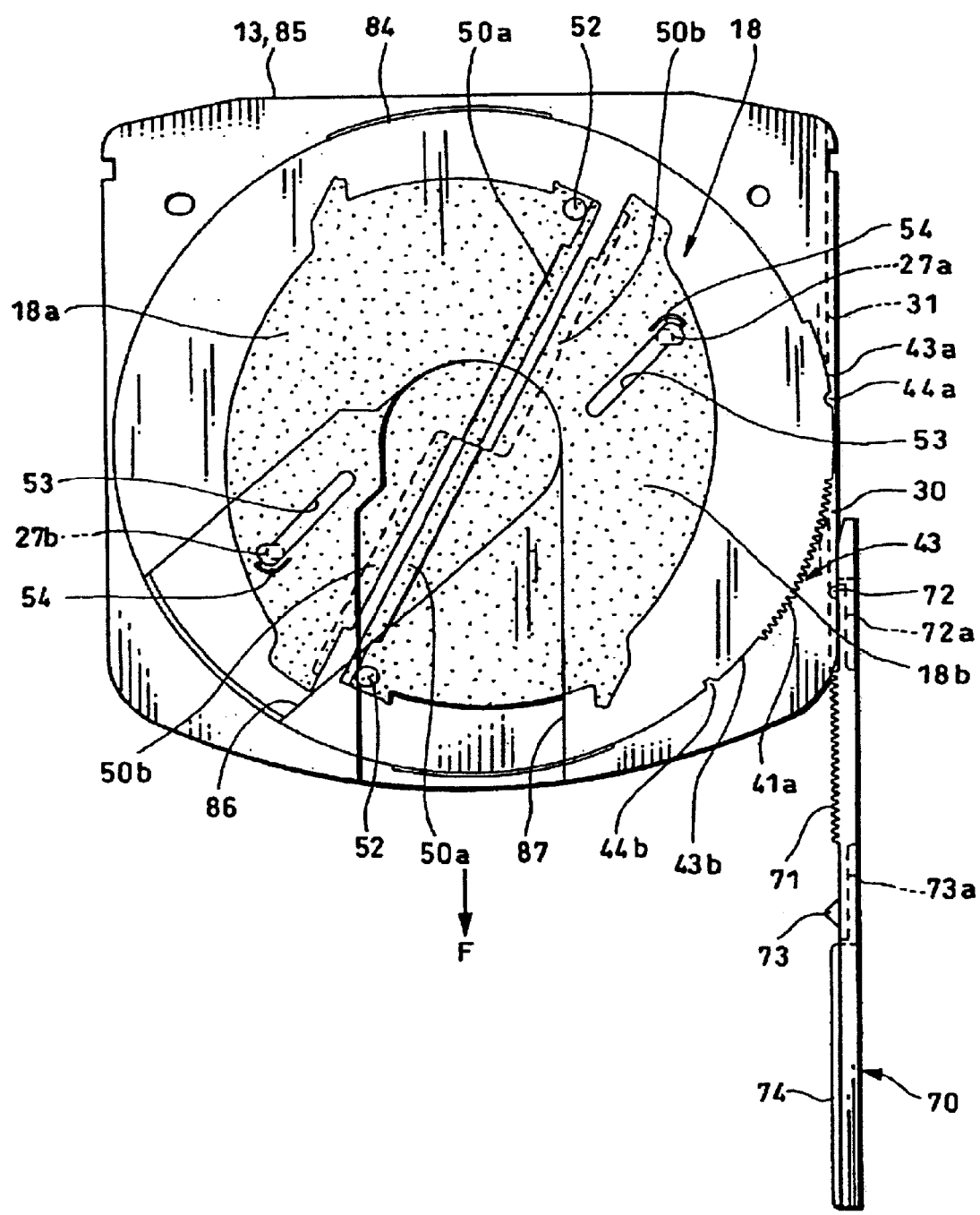
FIG. 27 is an explanatory diagram showing an action of the shutter opening/closing means when the shutter mechanism of the disc cartridge shown in FIG. 15 is incompletely closed, indicating a state before the initial action convex portion reaches the opening window.
Figure 28:
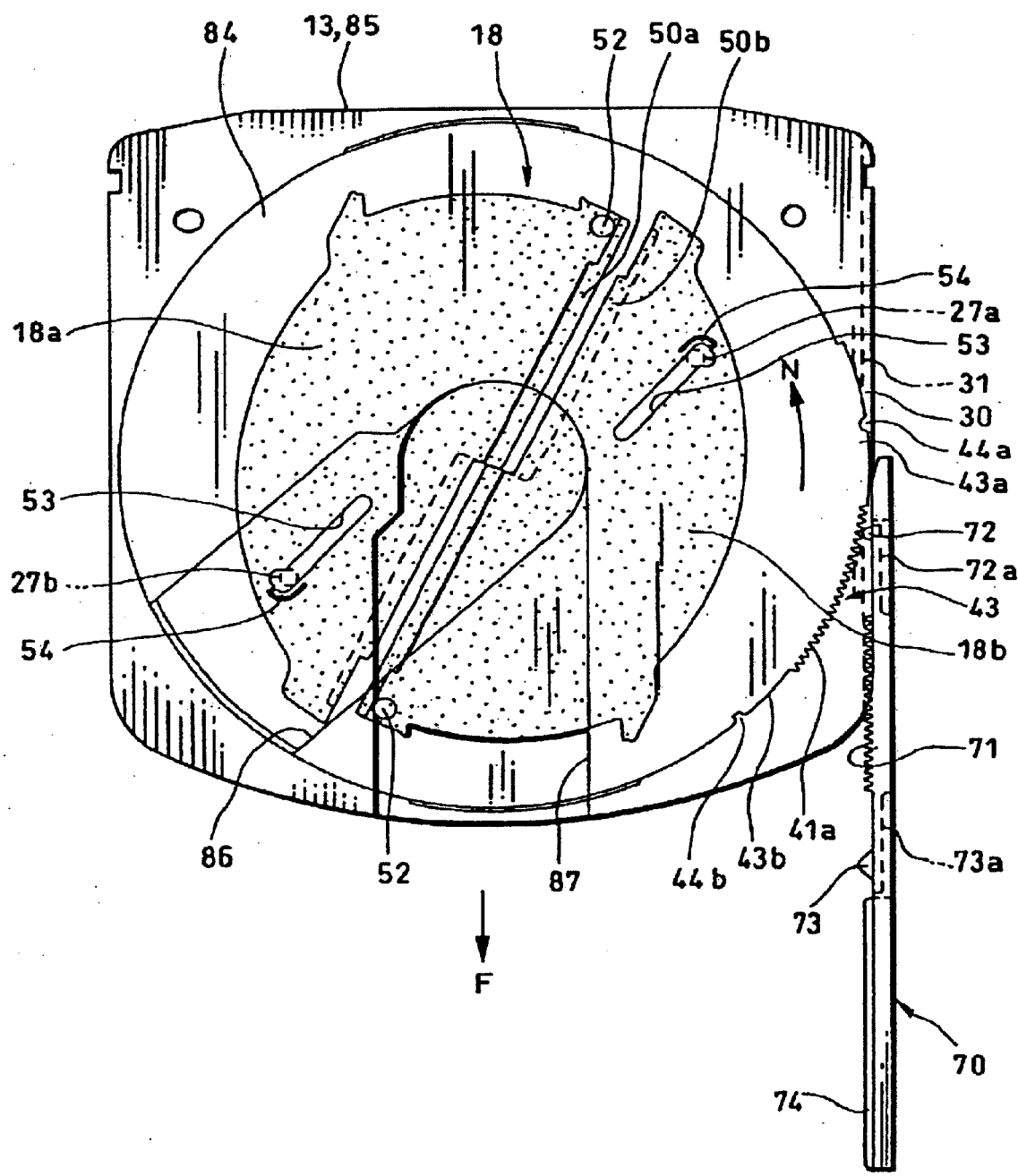
FIG. 28 is an explanatory diagram showing an action of the shutter opening/closing means when the shutter mechanism of the disc cartridge shown in FIG. 15 is completely closed, indicating a state in which the initial action convex portion engages with the gear portion.

Next, the case (B) of inserting the disc cartridge 80 whose shutter members 18a, 18b acting in pair are incompletely closed will be described. This state is generated when user rotates the intermediate shell 84 intentionally or on account of other reasons. For example, as shown in FIG. 27, the shutter mechanism 18 is slightly opened by a deviation of rotation of the intermediate shell 84. At this time, part of the gear portion 41a as well as the initial action concave portion 44a is exposed through the opening window 30.

If this disc cartridge 80 is inserted into the cartridge port 66 of the disc recording/reproducing apparatus 60 by a predetermined amount, the initial action convex portion 72 of the rack bar 70 invades into the guide groove 31 of the disc cartridge 80 and the input portion 37 of the lock member 32 is pressed into the lock accommodating portion 33. After that, the condition is changed from that of FIG. 27 to that of FIG. 28 so that the initial action convex portion 72 comes into contact with the gear portion 41a of the driven portion 43. As a result, the initial action convex portion 72 engages with the gear portion 41a of the driven portion 43 and with this condition, the intermediate shell 84 is rotated in counterclockwise direction N.

Figure 29:
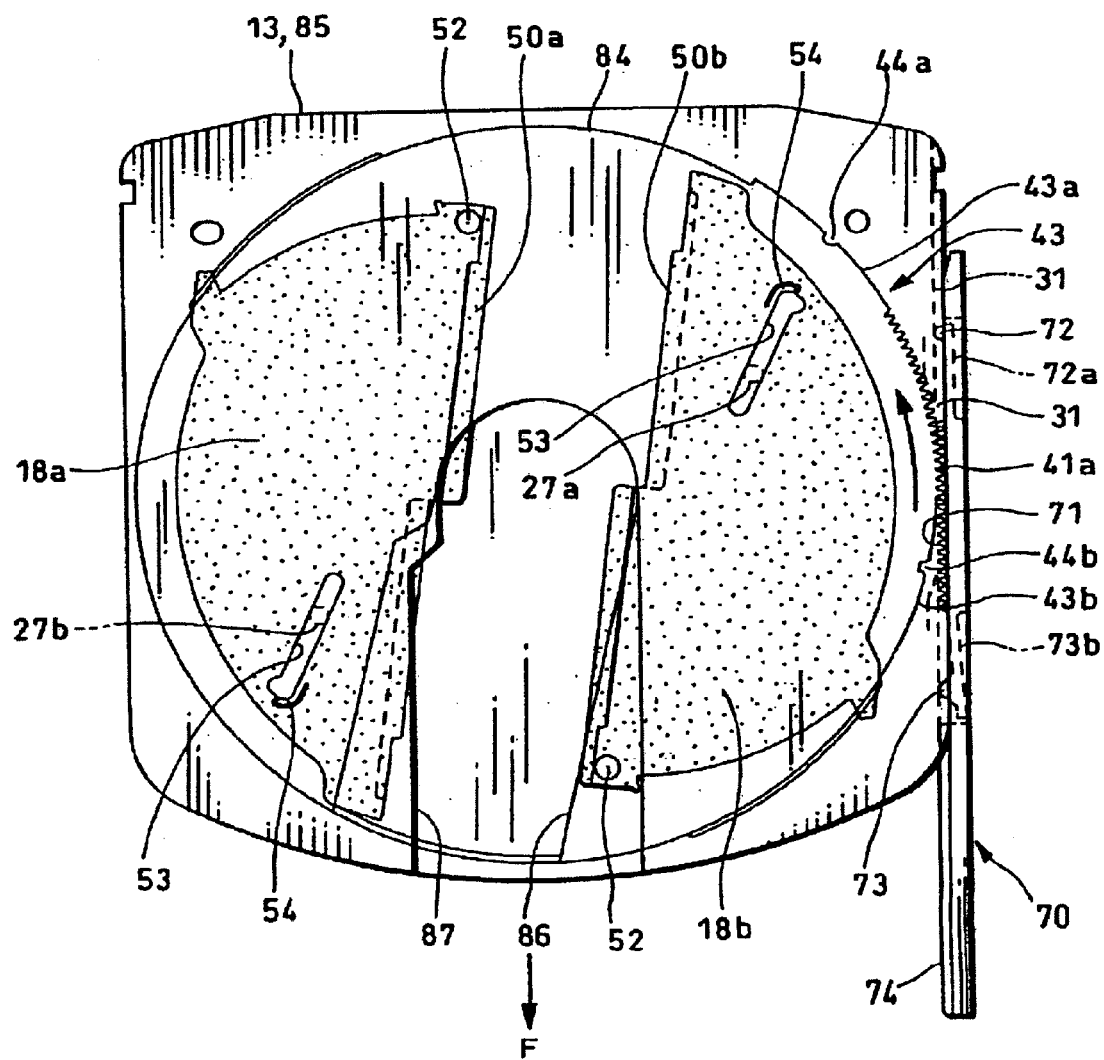
FIG. 29 is an explanatory diagram showing an action of the shutter opening/closing means when the shutter mechanism of the disc cartridge shown in FIG. 15 is completely closed, indicating a state of engagement between the rack portion and the gear portion.
Figure 30:
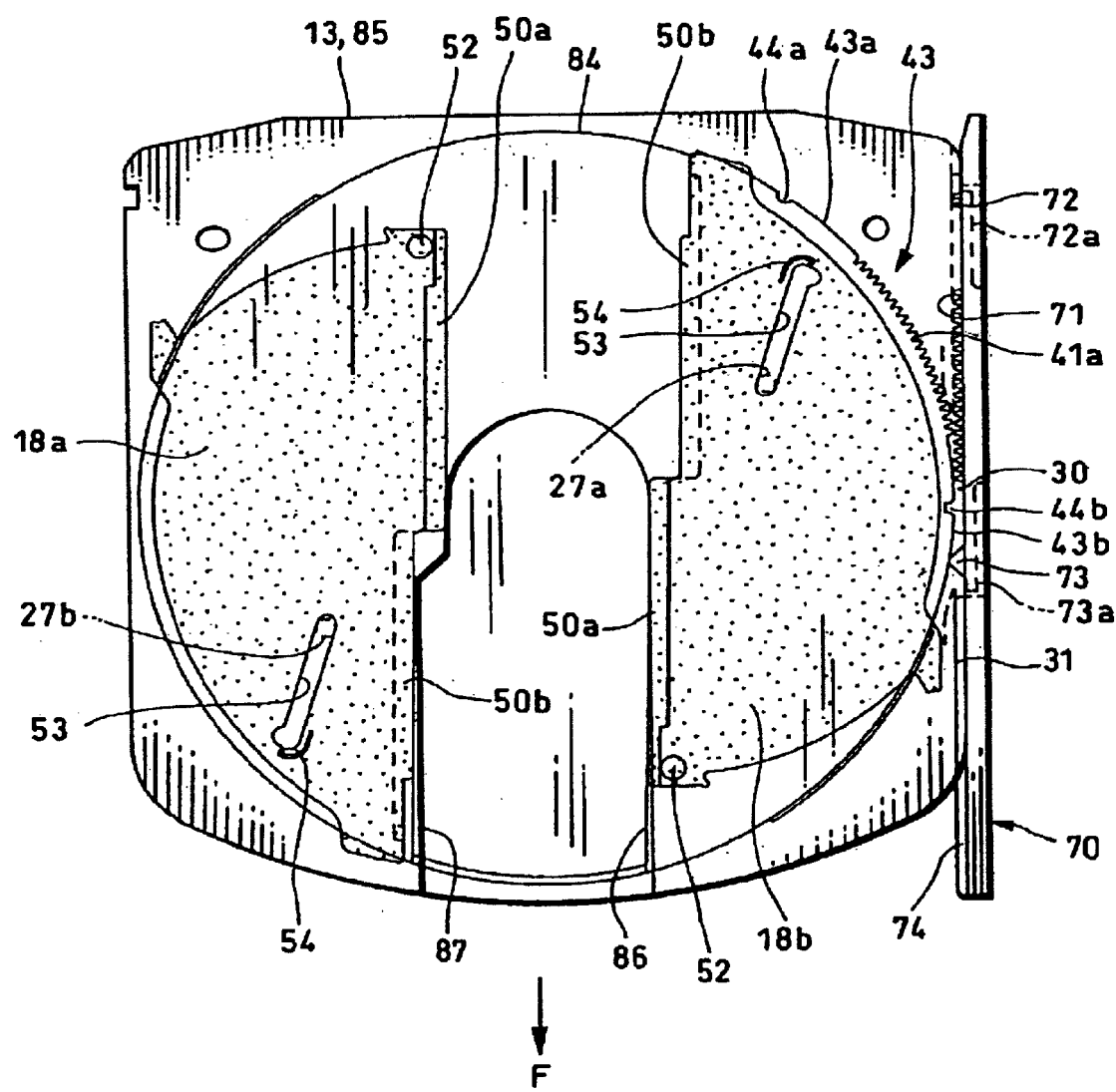
FIG. 30 is an explanatory diagram showing an action of the shutter opening/closing means when the shutter mechanism of the disc cartridge shown in FIG. 15 is completely closed, indicating a state before the stopper convex portion engages with the set position concave portion.

As a result, as shown in FIG. 29, the intermediate shell 14 is rotated at a predetermined angle depending on a relative moving amount with respect to the rack bar 70, so that the rack portion 71 meshes with the gear portion 41a before the convex portion 72 leaves the gear portion 41a. Consequently, a reaction force from the rack bar 70 is transmitted securely from the rack portion 71 to the gear portion 41a, so that the intermediate shell is rotated at the predetermined angle. After the rack portion 71 leaves the gear portion 41a as shown in FIG. 30, a slippage occurs between the intermediate shell 14 and the rack bar 70, so that the stopper convex portion 73 is engaged with the set position concave portion 44b provided in the rear sliding portion 43b of the driven portion 43.

Figure 31:
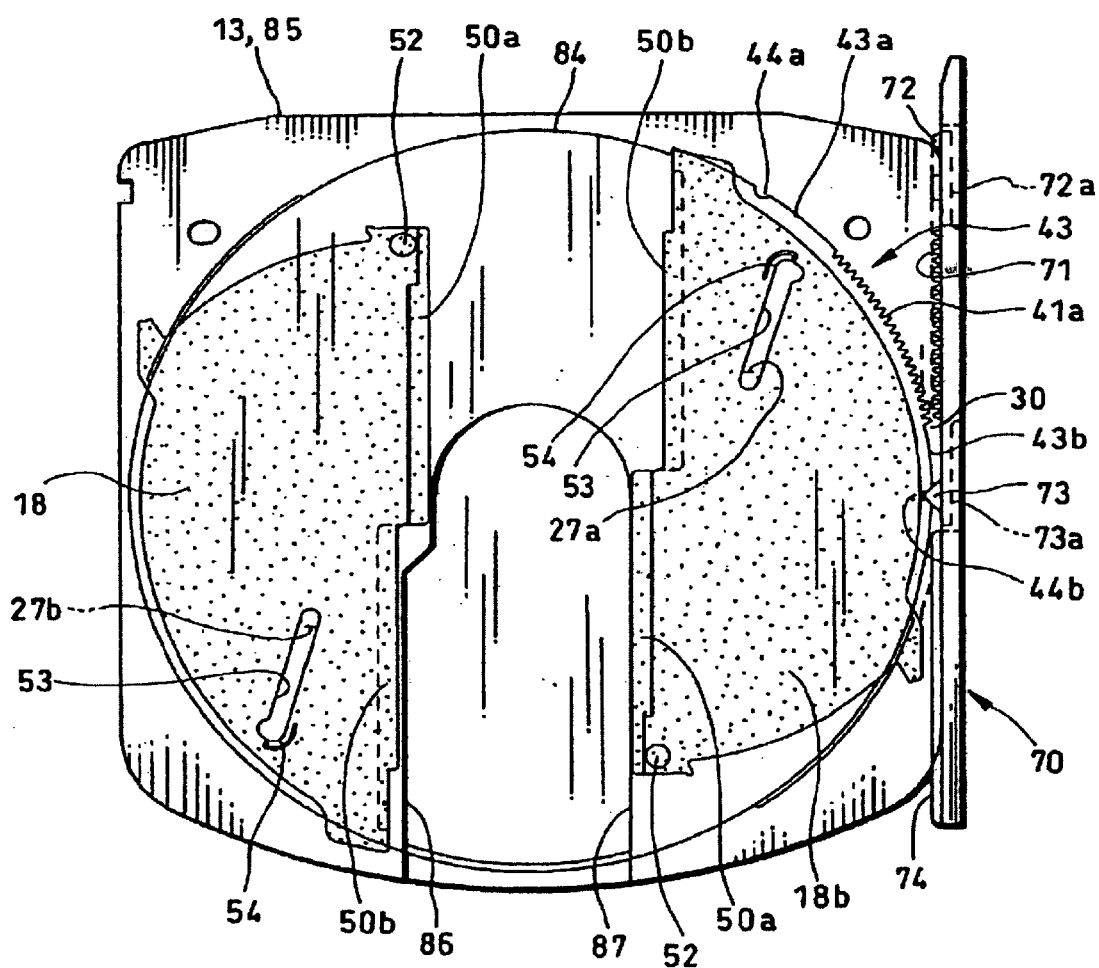
FIG. 31 is an explanatory diagram showing an action of the shutter opening/closing means when the shutter mechanism of the disc cartridge shown in FIG. 15 is completely closed, indicating a state in which the stopper convex portion engages with the set position concave portion.

When as shown in FIG. 31, the stopper convex portion 73 meshes with the set position concave portion 44b completely, the insertion operation of the disc cartridge 80 is terminated, so that the disc cartridge 80 is set at a predetermined position. Under this setting condition, the opening portion 86 of the intermediate shell 84 and the opening portion 87 of the lower shell 85 are opened completely, so that part of the optical disc accommodated in the disc accommodating chamber 16 is exposed through the opening portions 86, 87. Therefore, even in case where the disc cartridge 80 whose shutter mechanism is closed incompletely is inserted, any problem never occurs and recording and reproduction of information signal can be carried out using that disc cartridge 80.

Figure 32:
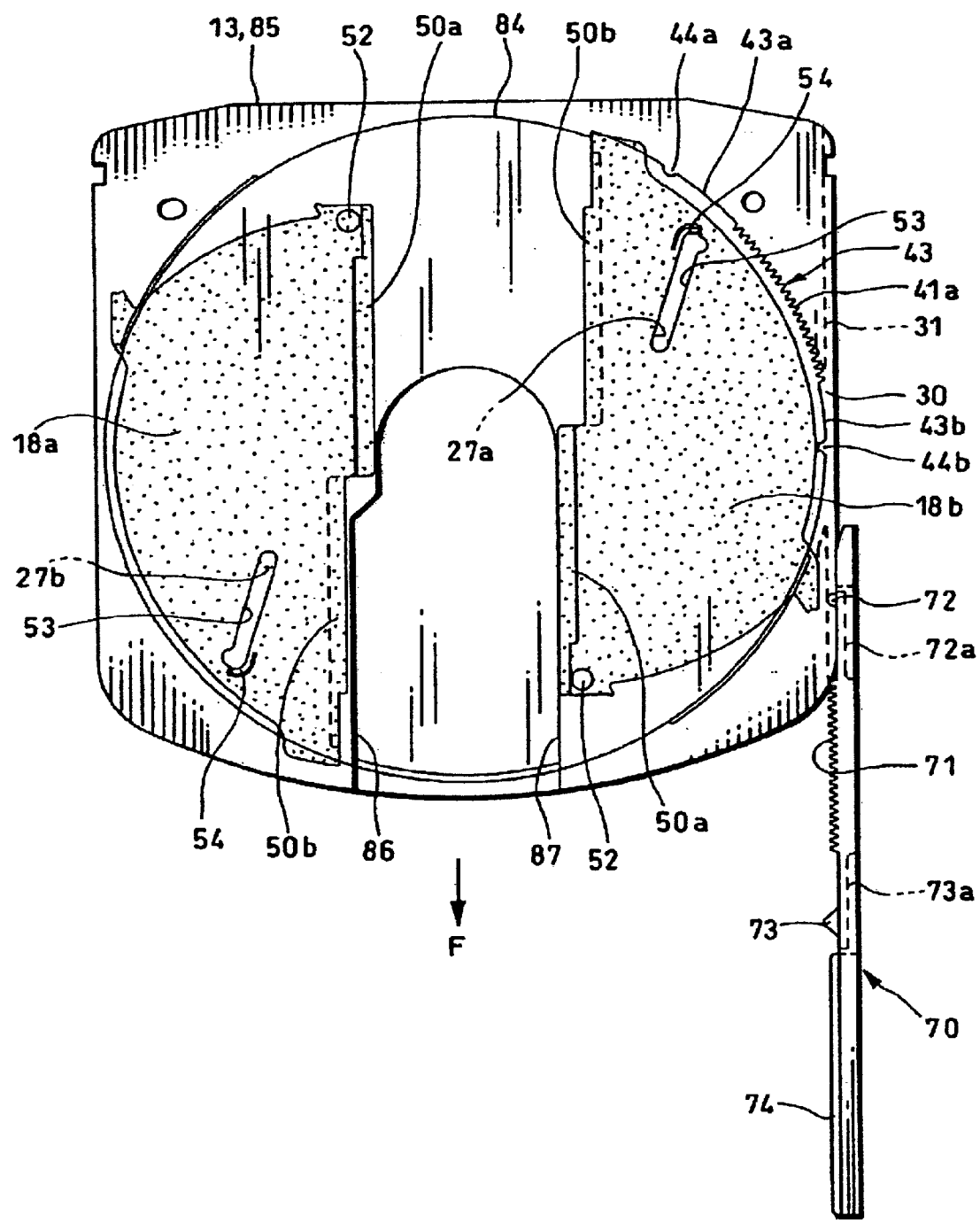
FIG. 32 is an explanatory diagram showing an action of the shutter opening/closing means when the shutter mechanism of the disc cartridge shown in FIG. 15 is completely opened, indicating a state before the initial action convex portion reaches the opening window.
Figure 33:
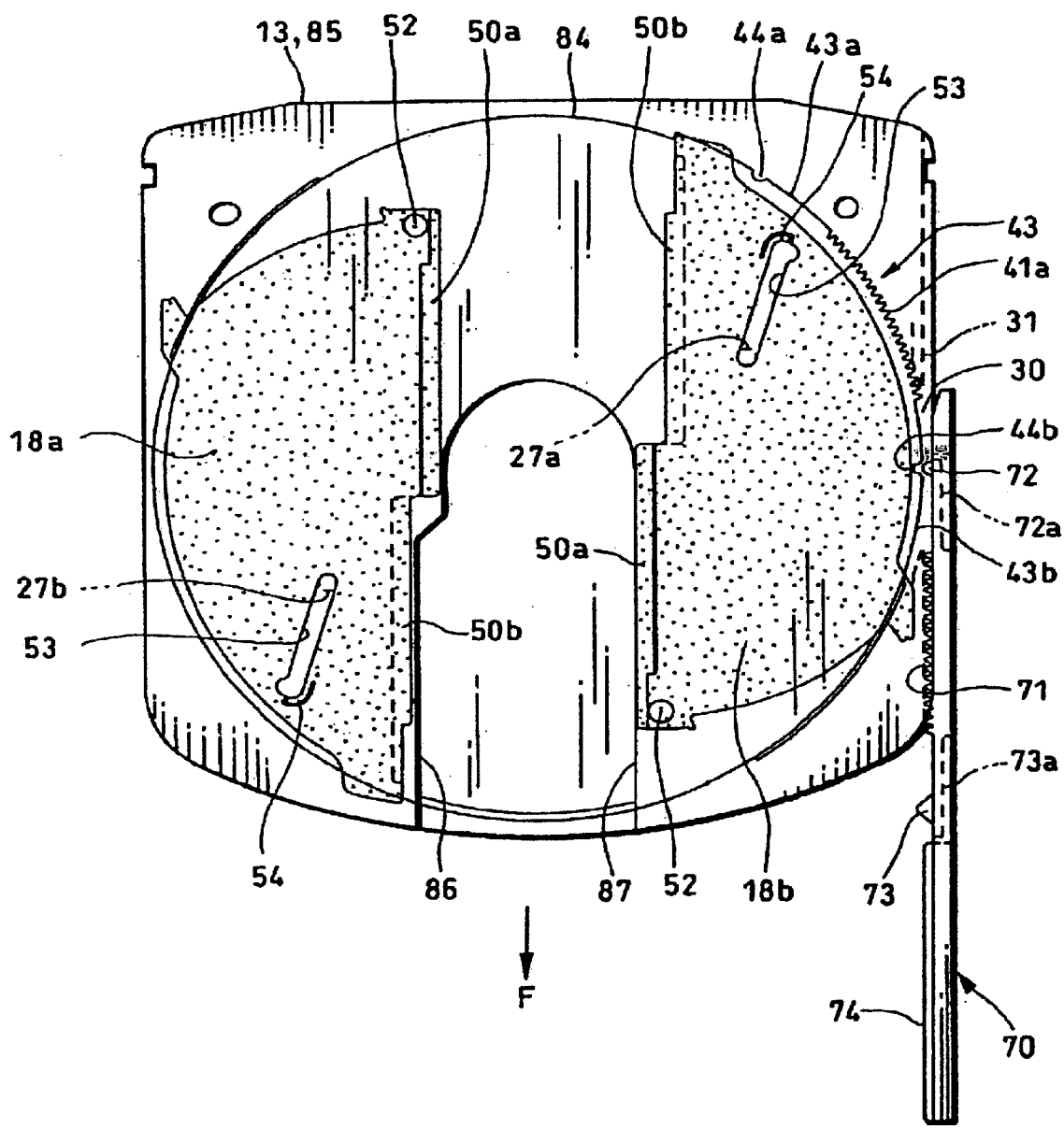
FIG. 33 is an explanatory diagram showing an action of the shutter opening/closing means when the shutter mechanism of the disc cartridge shown in FIG. 15 is completely opened, indicating a state in which the initial action convex portion passes the set position concave portion.
Figure 34:
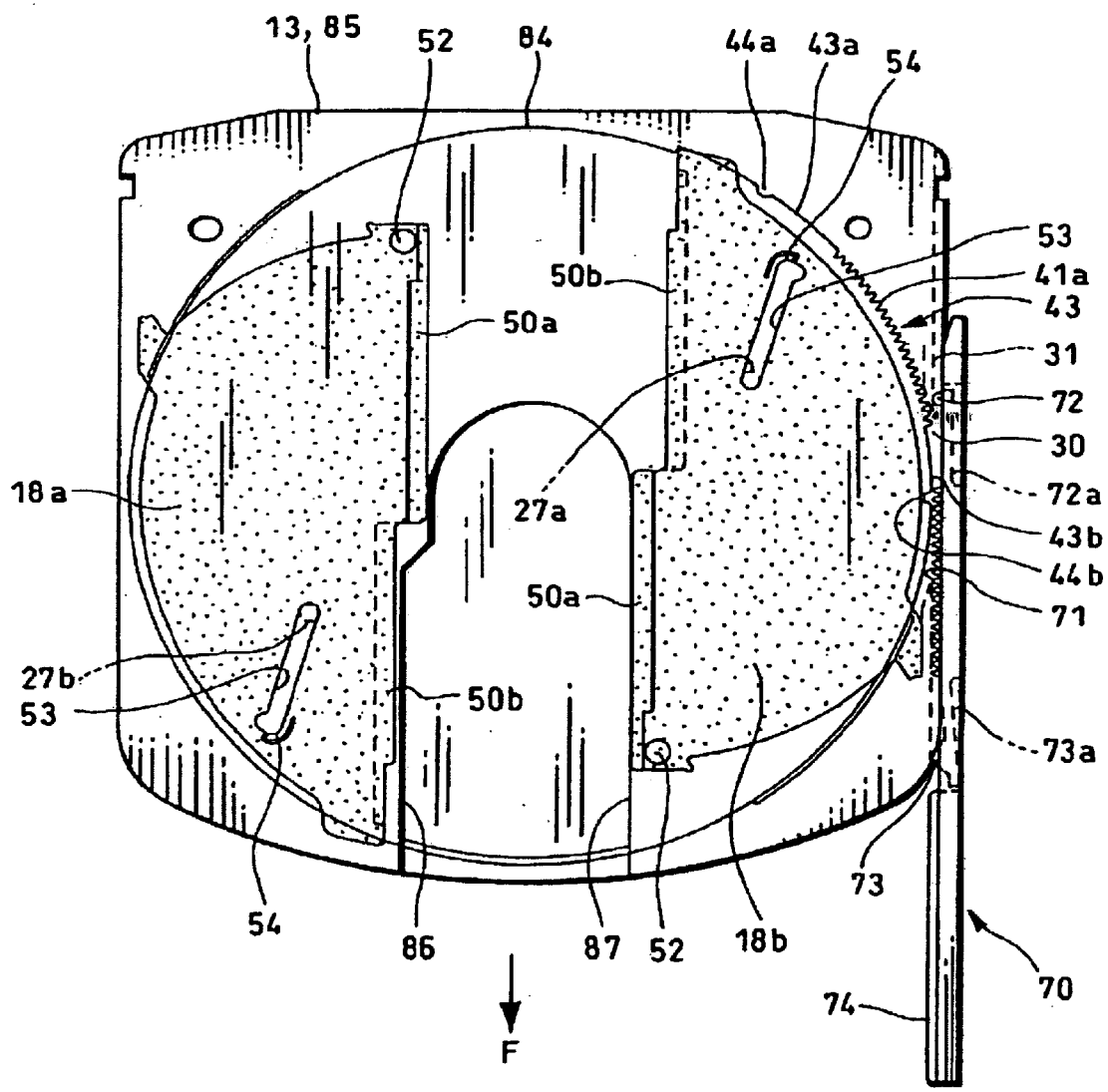
FIG. 34 is an explanatory diagram showing an action of the shutter opening/closing means when the shutter mechanism of the disc cartridge shown in FIG. 15 is completely opened, indicating a state in which the rack portion passes the set position concave portion.
Figure 35:
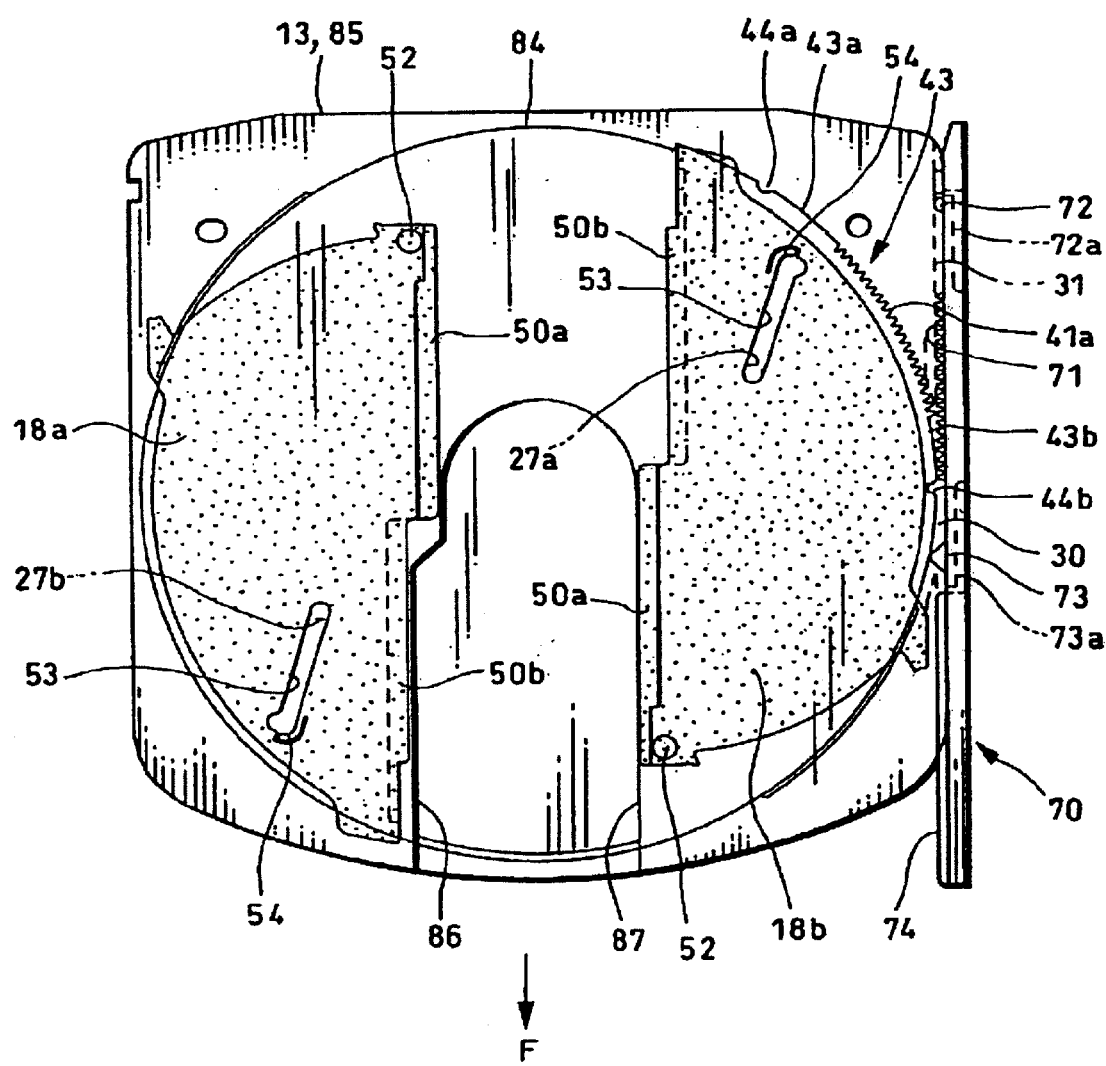
FIG. 35 is an explanatory diagram showing an action of the shutter opening/closing means when the shutter mechanism of the disc cartridge shown in FIG. 15 is completely opened, indicating a state before the stopper convex portion engages with the set position concave portion.

Next, a case (C) of inserting the disc cartridge 80 whose shutter members 18a, 18b are completely opened will be described. This condition is generated because user tries to rotate the intermediate shell 84 intentionally or for other reason. As shown in FIG. 32, the intermediate shell 84 is rotated to a maximum angle so that the shutter mechanism is opened completely. At this time, the rear sliding portion 43*b* is exposed through the opening window 30.

If this disc cartridge 80 is inserted into the cartridge port 66 of the disc recording/reproducing apparatus 60 by a predetermined amount, the initial action convex portion 72 of the rack bar 70 invades into the guide groove 31 in the disc cartridge 80 and the input portion 37 of the lock member 32 is pressed into the lock accommodating portion 33. After that, the condition is changed from that of FIG. 32 to that of FIG. 33, so that the initial action convex portion 72 passes over the set position concave portion 44*b* in the rear sliding portion 43*b*. Further, the condition is changed from that of FIG. 34 to that of FIG. 35 so that the rack portion 71 passes over the set position concave portion 44*b*.

Figure 36:
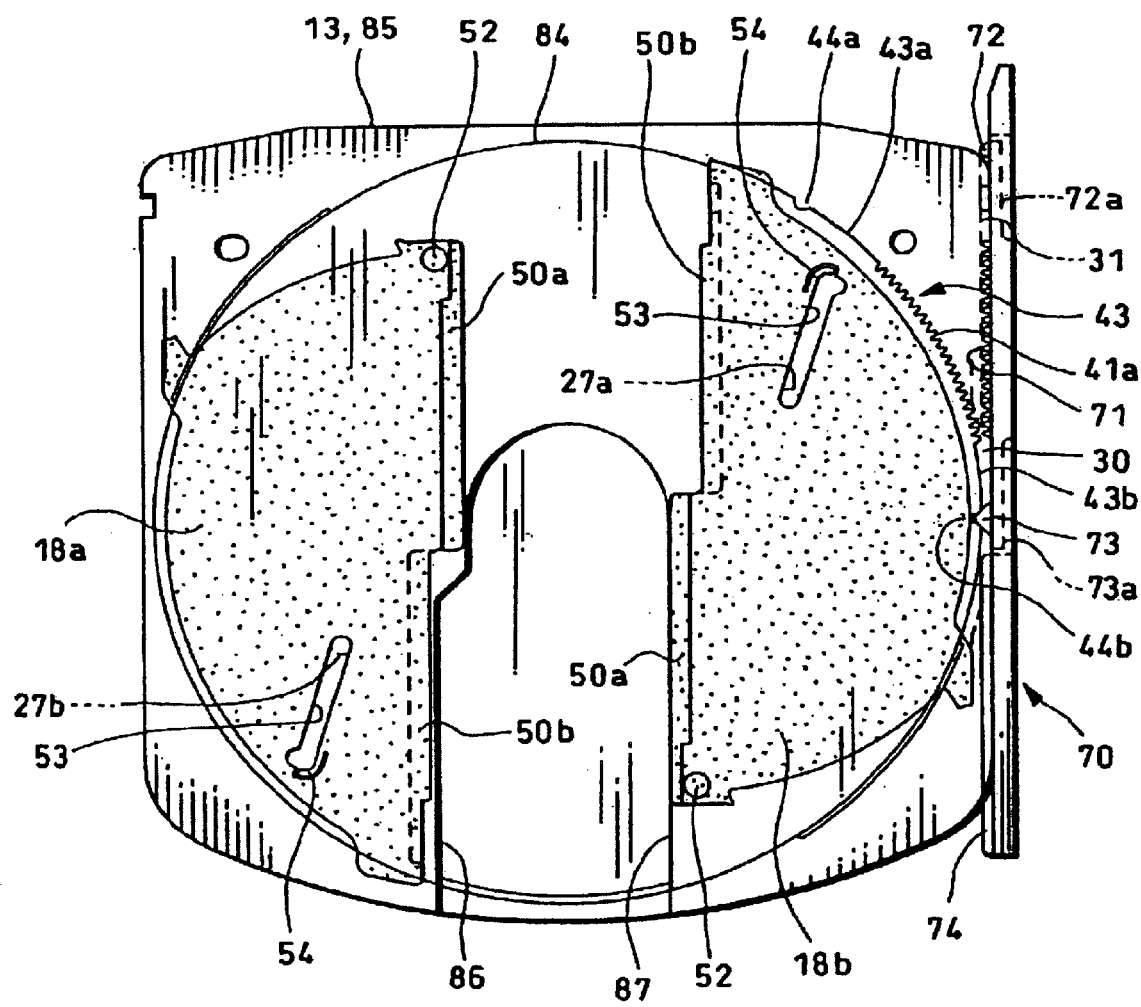
FIG. 36 is an explanatory diagram showing an action of the shutter opening/closing means when the shutter mechanism of the disc cartridge shown in FIG. 15 is completely opened, indicating a state in which the stopper convex portion engages with the set position concave portion.

After that, the stopper convex portion 73 comes into contact with the rear sliding portion 43*b*. Because the rear elastic piece 73*a* has appropriate elasticity, the stopper convex portion 73 is distorted backward and moved when the rear elastic piece 73*a* is distorted, it rides over the highest position of the rear sliding portion 43*b*. Then, the stopper convex portion 73 engages with the set position concave portion 44*b*. After that, as shown in FIG. 36, when the stopper convex portion 73 meshes with the set position concave portion 44*b* completely, the insertion action of the disc cartridge 80 is terminated, so that the disc cartridge 80 is set at a predetermined position.

In this setting condition, the opening portion 86 of the intermediate shell 84 and the opening portion 87 of the lower shell 85 are opened completely, so that part of the optical disc 11 accommodated in the disc accommodating chamber 16 is exposed through the opening portions 86, 87. Thus, even if the disc cartridge 80 is inserted with its shutter mechanism 18 completely opened, no trouble occurs, so that recording and reproduction of information signal can be carried out using that disc cartridge 80.

Finally, the case (D) of discharging the disc cartridge 80 will be described. By operating a cartridge discharge button (not shown) provided on the disc recording/reproducing apparatus 60, after reproduction or recording of information signal is carried out as described above, the disc cartridge 80 is discharged from the disc recording/reproducing apparatus 60 through an action of the loading mechanism. That is, if the disc cartridge 80 is moved in cartridge discharge direction R by the discharge action of the loading mechanism, the rack bar 70 is relatively retreated.

Figure 37:
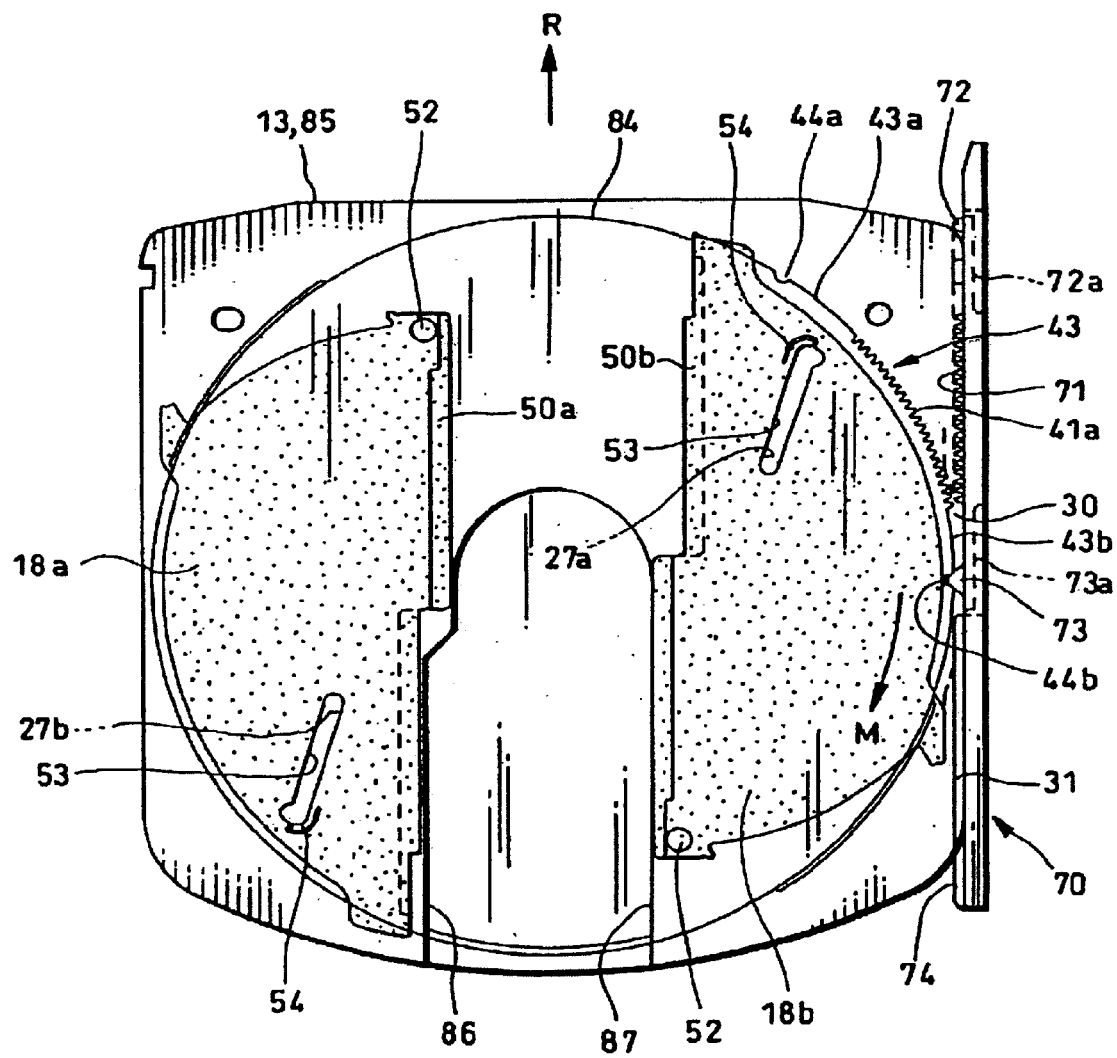
FIG. 37 is an explanatory diagram showing an action of the shutter opening/closing means when the disc cartridge shown in FIG. 15 is discharged, indicating a state in which the stopper convex portion engages with the set position concave portion.
Figure 38:
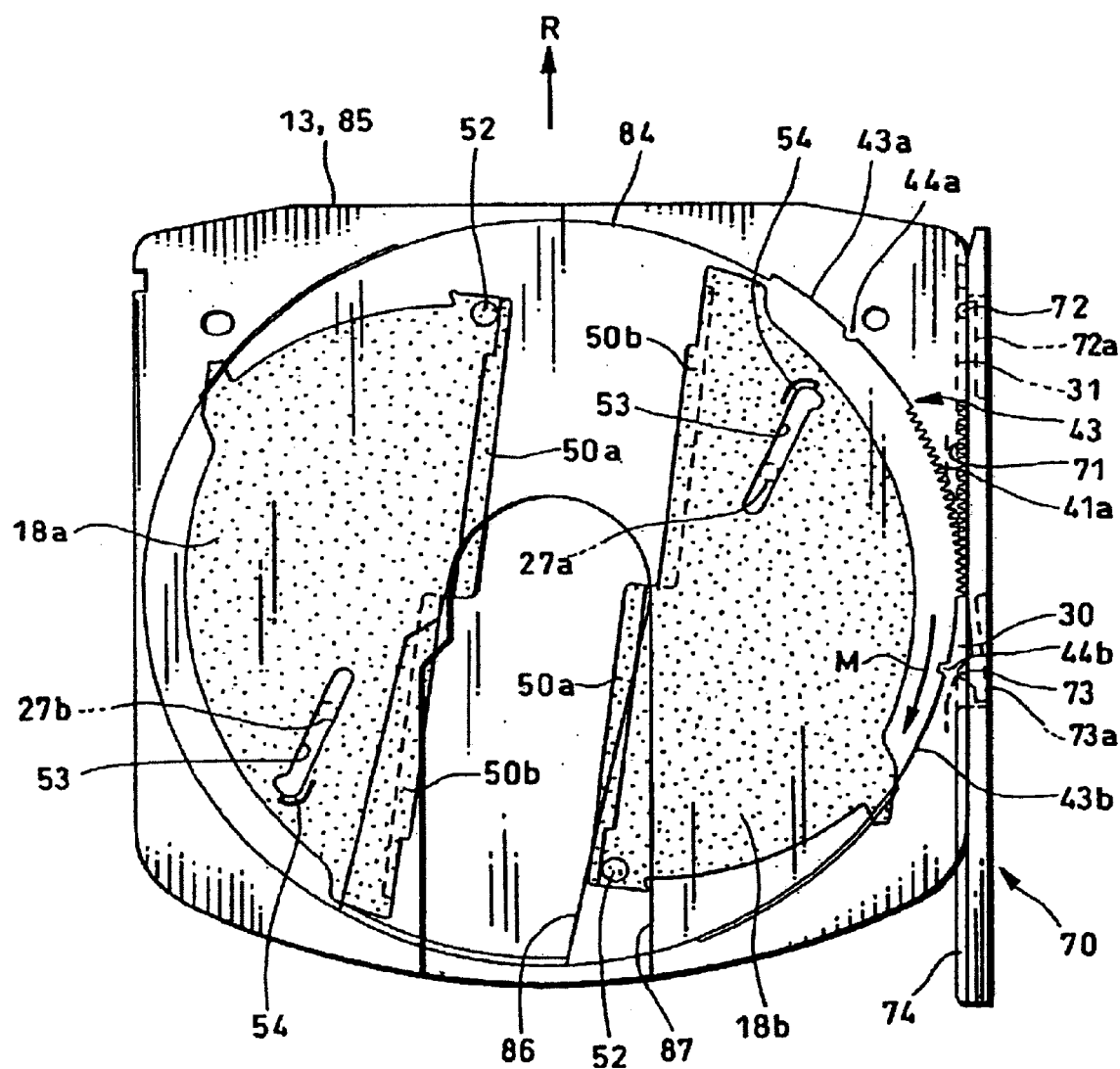
FIG. 38 is an explanatory diagram showing an action of the shutter opening/closing means when the disc cartridge shown in FIG. 15 is discharged, indicating an initial state in which the rack portion meshes with the gear portion.

By the retreat of the disc cartridge 80 with respect to the rack bar 70, as shown in FIG. 37, the intermediate shell 84 is rotated in the clockwise direction M by the stopper convex portion 73 engaged with the set position concave portion 44*b*. As shown in FIG. 38, before the convex portion 73 leaves the concave portion 44*b*, the rack portion 71 meshes with the gear portion 41*a* so that the intermediate shell 84 continues to be rotated by this meshing.

Because at this time, a front end of the stopper convex portion 73 has invaded into the opening window 30, that convex portion 73 comes into contact with an edge of the opening window 30. However, because the rear elastic piece 73*a* integrated with the convex portion 73 has appropriate elasticity, the convex portion 73 is deflected outward by distortion of the rear elastic piece 73*a*, so that it goes beyond the edge of the opening window 30 and rides over the guide groove 31. Thus, although the convex portion 73 is higher than the rack portion 71, the convex portion 73 located far from the concave portion 44*b* cannot escape from the opening window 30 easily. Therefore, a rotation of the intermediate shell 84 therein can be secured.

Figure 39:
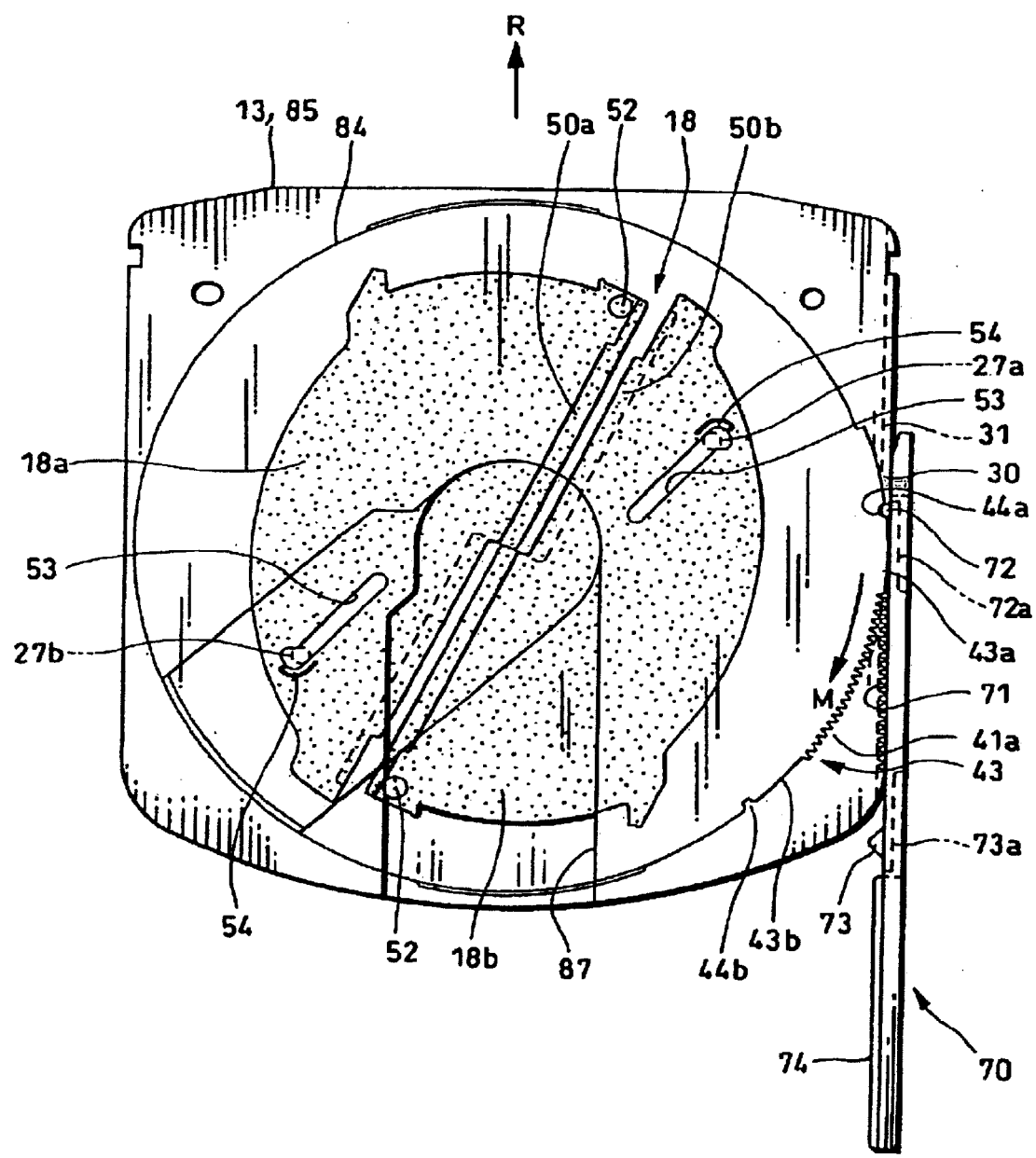
FIG. 39 is an explanatory diagram showing an action of the shutter opening/closing means when the disc cartridge shown in FIG. 15 is discharged, indicating a final phase state in which the rack portion meshes with the gear portion.
Figure 40:
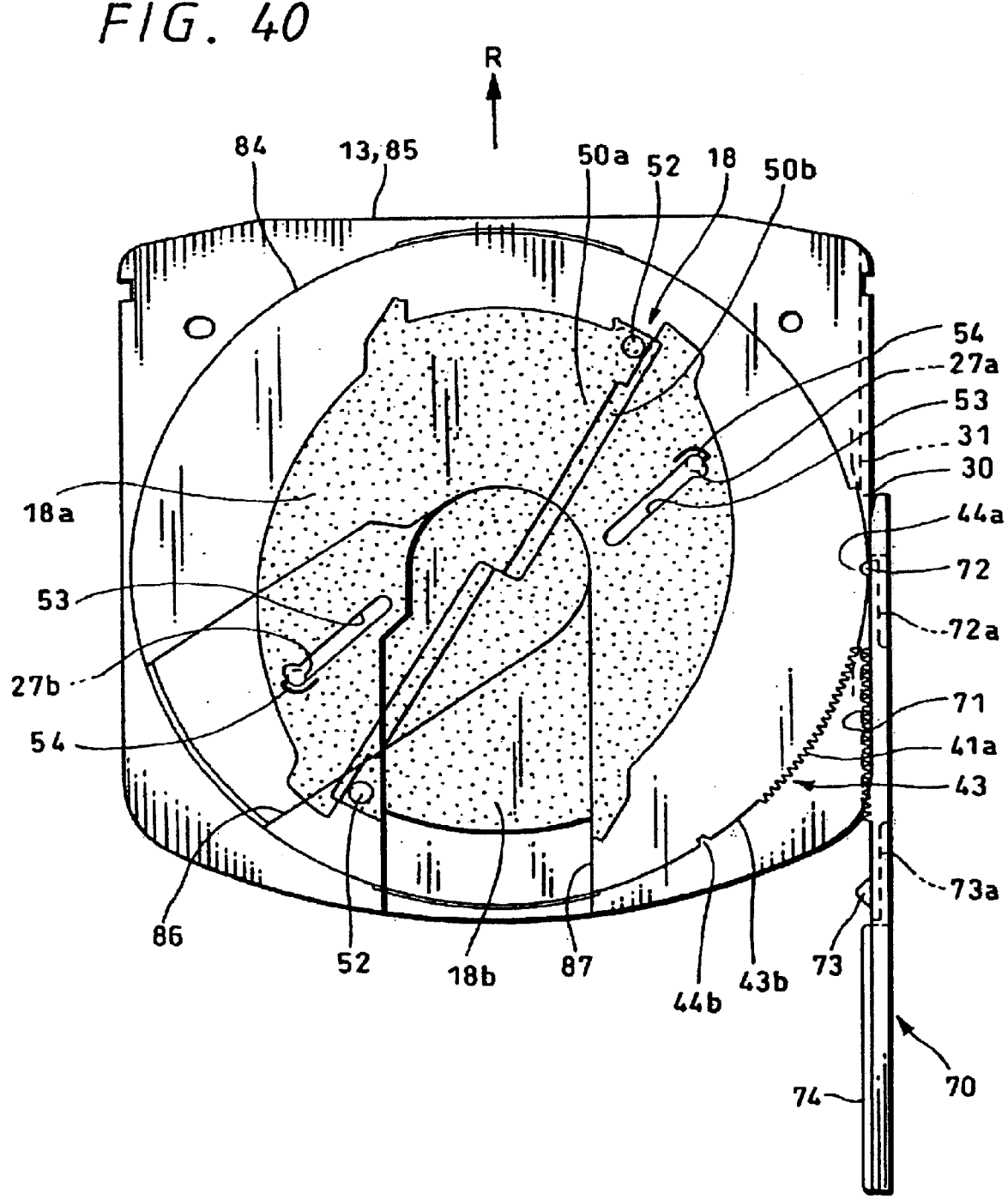
FIG. 40 is an explanatory diagram showing an action of the shutter opening/closing means when the disc cartridge shown in FIG. 15 is discharged, indicating a state in which he initial action convex portion engages with the initial action concave portion.

If the intermediate shell 84 is rotated at a predetermined angle in the clockwise direction M, as shown in FIG. 39, the initial action convex portion 72 engages with the initial action concave portion 44*a* in the opening window 30 before the rack portion 71 leaves the gear portion 41*a*. If this convex portion 72 engages with the concave portion 44*a*, the rotation of the intermediate shell 84 is continued so that as shown in FIG. 40, the intermediate shell 84 is rotated up to the initial position. If the intermediate shell 84 is returned to the initial position, an end face of the rear sliding portion 43*b* of the driven portion 43 makes contact with the stop portion 45*c* of the lower shell 85, thereby blocking further rotation of the intermediate shell 84.

Because a relative motion is still continued between the disc cartridge 80 and the rack bar 70, a rotation force is given to the intermediate shell 84 by a moving force of the convex portion 72 engaged with the concave portion 44*a*. A reaction force of this rotation force is given to the convex portion 72 and the front elastic piece 72*a* is deformed by this reaction force so that the convex portion 72 is moved outward thereby releasing the engagement with the concave portion 44*a*. When the convex portion 72 of the rack bar 70 passes the opening hole 34, the input portion 37 of the lock member 32 is protruded through the opening hole 34 into the guide groove 31. At the same time, the stopper portion 36 is moved inward so that it is meshed with the set position concave portion 44*b* of the driven portion 43*b* of the intermediate shell 84. As a result, the intermediate shell 84 is locked by the lock member 32 thereby blocking a rotation thereof.

Figure 41:
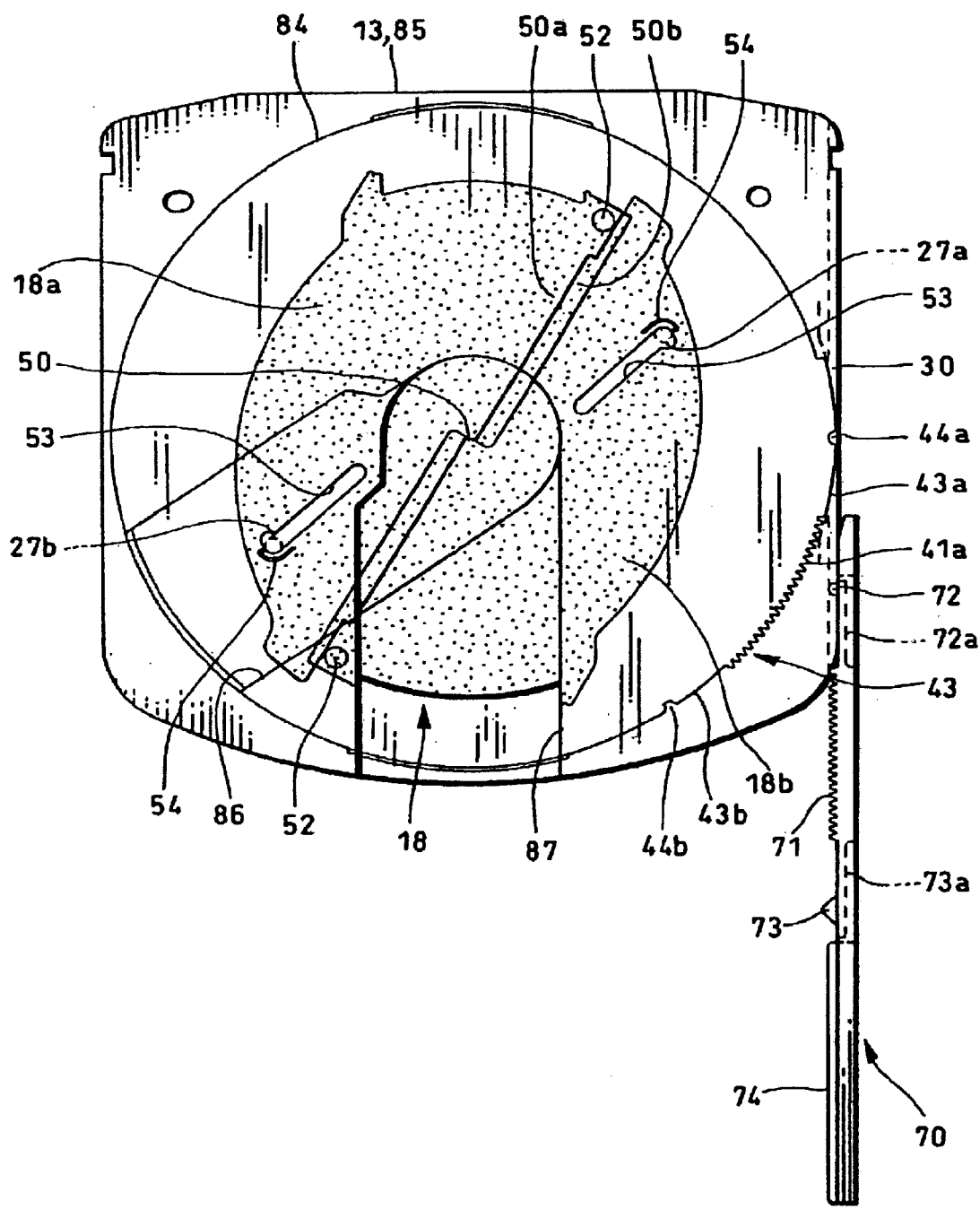
FIG. 41 is an explanatory diagram showing an action of the shutter opening/closing means when the disc cartridge shown in FIG. 15 is discharged, indicating a state in which the initial action convex portion deviates from the initial action concave portion.
Figure 42:
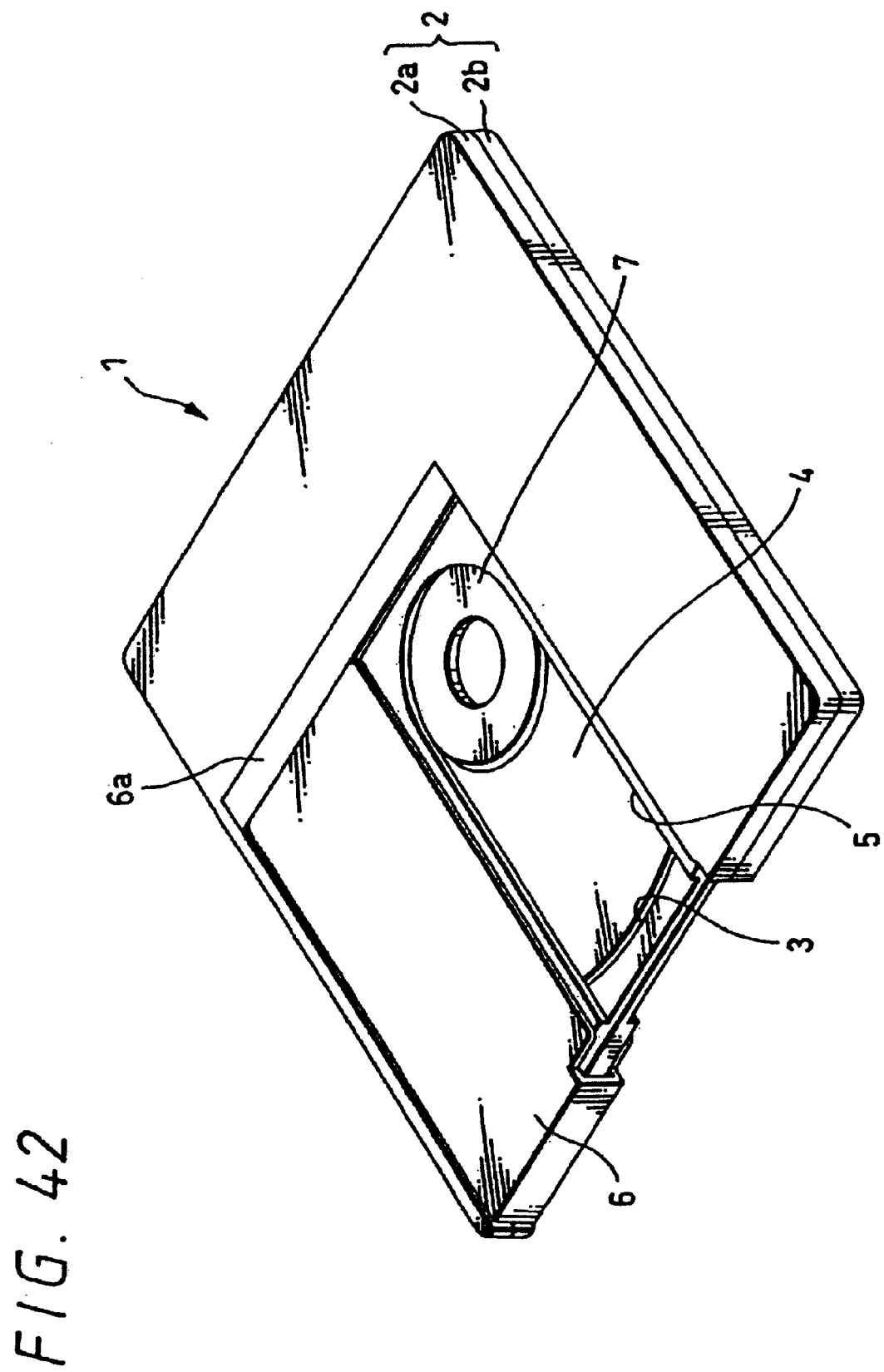
FIG. 42 is a perspective view showing a conventional disc cartridge.

At this time, a pair of the shutter members 18*a*, 18*b* execute an opposite movement to the aforementioned insertion time, so as to close the opening portions 86, 87 completely. That is, when a pair of the shutter members 18*a*, 18*b* are opened completely as shown in FIG. 37, the intermediate shell 84 and a pair of the shutter members 18*a*, 18*b* are rotated in the clockwise direction M. Following the states shown in FIGS. 38, 39, 40, the state of FIG. 41 is reached. Because the cam portion 46 of the intermediate shell 84 exists in the cam groove 22 in the state of FIGS. 38 to 41, the intermediate shell 84 can be rotated with a light force.

Next, when the intermediate shell 84 is changed from the state shown in FIG. 39 to the state shown in FIG. 40, after the cam portion 46 makes contact with the lift-up portion 23, it rides over this lift-up portion 23. Thus, after that, the aforementioned friction force is applied to the rotation of the intermediate shell 84. Just before the closing state shown in FIG. 40 is reached, the operating convex portion 27*b* (or 27*a*) is moved along the opening/closing groove 53 up to the outermost end thereof so that it contacts the elastic piece 54, pressing it. Consequently, a spring force is generated in the elastic piece 54 by a pressing force of the operating convex portion 27*b* (or 27*a*). A pressure contact force, acting on the other shutter member 18*a* (or 18*b*) is generated on the step portion 50 in the center by the spring force of this elastic piece 54.

Because this pressure contact force is generated in both of a pair of the shutter members 18*a*, 18*b*, sealing performance of the pair of the shutter members 18*a*, 18*b* is intensified by this pressure contact force. Thus, dust resistance at the joint portion between the shutter members 18*a* and 18*b* is improved, thereby preventing dirt, dust and the like from infiltrating into the disc-accommodating chamber 16 effectively. In this way, the opening portions 86, 87 are closed completely by the pair of the shutter members 18*a*, 18*b* and the disc cartridge 80 is discharged in that closing state. Consequently, the discharge action of the disc cartridge 80 is completed.

The present invention is not restricted to the above-described embodiments and although in the above embodiments, an example in which the optical disc is employed as information-recording medium has been explained, the present invention can be applied to a photo-magnetic disc, a magnetic disc such as floppy disc and other various types of disc-like recording mediums. Further, although in the above embodiment, an example in which the present invention is applied to a disc recording/reproducing apparatus capable of recording and reproducing information has been described, it is needless to say that it is applicable to a disc recording/reproducing apparatus capable of executing only one of recording and reproduction of information.

Although in the above embodiment, an example in which the opening portions 42, 25 and 86, 87 are provided in the intermediate shell 14, 84 and the lower shell 15, 85 of the cartridge case 12 has been described, it is permissible to provide the upper shell 13 also with the opening portion so as to enable access from above and below the cartridge case 12 at the same time. Further, it is permissible to form the disc accommodating chamber with the intermediate shell and the lower shell, accommodate the disc recording medium in this disc accommodating chamber and provide the upper shell with the opening portion. As described above, the present invention can be modified in various way within a scope not departing from the spirit of the invention.

As described above, in the disc cartridge comprised of a cartridge case containing a disc accommodating chamber, a disc-like recording medium and a pair of shutter members, according to the first aspect of the present invention, the driven portion provided on the external peripheral face of the intermediate shell faces the operating window provided in at least one of the upper shell and the lower shell, and the shutter opening/closing member passes outside this operating window. Thus, with the shutter opening/closing means engaged with the driven portion, the intermediate shell can be rotated up to a predetermined position. Therefore, a gap between the pair of the shutter members and the cartridge case can be reduced so that minute dust and dirt become difficult to enter into the disc accommodating chamber. Consequently, dust resistance of the cartridge case is intensified and irrespective of whether the, pair of the shutter members are opened or closed, the opening portion is opened securely when the disc cartridge is loaded on the recording/reproducing apparatus. When the disc cartridge is discharged from the recording/reproducing apparatus, the opening portion is kept closed securely.

In the disc cartridge of the second aspect of the present invention, two sheets of the same shape are disposed so as to close the opening portion while one side portion of each is supported rotatably on the intermediate shell and the other side portion is engaged with the lower shell or the upper shell slidably. A pair of the shutter members is opened/closed by a relative rotation of the intermediate shell and the lower shell or the upper shell. Consequently, while the area of each shutter member is reduced, it is possible to open/close a wider-area opening portion thereby leading to an increase of opening/closing efficiency of the opening portion. At the same time, reduction of the size and thickness of the disc cartridge can be achieved and a pair of the shutter members can be opened/closed smoothly and securely.

In the disc cartridge of the third aspect of the present invention, the shutter opening/closing means comprises the rack portion, the initial action convex portion and the stopper convex portion. The driven portion of the intermediate shell comprises the gear portion, the initial action concave portion and the set position concave portion. Consequently, if the shutter opening/closing means passes outside the operating window, the initial action convex portion or the rack portion engages with the initial action concave portion or the gear portion, so that the intermediate shell is rotated up to a predetermined position. As a result, the intermediate shell can be rotated securely up to the predetermined position and a pair of the shutter members is opened/closed smoothly by the rotation of the intermediate shell, thereby achieving the opening/closing of the opening portion.

In the disc cartridge of the fourth aspect of the present invention, the empty shift portion is provided between the rack portion, the initial action convex portion and the stopper convex portion and correspondingly, the driven portion is provided with the sliding portion. Consequently, the rack portion and the gear portion can be synchronized with each other so as to rotate the intermediate shell securely to a predetermined position. As a result, a pair of the shutter members can be opened/closed securely so as to achieve the opening/closing of the opening portion.

In the disc cartridge of the fifth aspect of the present invention, because the stopper convex portion is higher than the rack portion, when the stopper convex portion engages with the set position concave portion, the intermediate shell can be fixed at a predetermined position as if it is locked, so that the intermediate shell is protected from being rotated by vibration or the like.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. In a disc recording/reproducing apparatus comprising:
   an external case for accommodating therein a main body of the disc recording/reproducing apparatus;
   a front panel mounted on the front of the external case, wherein the front panel has a cartridge port for inserting a disc cartridge into the external case; wherein the disc cartridge comprises:
   a cartridge case its which a disc accommodating chamber is formed between an upper shell and an intermediate shell or between the intermediate shell and a lower shell by overlaying the upper shell, the intermediate shell and the lower shell, white the intermediate shell is supported rotatably by the upper shell and the lower shell;
   a disc-like recording medium which is accommodated rotatably in the disc accommodating chamber while part of the disc-like recording medium is exposed through an opening portion provided in the intermediate shell, the lower shell or the upper shell; and
   a pair of shutter members mounted on the intermediate shell, capable of opening/closing the opening portion; and
   a shutter opening/closing means for rotating the intermediate shell up to a predetermined position by engaging with a driven portion, which is provide on an external peripheral face of the intermediate shell and faces an operating window formed on at least one of the upper shell and the lower shell.

2. The disc cartridge according to claim 1, wherein the shutter opening/closing means comprises a rack portion reciprocating outside the operating window, an initial action convex portion disposed before and after the rack portion and a stopper convex portion and the driven portion comprises a gear portion which meshes detachably with the rack portion, initial action convex portions disposed on both sides in the circumferential direction of the gear portion and a set position concave portion, the intermediate shell being rotated to a predetermined position by engaging the initial action convex portion or the rack portion with the initial action concave portion or the gear portion.

3. The disc cartridge according to claim 2, wherein an empty shift portion for releasing meshing with gear portion is provided between the rack portion of the shutter opening/closing means and the initial action convex portion/the stopper convex portion and the driven portion is provided with a sliding portion which generates a relative sliding corresponding to site empty shift portion.

4. The disc cartridge according to claim 3, wherein the stopper convex portion is formed higher than the rack portion while the set position concave portion is provided in a tooth root circle of the gear portion.

* * * * *

UNITED STATES PATENT AND TRADEMARK OFFICE
CERTIFICATE OF CORRECTION

PATENT NO. : 6,901,602 B2
APPLICATION NO. : 10/443912
DATED : May 31, 2005
INVENTOR(S) : Naoki Inoue It is certified that error appears in the above-identified patent and that said Letters Patent is hereby corrected as shown below:

Column 24, line 65:

Change "disc cartridge" to

--disc recording/reproducing apparatus--

Column 25, line 10:

Change "disc cartridge" to

--disc recording/reproducing apparatus--

Column 26, line 6:

Change "disc cartridge" to

--disc recording/reproducing apparatus--

Signed and Sealed this

Fourteenth Day of November, 2006

JON W. DUDAS
*Director of the United States Patent and Trademark Office*